US009313458B2

(12) United States Patent
Helms et al.

(10) Patent No.: US 9,313,458 B2
(45) Date of Patent: Apr. 12, 2016

(54) DOWNLOADABLE SECURITY AND PROTECTION METHODS AND APPARATUS

(71) Applicant: Time Warner Cable Enterprises LLC, New York, NY (US)

(72) Inventors: William L. Helms, Longmont, CO (US); John B. Carlucci, Boulder, CO (US); Jason Kazmir Schnitzer, Boulder, CO (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 0 days.

(21) Appl. No.: 14/010,365

(22) Filed: Aug. 26, 2013

(65) Prior Publication Data

US 2014/0177833 A1 Jun. 26, 2014

Related U.S. Application Data

(62) Division of application No. 11/584,208, filed on Oct. 20, 2006, now Pat. No. 8,520,850.

(51) Int. Cl.
*H04N 7/167* (2011.01)
*H04L 29/06* (2006.01)
(Continued)

(52) U.S. Cl.
CPC ............ *H04N 7/1675* (2013.01); *G06F 21/602* (2013.01); *H04L 9/083* (2013.01);
(Continued)

(58) Field of Classification Search
USPC ................ 380/201, 239; 713/155, 164; 726/4
See application file for complete search history.

(56) References Cited

U.S. PATENT DOCUMENTS 5,369,707 A 11/1994 Follendore, III
5,528,284 A 6/1996 Iwarni et al.
(Continued)

FOREIGN PATENT DOCUMENTS

EP 1139198 A2 10/2001
GB 2381709 5/2003
(Continued)

OTHER PUBLICATIONS

Digital Video Broadcasting (DVB); DVB SimulCrypt; Part 1: "Head-end architecture and synchronization" Technical Specification—ETSI TS 101 197 V1.2.1 (Feb. 2002), 40 pages.
(Continued)

*Primary Examiner* — Brandon Hoffman
*Assistant Examiner* — Samuel Ambaye
(74) *Attorney, Agent, or Firm* — Gazdzinski & Associates, PC

(57) ABSTRACT

Methods and apparatus for control of data and content protection mechanisms across a network using a download delivery paradigm. In one embodiment, conditional access (CA), digital rights management (DRM), and trusted domain (TD) security policies are delivered, configured and enforced with respect to consumer premises equipment (CPE) within a cable television network. A trusted domain is established within the user's premises within which content access, distribution, and reproduction can be controlled remotely by the network operator. The content may be distributed to secure or non-secure "output" domains consistent with the security policies enforced by secure CA, DRM, and TD clients running within the trusted domain. Legacy and retail CPE models are also supported. A network security architecture comprising an authentication proxy (AP), provisioning system (MPS), and conditional access system (CAS) is also disclosed, which can interface with a trusted authority (TA) for cryptographic element management and CPE/user device authentication.

21 Claims, 33 Drawing Sheets

(51) Int. Cl.
*H04L 9/08* (2006.01)
*G06F 21/60* (2013.01)

(52) U.S. Cl.
CPC ......... *H04L 9/0891* (2013.01); *H04L 63/0428* (2013.01); *H04L 63/08* (2013.01); *H04N 7/167* (2013.01); *G06F 21/60* (2013.01); *H04L 2209/24* (2013.01); *H04L 2209/60* (2013.01); *H04L 2209/76* (2013.01); *H04L 2209/80* (2013.01); *H04L 2463/101* (2013.01)

(56) References Cited

U.S. PATENT DOCUMENTS

| | | |
|---|---|---|
| 5,577,209 A | 11/1996 | Boyle et al. |
| 5,708,961 A | 1/1998 | Hylton et al. |
| 5,715,403 A | 2/1998 | Stefik |
| 5,787,172 A | 7/1998 | Arnold |
| 5,818,438 A | 10/1998 | Howe et al. |
| 5,828,832 A | 10/1998 | Holden et al. |
| 5,870,474 A | 2/1999 | Wasilewski et al. |
| 5,897,635 A | 4/1999 | Torres et al. |
| 5,982,412 A | 11/1999 | Nulty |
| 6,009,103 A | 12/1999 | Woundy |
| 6,148,400 A | 11/2000 | Arnold |
| 6,154,844 A | 11/2000 | Touboul et al. |
| 6,157,719 A | 12/2000 | Wasilewski et al. |
| 6,167,432 A | 12/2000 | Jiang |
| 6,167,521 A | 12/2000 | Smith et al. |
| 6,181,697 B1 | 1/2001 | Nurenberg et al. |
| 6,212,636 B1 | 4/2001 | Boyle et al. |
| 6,219,710 B1 | 4/2001 | Gray et al. |
| 6,233,341 B1 | 5/2001 | Riggins |
| 6,233,687 B1 | 5/2001 | White |
| 6,256,393 B1 | 7/2001 | Safadi et al. |
| 6,259,701 B1 | 7/2001 | Shur et al. |
| 6,266,421 B1 | 7/2001 | Domyo et al. |
| 6,456,716 B1 | 9/2002 | Arnold |
| 6,519,062 B1 | 2/2003 | Yoo |
| 6,523,696 B1 | 2/2003 | Saito |
| 6,601,171 B1 | 7/2003 | Carter et al. |
| 6,640,145 B2 | 10/2003 | Hoffberg et al. |
| 6,657,991 B1 | 12/2003 | Akgun et al. |
| 6,694,145 B2 | 2/2004 | Riikonen et al. |
| 6,742,116 B1 | 5/2004 | Matsui et al. |
| 6,760,768 B2 | 7/2004 | Holden et al. |
| 6,782,550 B1 | 8/2004 | Cao |
| 6,785,810 B1 | 8/2004 | Lirov et al. |
| 6,788,676 B2 | 9/2004 | Partanen et al. |
| 6,807,573 B2 | 10/2004 | Saito et al. |
| 6,813,505 B2 | 11/2004 | Walley et al. |
| 6,859,535 B1 | 2/2005 | Tatebayashi et al. |
| 6,898,708 B2 | 5/2005 | Hori et al. |
| 6,910,064 B1 | 6/2005 | Astarabadi et al. |
| 6,925,257 B2 | 8/2005 | Yoo |
| 6,944,150 B1 | 9/2005 | McConnell et al. |
| 6,948,183 B1 | 9/2005 | Peterka |
| 6,954,632 B2 | 10/2005 | Kobayashi |
| 6,957,261 B2 | 10/2005 | Lortz |
| 6,957,328 B2 | 10/2005 | Goodman et al. |
| 6,975,730 B1 | 12/2005 | Kuroiwa et al. |
| 6,985,355 B2 | 1/2006 | Allirot |
| 6,996,544 B2 | 2/2006 | Sellars et al. |
| 7,006,881 B1 | 2/2006 | Hoffberg et al. |
| 7,009,972 B2 | 3/2006 | Maher et al. |
| 7,016,963 B1 | 3/2006 | Judd et al. |
| 7,017,189 B1 | 3/2006 | De Mello |
| 7,027,460 B2 | 4/2006 | Iyer et al. |
| 7,039,048 B1 | 5/2006 | Monta et al. |
| 7,054,443 B1 | 5/2006 | Jakubowski et al. |
| 7,054,902 B2 | 5/2006 | Toporek et al. |
| 7,055,040 B2 | 5/2006 | Klemba et al. |
| 7,068,639 B1 | 6/2006 | Varma et al. |
| 7,069,449 B2 | 6/2006 | Weaver et al. |
| 7,072,950 B2 | 7/2006 | Toft |
| 7,073,199 B1 | 7/2006 | Raley |
| 7,092,397 B1 | 8/2006 | Chandran et al. |
| 7,099,308 B2 | 8/2006 | Merrill et al. |
| 7,103,181 B2 | 9/2006 | Ananth |
| 7,106,382 B2 | 9/2006 | Shiotsu |
| 7,107,326 B1 | 9/2006 | Fijolek et al. |
| 7,149,772 B1 | 12/2006 | Kalavade |
| 7,154,912 B2 | 12/2006 | Chong et al. |
| 7,174,126 B2 | 2/2007 | McElhatten et al. |
| 7,174,127 B2 | 2/2007 | Otten et al. |
| 7,174,371 B2 | 2/2007 | Elo et al. |
| 7,174,385 B2 | 2/2007 | Li |
| 7,194,756 B2 | 3/2007 | Addington et al. |
| 7,209,458 B2 | 4/2007 | Ahvonen et al. |
| 7,225,333 B2 | 5/2007 | Peinado et al. |
| 7,228,427 B2 | 6/2007 | Fransdonk |
| 7,237,112 B1 | 6/2007 | Ishiguro et al. |
| 7,242,960 B2 | 7/2007 | Van Rooyen |
| 7,254,608 B2 | 8/2007 | Yeager et al. |
| 7,257,227 B2 | 8/2007 | Chen et al. |
| 7,266,726 B1 | 9/2007 | Ladd |
| 7,289,534 B1 | 10/2007 | Bailey et al. |
| 7,299,502 B2 | 11/2007 | Schmeling et al. |
| 7,305,460 B2 | 12/2007 | Park |
| 7,313,611 B1 | 12/2007 | Jacobs et al. |
| 7,324,531 B2 | 1/2008 | Cho |
| 7,325,073 B2 | 1/2008 | Shao et al. |
| 7,330,483 B1 | 2/2008 | Peters et al. |
| 7,330,967 B1 | 2/2008 | Pujare et al. |
| 7,373,506 B2 | 5/2008 | Asano et al. |
| 7,376,386 B2 | 5/2008 | Phillips et al. |
| 7,409,546 B2 | 8/2008 | Platt |
| 7,457,520 B2 | 11/2008 | Rossetti et al. |
| 7,486,869 B2 | 2/2009 | Alexander |
| 7,506,367 B1 | 3/2009 | Ishibashi |
| 7,592,912 B2 | 9/2009 | Hasek |
| 7,602,820 B2 | 10/2009 | Helms et al. |
| 7,673,004 B1 | 3/2010 | Sherstinsky et al. |
| 7,690,020 B2 | 3/2010 | Lebar |
| 7,693,171 B2 | 4/2010 | Gould |
| 7,707,644 B2 | 4/2010 | Choi et al. |
| 7,721,314 B2 | 5/2010 | Sincaglia |
| 7,730,321 B2 | 6/2010 | Gasparini et al. |
| 7,742,074 B2 | 6/2010 | Minatogawa |
| 7,752,617 B2 | 7/2010 | Blinick et al. |
| 7,757,101 B2 | 7/2010 | Nonaka et al. |
| 7,783,891 B2 | 8/2010 | Perlin et al. |
| 7,809,942 B2 | 10/2010 | Baran et al. |
| 7,865,440 B2 | 1/2011 | Jaquette |
| 7,925,592 B1 | 4/2011 | Issa et al. |
| 7,954,131 B2 | 5/2011 | Cholas et al. |
| 7,983,418 B2 | 7/2011 | Oyama et al. |
| 8,166,508 B2 | 4/2012 | Mitsuji et al. |
| 8,181,262 B2 | 5/2012 | Cooper et al. |
| 8,234,387 B2 | 7/2012 | Bradley et al. |
| 8,280,982 B2 | 10/2012 | Lajoie et al. |
| 8,332,370 B2 | 12/2012 | Gattegno et al. |
| 2001/0004768 A1 | 6/2001 | Hodge et al. |
| 2001/0014946 A1 | 8/2001 | Ichinoi et al. |
| 2001/0019614 A1 | 9/2001 | Madoukh |
| 2001/0029581 A1 | 10/2001 | Knauft |
| 2001/0053223 A1 | 12/2001 | Ishibashi et al. |
| 2001/0053226 A1 | 12/2001 | Akins et al. |
| 2001/0056541 A1 | 12/2001 | Matsuzaki et al. |
| 2002/0026575 A1 | 2/2002 | Wheeler et al. |
| 2002/0027883 A1 | 3/2002 | Belaiche |
| 2002/0032754 A1 | 3/2002 | Logston et al. |
| 2002/0056125 A1 | 5/2002 | Hodge et al. |
| 2002/0059619 A1 | 5/2002 | Lebar |
| 2002/0062440 A1 | 5/2002 | Akama |
| 2002/0066033 A1 | 5/2002 | Dobbins et al. |
| 2002/0077984 A1 | 6/2002 | Ireton |
| 2002/0126654 A1 | 9/2002 | Preston et al. |
| 2002/0129358 A1 | 9/2002 | Buehl et al. |
| 2002/0147771 A1 | 10/2002 | Traversal et al. |
| 2002/0152299 A1 | 10/2002 | Traversat et al. |
| 2002/0183985 A1 | 12/2002 | Hori et al. |
| 2002/0188744 A1 | 12/2002 | Mani |
| 2002/0188869 A1 | 12/2002 | Patrick et al. |
| 2002/0199105 A1 | 12/2002 | Ishiguro et al. |

(56) References Cited

U.S. PATENT DOCUMENTS

| | | |
|---|---|---|
| 2003/0009681 A1 | 1/2003 | Harada et al. |
| 2003/0021421 A1 | 1/2003 | Yokota et al. |
| 2003/0041336 A1 | 2/2003 | Del Sordo et al. |
| 2003/0046560 A1 | 3/2003 | Inomata et al. |
| 2003/0048380 A1 | 3/2003 | Tamura |
| 2003/0056217 A1 | 3/2003 | Brooks |
| 2003/0069965 A1 | 4/2003 | Ma et al. |
| 2003/0074571 A1 | 4/2003 | Fujiwara et al. |
| 2003/0084003 A1 | 5/2003 | Pinkas et al. |
| 2003/0097340 A1 | 5/2003 | Okamoto et al. |
| 2003/0115267 A1 | 6/2003 | Hinton et al. |
| 2003/0140227 A1 | 7/2003 | Asano et al. |
| 2003/0163697 A1 | 8/2003 | Pabla et al. |
| 2003/0165241 A1 | 9/2003 | Fransdonk |
| 2003/0166401 A1 | 9/2003 | Combes et al. |
| 2003/0187799 A1 | 10/2003 | Sellars et al. |
| 2003/0208763 A1 | 11/2003 | McElhatten et al. |
| 2003/0208767 A1 | 11/2003 | Williamson et al. |
| 2003/0217137 A1 | 11/2003 | Roese et al. |
| 2003/0217365 A1 | 11/2003 | Caputo |
| 2004/0024688 A1 | 2/2004 | Bi et al. |
| 2004/0034877 A1 | 2/2004 | Nogues |
| 2004/0045032 A1 | 3/2004 | Cummings et al. |
| 2004/0045035 A1 | 3/2004 | Cummings et al. |
| 2004/0045037 A1 | 3/2004 | Cummings et al. |
| 2004/0078602 A1 | 4/2004 | Rothbarth et al. |
| 2004/0088558 A1 | 5/2004 | Candelore |
| 2004/0117836 A1 | 6/2004 | Karaoguz et al. |
| 2004/0123129 A1 | 6/2004 | Ginter et al. |
| 2004/0128499 A1 | 7/2004 | Peterka et al. |
| 2004/0133923 A1 | 7/2004 | Watson et al. |
| 2004/0137918 A1 | 7/2004 | Varonen et al. |
| 2004/0181800 A1* | 9/2004 | Rakib et al. .............. 725/25 |
| 2004/0193680 A1 | 9/2004 | Gibbs et al. |
| 2004/0224425 A1 | 11/2004 | Gjerde |
| 2004/0250273 A1 | 12/2004 | Swix et al. |
| 2004/0260798 A1 | 12/2004 | Addington et al. |
| 2004/0261093 A1* | 12/2004 | Rebaud et al. ............. 725/25 |
| 2004/0268386 A1 | 12/2004 | Logan et al. |
| 2005/0005287 A1 | 1/2005 | Claussen |
| 2005/0015810 A1 | 1/2005 | Gould et al. |
| 2005/0021985 A1 | 1/2005 | Ono et al. |
| 2005/0022227 A1 | 1/2005 | Shen et al. |
| 2005/0034171 A1 | 2/2005 | Benya |
| 2005/0039212 A1 | 2/2005 | Baran et al. |
| 2005/0049886 A1 | 3/2005 | Grannan et al. |
| 2005/0055220 A1 | 3/2005 | Lee et al. |
| 2005/0065888 A1 | 3/2005 | Benaloh |
| 2005/0086683 A1 | 4/2005 | Meyerson |
| 2005/0097006 A1 | 5/2005 | Nyako |
| 2005/0108763 A1 | 5/2005 | Baran et al. |
| 2005/0114900 A1 | 5/2005 | Ladd |
| 2005/0138357 A1 | 6/2005 | Swenson et al. |
| 2005/0169468 A1* | 8/2005 | Fahrny et al. ............. 380/210 |
| 2005/0172127 A1 | 8/2005 | Hartung et al. |
| 2005/0177740 A1 | 8/2005 | Athaide et al. |
| 2005/0177741 A1 | 8/2005 | Chen et al. |
| 2005/0177855 A1 | 8/2005 | Maynard et al. |
| 2005/0182931 A1 | 8/2005 | Robert et al. |
| 2005/0188210 A1* | 8/2005 | Perlin et al. ............. 713/183 |
| 2005/0190912 A1 | 9/2005 | Hopkins et al. |
| 2005/0195975 A1 | 9/2005 | Kawakita |
| 2005/0198693 A1 | 9/2005 | Choi et al. |
| 2005/0278259 A1 | 12/2005 | Gunaseelan et al. |
| 2005/0289618 A1 | 12/2005 | Hardin |
| 2006/0002551 A1 | 1/2006 | Brown et al. |
| 2006/0008256 A1 | 1/2006 | Khedouri et al. |
| 2006/0020786 A1* | 1/2006 | Helms et al. ............. 713/165 |
| 2006/0020950 A1 | 1/2006 | Ladd |
| 2006/0021004 A1 | 1/2006 | Moran et al. |
| 2006/0036750 A1 | 2/2006 | Ladd |
| 2006/0041903 A1 | 2/2006 | Kahn et al. |
| 2006/0047801 A1 | 3/2006 | Haag |
| 2006/0047957 A1 | 3/2006 | Helms |
| 2006/0064583 A1 | 3/2006 | Birnbaum et al. |
| 2006/0095940 A1 | 5/2006 | Yearwood |
| 2006/0130099 A1 | 6/2006 | Rooyen |
| 2006/0130107 A1 | 6/2006 | Gonder |
| 2006/0130113 A1 | 6/2006 | Carlucci |
| 2006/0136964 A1 | 6/2006 | Diez et al. |
| 2006/0137005 A1 | 6/2006 | Park |
| 2006/0137015 A1 | 6/2006 | Fahrny et al. |
| 2006/0149850 A1 | 7/2006 | Bowman |
| 2006/0161635 A1 | 7/2006 | Lamkin et al. |
| 2006/0168219 A1 | 7/2006 | Ahluwalia et al. |
| 2006/0179138 A1* | 8/2006 | Van Gassel et al. .......... 709/225 |
| 2006/0184972 A1 | 8/2006 | Rafey et al. |
| 2006/0187900 A1 | 8/2006 | Akbar |
| 2006/0200856 A1 | 9/2006 | Salowey et al. |
| 2006/0206712 A1 | 9/2006 | Dillaway et al. |
| 2006/0209799 A1 | 9/2006 | Gallagher et al. |
| 2006/0212400 A1 | 9/2006 | Kamperman et al. |
| 2006/0218604 A1 | 9/2006 | Riedl |
| 2006/0248553 A1 | 11/2006 | Mikkelson et al. |
| 2006/0259927 A1 | 11/2006 | Acharya et al. |
| 2006/0291506 A1 | 12/2006 | Cain |
| 2007/0011335 A1 | 1/2007 | Burns |
| 2007/0019645 A1 | 1/2007 | Menon |
| 2007/0022459 A1 | 1/2007 | Gaebel |
| 2007/0022469 A1 | 1/2007 | Cooper et al. |
| 2007/0033531 A1 | 2/2007 | Marsh |
| 2007/0046791 A1 | 3/2007 | Wang et al. |
| 2007/0049245 A1 | 3/2007 | Lipman |
| 2007/0067851 A1 | 3/2007 | Fernando et al. |
| 2007/0079381 A1 | 4/2007 | Hartung et al. |
| 2007/0094691 A1 | 4/2007 | Gazdzinski |
| 2007/0098178 A1 | 5/2007 | Raikar |
| 2007/0121678 A1 | 5/2007 | Brooks |
| 2007/0124488 A1 | 5/2007 | Baum et al. |
| 2007/0157295 A1 | 7/2007 | Mangalore et al. |
| 2007/0174888 A1 | 7/2007 | Rubinstein |
| 2007/0192615 A1 | 8/2007 | Varghese et al. |
| 2007/0204314 A1 | 8/2007 | Hasek |
| 2007/0206799 A1 | 9/2007 | Wingert et al. |
| 2007/0209059 A1 | 9/2007 | Moore et al. |
| 2007/0217436 A1 | 9/2007 | Markley |
| 2007/0219910 A1 | 9/2007 | Martinez |
| 2007/0220024 A1 | 9/2007 | Putterman et al. |
| 2007/0250872 A1 | 10/2007 | Dua |
| 2007/0250880 A1 | 10/2007 | Hainline |
| 2007/0261116 A1 | 11/2007 | Prafullchandra et al. |
| 2007/0276925 A1 | 11/2007 | La Joie et al. |
| 2007/0276926 A1 | 11/2007 | Lajoie et al. |
| 2008/0008321 A1 | 1/2008 | Gagnon et al. |
| 2008/0008371 A1 | 1/2008 | Woods et al. |
| 2008/0022012 A1 | 1/2008 | Wang |
| 2008/0059804 A1 | 3/2008 | Shah et al. |
| 2008/0066112 A1 | 3/2008 | Bailey et al. |
| 2008/0091805 A1 | 4/2008 | Malaby et al. |
| 2008/0091807 A1 | 4/2008 | Strub et al. |
| 2008/0098212 A1 | 4/2008 | Helms et al. |
| 2008/0103976 A1 | 5/2008 | Read et al. |
| 2008/0103977 A1 | 5/2008 | Khosravy et al. |
| 2008/0112405 A1 | 5/2008 | Cholas et al. |
| 2008/0117920 A1 | 5/2008 | Tucker |
| 2008/0123862 A1 | 5/2008 | Rowley |
| 2008/0133551 A1 | 6/2008 | Wensley et al. |
| 2008/0148362 A1 | 6/2008 | Gilder et al. |
| 2008/0155059 A1 | 6/2008 | Hardin et al. |
| 2008/0162353 A1 | 7/2008 | Tom et al. |
| 2008/0165460 A1 | 7/2008 | Whitby-Strevens |
| 2008/0177998 A1 | 7/2008 | Apsangi et al. |
| 2008/0212945 A1 | 9/2008 | Khedouri et al. |
| 2008/0222684 A1 | 9/2008 | Mukraj et al. |
| 2008/0235746 A1 | 9/2008 | Peters et al. |
| 2008/0256510 A1 | 10/2008 | Auerbach |
| 2008/0270307 A1 | 10/2008 | Olson et al. |
| 2008/0273591 A1 | 11/2008 | Brooks et al. |
| 2008/0282299 A1 | 11/2008 | Koal et al. |
| 2008/0288618 A1 | 11/2008 | Vardi et al. |
| 2009/0007234 A1 | 1/2009 | Birger et al. |
| 2009/0031371 A1 | 1/2009 | Munsell et al. |
| 2009/0083813 A1 | 3/2009 | Dolce et al. |
| 2009/0098861 A1 | 4/2009 | Kalliola et al. |

(56) References Cited

U.S. PATENT DOCUMENTS

| | | |
|---|---|---|
| 2009/0100459 A1 | 4/2009 | Riedl et al. |
| 2009/0102983 A1 | 4/2009 | Malone et al. |
| 2009/0151006 A1 | 6/2009 | Saeki et al. |
| 2009/0182815 A1 | 7/2009 | Czechowski, III et al. |
| 2009/0185576 A1 | 7/2009 | Kisel et al. |
| 2009/0201917 A1 | 8/2009 | Maes et al. |
| 2009/0210912 A1 | 8/2009 | Cholas et al. |
| 2009/0225760 A1 | 9/2009 | Foti |
| 2009/0265750 A1 | 10/2009 | Jones et al. |
| 2009/0282241 A1 | 11/2009 | Prafullchandra et al. |
| 2009/0282449 A1 | 11/2009 | Lee |
| 2009/0293101 A1 | 11/2009 | Carter et al. |
| 2010/0030578 A1 | 2/2010 | Siddique et al. |
| 2010/0031299 A1 | 2/2010 | Harrang et al. |
| 2010/0042478 A1 | 2/2010 | Reisman |
| 2010/0083329 A1 | 4/2010 | Joyce et al. |
| 2010/0088236 A1 | 4/2010 | Karabulut et al. |
| 2010/0088292 A1 | 4/2010 | Tirpak et al. |
| 2010/0106846 A1 | 4/2010 | Noldus et al. |
| 2010/0131973 A1 | 5/2010 | Dillon et al. |
| 2010/0138900 A1 | 6/2010 | Peterka et al. |
| 2010/0169977 A1 | 7/2010 | Dasher et al. |
| 2010/0185855 A1 | 7/2010 | Margolus et al. |
| 2010/0198888 A1 | 8/2010 | Blomstedt et al. |
| 2010/0217837 A1 | 8/2010 | Ansari et al. |
| 2010/0251305 A1 | 9/2010 | Kimble et al. |
| 2010/0287609 A1 | 11/2010 | Gonzalez et al. |
| 2010/0313225 A1 | 12/2010 | Cholas et al. |
| 2010/0313226 A1 | 12/2010 | Cholas et al. |
| 2011/0071841 A1 | 3/2011 | Fomenko et al. |
| 2011/0078721 A1 | 3/2011 | Wang et al. |
| 2011/0093900 A1 | 4/2011 | Patel et al. |
| 2011/0103374 A1 | 5/2011 | Lajoie et al. |
| 2011/0164753 A1 | 7/2011 | Dubhashi et al. |
| 2011/0169977 A1 | 7/2011 | Masuda |
| 2011/0213688 A1 | 9/2011 | Santos et al. |
| 2011/0219229 A1 | 9/2011 | Cholas et al. |
| 2012/0008786 A1 | 1/2012 | Cronk et al. |
| 2012/0011567 A1 | 1/2012 | Cronk et al. |
| 2012/0291062 A1 | 11/2012 | Pearson et al. |
| 2014/0283137 A1 | 9/2014 | Rebaud et al. |

FOREIGN PATENT DOCUMENTS

| | | |
|---|---|---|
| JP | H08263440 A | 10/1996 |
| JP | 2000156676 A | 6/2000 |
| JP | 2000332746 A | 11/2000 |
| JP | 2001-243707 | 9/2001 |
| JP | 2001274786 A | 10/2001 |
| JP | 2001274788 A | 10/2001 |
| JP | 2001285821 | 10/2001 |
| JP | 2002163396 A | 6/2002 |
| JP | 2002352094 A | 12/2002 |
| JP | 2003058657 A | 2/2003 |
| JP | 2003162600 A | 6/2003 |
| JP | 2003233690 A | 8/2003 |
| JP | 2003248508 A | 9/2003 |
| JP | 2003296484 A | 10/2003 |
| JP | 2003348508 | 12/2003 |
| JP | 2004030111 A | 1/2004 |
| JP | 2004072721 A | 3/2004 |
| JP | 2004120736 A | 4/2004 |
| JP | 2004120738 A | 4/2004 |
| JP | 2004303111 A | 10/2004 |
| JP | 2005506627 A | 3/2005 |
| JP | A-2005-519365 | 6/2005 |
| JP | A-2005-519501 | 6/2005 |
| JP | A-2005-339093 | 12/2005 |
| JP | 2006-185473 | 7/2006 |
| JP | A-2006-311267 | 11/2006 |
| JP | A-2007-020144 | 1/2007 |
| JP | 2008-021293 | 1/2008 |
| JP | A-2008-015936 | 1/2008 |
| JP | A-2008-5047 | 1/2008 |
| JP | 2008507905 A | 3/2008 |
| JP | 2008167018 A | 7/2008 |
| JP | 2008206039 A | 9/2008 |
| JP | 2009-515238 | 4/2009 |
| JP | 2009071786 A | 4/2009 |
| JP | 2009176060 A | 8/2009 |
| JP | 2009211632 A | 9/2009 |
| JP | A-2010-502109 | 1/2010 |
| JP | 2010079902 A | 4/2010 |
| JP | 2012505436 A | 3/2012 |
| JP | 2012523614 A | 10/2012 |
| WO | WO-0103410 A1 | 1/2001 |
| WO | WO 01/10125 | 2/2001 |
| WO | WO-0137479 A1 | 5/2001 |
| WO | WO-0169842 A1 | 9/2001 |
| WO | WO 01/77778 | 10/2001 |
| WO | WO 02/13032 | 2/2002 |
| WO | WO 02/21841 | 3/2002 |
| WO | WO-0242966 A1 | 5/2002 |
| WO | WO 02/080556 | 10/2002 |
| WO | WO 03/038704 | 5/2003 |
| WO | WO-03087799 A1 | 10/2003 |
| WO | WO 03/093944 | 11/2003 |
| WO | WO 2004/027622 | 4/2004 |
| WO | WO 2005/015422 | 2/2005 |
| WO | WO-2006020141 A2 | 2/2006 |
| WO | WO-2009020476 A2 | 2/2009 |
| WO | WO-2012021245 A1 | 2/2012 |

OTHER PUBLICATIONS

DVB (Digital Video Broadcasting), DVB Document A045 Rev. 3, Jul. 2004, "Head-end Implementation of SimulCrypt," 289 pages.

Federal Information Processing Standards Publication, US FIPS PUB 197, Nov. 26, 2001, "Advanced Encryption Standards (AES)," 47 pages.

DCAS Authorized Service Domain, Version 1.2, dated Nov. 30, 2005, 54 pages.

DCAS Licensed Specification Abstracts, CableLabs Confidential Information, Jan. 12, 2006, 4 pages.

5C Digital Transmission Content Protection White Paper, Hitachi, Ltd., et al., dated Jul. 14, 1998, 15 pages.

High-bandwidth Digital Content Protection System, Revision 1.091, dated Apr. 22, 2003, Digital Content Protection LLC Draft, 78 pages.

Real System Media Commerce Suite Technical White Paper, .COPYRGT. 2001 RealNetworks, Inc., 16 pages, http://www.realnetworks.com.

Digital Rights Management, Technical White Paper, Alcatel Telecommunications Review, 2.sup.nd Quarter 2003, 8 pages.

A Flexible Content Protection System for Media-on-Demand, by Jian Zhang, et al., IBM China Research Lab, Proceedings of the IEEE Fourth International Symposium on Multimedia Software Engineering (MSE'02), 6 pages.

Security Assertion Markup Language (SAML) Specification (Version 2.0 released in 2005), as SAML Core: S. Cantor et al. Assertions and Protocols for the OASIS Security Assertion Markup Langauge (SAML) V2.0. OASIS Standard, Mar. 2005. Document ID sami-core02.0-os (http://docs.oasis-open.org/security/saml/v2.0/saml-core-2.0os.pdf).

SAML Binding: S Cantor et al. Bindings for the OASIS Security Assertion Markup Language (SAML) V.2.0. OASIS Standard, Mar. 2005. Document ID saml-bindings-2.0-os (http://docs.oasis-open.org/security/saml/v2.0/saml-bindings-2.0-os.pdf).

DVB (Digital Video Broadcasting) Specification TS 101 197 V1.2.1 (Feb. 2002), DVB SimulCrypt; Part 1: "Head-end architecture and synchronization", and TS 103 197 V1.2.1 (Feb. 2002): "Head-end Implementation of SimulCrypt".

Media Server; 1 Device Template Version 1.01 Jun. 25, 2002.

OpenCable Application platform specification OCAP Extension—OACP Home Networking Extension OC-SP-OCAP-HNEXT-103-080418, 2005-2008.

Bostjan Marusic et al. "Share it!—Content Transfer in Home-to-Home Networks." IEEE MELECON 2004, May 12-15, 2004, Dubrovnik, Croatia.

(56) References Cited

OTHER PUBLICATIONS

Extended European Search Report for Application No. EP05848363, mailed on Aug. 26, 2009, 9 pages.

Extended European Search Report for Application No. EP12151109, mailed on May 23, 2014, 9 pages.

International Search Report for Application No. PCT/US05/44537, mailed on Aug. 8, 2008, 1 pages.

OCAP 2.0 Profile, OC-SP-OCAP2.0401-020419, Apr. 19, 2002, Cable Television Laboratories, Inc. article OpenCable Application Platform Specification.

OC-SP-HOSR-CFR-113-030707', Jul. 7, 2003, Cable Television Laboratories, Inc. article 'OpenCableTm Host Device Core Functional Requirements'.

OC-SP-HOSTPOD-IF-113-030707, Jul. 7, 2003, Cable, Television Laboratories, Inc. article OpenCableTm HOST-POD Interface Specification.

OpenCable Specification Home Networking 2.0 0C-Sp-HNP2.0 101-08418, 2007.

OpenCableTM Specifications Home Networkmg, Home Networking Security Specification; OC-SP-HN-DO1-081027 (Oct. 27, 2008).

Written Opinion for Application No. PCT/US05/44537, mailed on Aug. 8, 2008, 3 pages.

Zhang, et al. ("A flexible content protection system for media-on-demand" Multimedia Software Engineering, 2002 Proceedings. Fourth International Symposium on Dec. 11-13, 2002, Piscataway, NJ, USAA, IEEE, Dec. 11, 2002, pp. 272-277, XP010632760ISBN: 978-0-7695-1857-2; hereinafter "Zhang").

\* cited by examiner

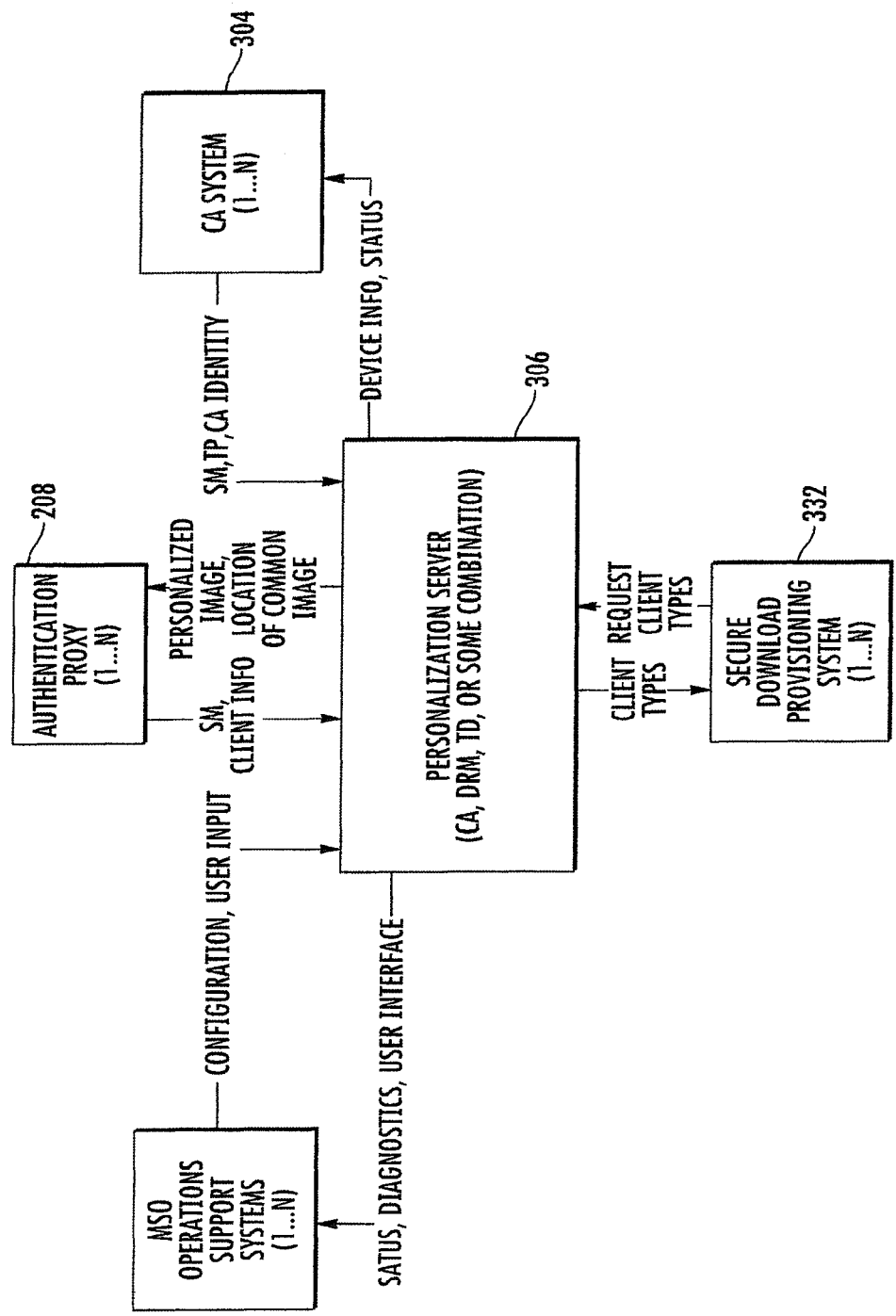

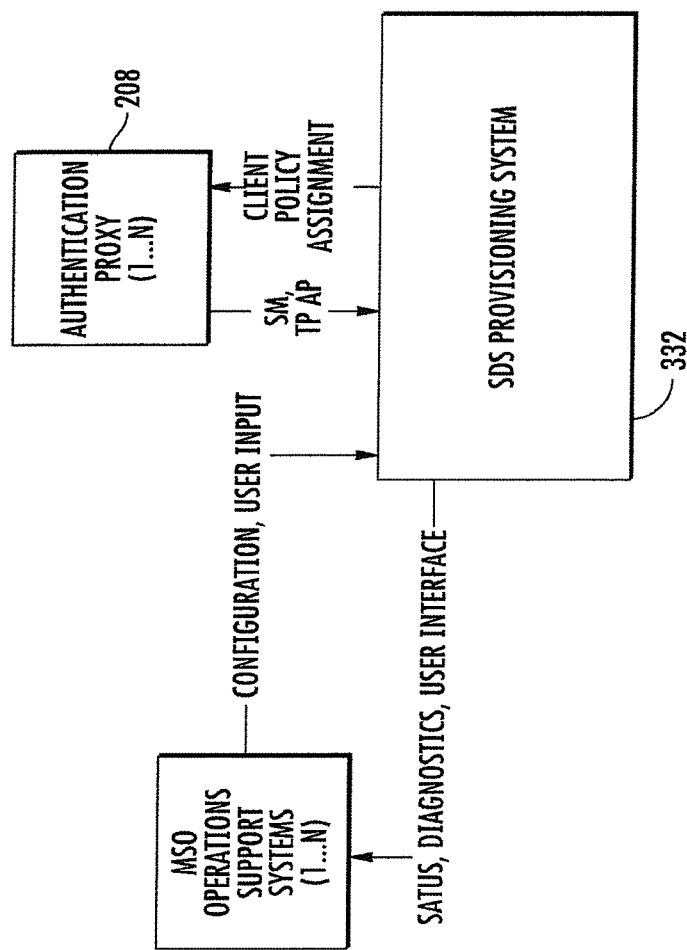

DOWNLOADABLE SECURITY AND PROTECTION METHODS AND APPARATUS

PRIORITY

This application is a divisional of and claims priority to co-owned U.S. patent application Ser. No. 11/584,208 of the same title filed Oct. 20, 2006, and issuing as U.S. Pat. No. 8,520,850 on Aug. 27, 2013, which is incorporated herein by reference in its entirety.

RELATED APPLICATIONS

This application is related to U.S. patent application Ser. No. 11/006,404 filed Dec. 7, 2004 and entitled "Technique For Securely Communicating And Storing Programming Material In A Trusted Domain", which is now U.S. Pat. No. 8,312,267 and which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of content and/or data delivery over a network. More particularly, the present invention is related to apparatus and methods for distributing programming content, media, data and other information services according to downloadable conditional access (CA), trusted domain (TD) and/or digital rights management (DRM) schemes.

2. Description of Related Technology

Recent advances in digital information processing have made a wide range of services and functions available for delivery to consumers at their premises for very reasonable prices or subscription fees. These services and functions include digital programming (movies, etc.), digital video-on-demand (VOD), personal video recorder (PVR), Internet Protocol television (IPTV), digital media playback and recording, as well high-speed Internet access and IP-based telephony (e.g., VoIP). Other services available to network users include access to and recording of digital music (e.g., MP3 files), as well local area networking (including wire-line and wireless local area networks) for distributing these services throughout the user's premises, and beyond.

Currently, many of these services are provided and delivered to the user via a wide variety of different equipment environments including, inter alia, cable modems, WiFi hubs, Ethernet hubs, gateways, switches and routers, computers, servers, cable set-top boxes, PSTNs, cellular telephones/smartphones, PDAs, and portable digital music devices such as the Apple iPod™. Additionally, the services associated with such technology are typically provided by multiple vendors including e.g., a cable service provider (e.g., MSO), cellular service provider (CSP), wireless service provider (WSP), VoIP service provider, music download service, Internet service provider (ISP), PSTN telephone service, etc.

The myriad of services, equipment and providers can easily create confusion and economic inefficiency for someone using many of these services on a regular basis. In particular, a user may have to pay for each service or equipment separately, thus eliminating any economies of scale based on integration. Additionally, the equipment or services may not interoperate with one another, thus reducing the overall utility provided to the user, and increasing their frustration level. These problems are particularly acute when the number of different services utilized (and hence number of service providers) is high.

Some improvements in digital service integration have been made over time. For example, cable system subscribers (such as those of the Assignee hereof) can now access VOD, PVR, PPV and broadcast services simultaneously, as well a Internet access via cable modem, and even digital telephony (e.g., VoIP). However, these functions are still substantially disparate in terms of their hardware and software environments (i.e., the user must have a cable modem, set-top box, VoIP telephony unit, PC, etc.), and "cross-over" between the environments (e.g., moving content or data from one environment to the other) is quite limited.

Moreover, the movement of content delivered by these services within the user's premises (or even outside) is substantially frustrated, largely due to concerns relating to protection of valuable (e.g., copyrighted) content and surreptitious reproduction and distribution. Such unauthorized reproduction and distribution not only detracts from the network operator's revenue and commercial viability, but also that of the content source (e.g., movie studio, recording studio/artist, etc.).

Moreover, the lack of a comprehensive and effective scheme for control of content within the user domain effectively precludes content providers from releasing new content over cable or satellite networks contemporaneous with its availability over retail or rental outlets, due in large part to unauthorized access, reproduction and distribution concerns. Stated simply, new release content availability over cable typically lags that of rental/retail, due primarily to the lack of an effective control mechanism for the content once it is delivered to the user domain.

A number of existing technologies have heretofore been employed by network operators in order to attempt to frustrate surreptitious access, copying and distribution of valuable content. These approaches are now described.

Conditional Access

Conditional access (CA) technologies are typically incorporated into content-based networks, such technologies including the digital encoding of various types of data including audio and video programming and music. Conditional access can generally be defined as the control of when and how a user may view and use the associated programming or information. Different types of conditional access may be desirable in a network delivery system in order to, e.g., accommodate improvements in the technology over time, as well as different conditional access attributes such as security and category of programming or user access level.

A variety of traditional methods of conditional access exist including, e.g., "Powerkey", NDS, and DigiCipher. A generalized conditional access model is also provided by the well-known DVB (Digital Video Broadcasting) Specification TS 101 197 V1.2.1 (02/02), DVB SimulCrypt; Part 1: "Head-end architecture and synchronization", and TS 103 197 V1.2.1 (02/02): "Head-end Implementation of SimulCrypt", each incorporated herein by reference in its entirety. These can be implemented using, for example, the so-called "CableCard" plug-in security module access technology (also known as a "a point-of-deployment (POD) module"). See, e.g., the CableCard-Host interface specification, which defines the interface between a digital cable receiver or STB (Host device) and the CableCard device provided by the MSO/cable operator. CableCard was developed to satisfy certain security requirements to allow retail availability of host devices, e.g., set-top boxes, digital cable ready televisions, DVRs, personal computers (PCs), integrated digital televisions, etc., for receiving cable services. The CableCard, comprising a PCM-CIA device, can be inserted into a host device, allowing a viewer to receive cable systems' secure digital video services, e.g., pay per view TV, electronic program guides, premium subscription channels, etc.

Specifically, the CableCard contains conditional access functionality, as well as the capability of converting messages to a common format. Thus, the CableCard provides a cable operator with a secure device at the subscriber premises, and acts as a translator so that the host device needs to understand a single protocol, regardless of the type of the network to which it is connected.

For example, with the CableCards provided by cable operators, host devices which comply with OpenCable specifications, e.g., the an OpenCable Applications Platform (OCAP), may be sold in retail outlets. (For details on such a platform, one may refer, e.g., to: "OpenCable Application Platform Specification," OCAP 2.0 Profile, OC-SP-OCAP2.0-101-020419, Cable Television Laboratories, Inc., Apr. 19, 2002, incorporated herein by reference in its entirety.) The OCAP allows applications to be built to a common middleware layer for deployment on host devices interoperable across cable systems in North America. (For details on the functional requirements of one such host device, one may refer, e.g., to: "OpenCable™ Host Device Core Functional Requirements," OC-SP-HOSR-CFR-113-030707, Cable Television Laboratories, Inc., Jul. 7, 2003, incorporated herein by reference in its entirety.) With a common interface to the CableCard, a host can be moved from one place to another, provided that the user of the host device contact his/her new cable operator to obtain a new CableCard. (For details on such an interface, one may refer, e.g., to: "OpenCable™ HOST-POD Interface Specification," OC-SP-HOSTPOD-IF-113-030707, Cable Television Laboratories, Inc. Jul. 7, 2003, incorporated herein by reference in its entirety.) To provision a new CableCard and host device, an initialization and authorization process needs to be performed while the host device, with the CableCard inserted therein, is connected to the cable network. The initialization and authorization process begins with the user's providing an ID(s) of the CableCard and/or the host device (e.g., serial number(s)) to the cable operator. The cable operator looks up in a database a MAC address of the CableCard which typically is hard-coded in the CableCard, and is associated with the CableCard ID. During the authorization process, the cable operator may, for example, assign an IP address to the CableCard for its identification in the cable network. The cable operator may also collect from the host device data concerning the make, model, and ID of the host device (e.g., its serial number). The cable operator may associate the CableCard's MAC address (and/or IP address) with the user information, e.g., his/her name, address, etc. for billing purposes.

Encryption

In many content-based networks (e.g., cable television systems), the client device or consumer premises equipment (CPE) receives, through the cable TV network, programming content which may be encrypted, e.g., in accordance with the Data Encryption Standard (DES) technique or Advanced Encryption Standard (AES), to secure its delivery.

DES is a well-known symmetrical cipher that utilizes a single key for both encryption and decryption of messages. Because the DES algorithm is publicly known, learning the DES key would allow an encrypted message to be read by anyone. As such, both the message sender and receiver must keep the DES key a secret from others. A DES key typically is a sequence of eight bytes, each containing eight bits. To enhance the DES integrity, the DES algorithm may be applied successive times. With this approach, the DES algorithm enciphers and deciphers data, e.g., three times in sequence, using different keys, resulting in a so-called triple DES (3DES) technique.

The Advanced Encryption Standard (AES), also known as Rijndael, is a block cipher adopted as an encryption standard by many entities including the U.S. government. It is used worldwide, as is the case with its predecessor, DES. AES was adopted by National Institute of Standards and Technology (NIST) and was codified as US FIPS PUB 197 in November 2001.

AES has a fixed block size of 128 bits and a key size of 128, 192 or 256 bits. The key is expanded using the well-known Rijndael key schedule. Most of AES calculations are performed in a special finite field. AES typically operates on a 4×4 array of bytes, termed the state. For encryption, each cycle or round of AES (except the last round) consists of four stages or operations: (i) AddRoundKey, wherein each byte of the state is combined with the round key, and each round key is derived from the cipher key by using the key schedule; (ii) SubBytes, wherein a non-linear substitution is performed such that each byte is replaced with another according to a lookup table; (iii) ShiftRows, wherein a transposition step is performed such that each row of the state is shifted cyclically a given number of steps; and (iv) MixColumns, wherein a mixing operation which operates on the columns of the state is performed, thereby combining the four bytes in each column using a function (e.g., linear transformation). The final round of the algorithm replaces the MixColumns stage with another instance of the AddRoundKey step.

AES provides a much higher level of encryption than DES or 3DES, and hence is increasingly being integrated into applications where strong protection is desired, including the delivery of content over cable or other content-based networks.

In contrast to the DES or AES techniques, a public key encryption technique, e.g., an RSA technique (named for its developers, Rivest, Shamir, and Adleman), uses two different keys. A first key, referred to as a private key, is kept secret by a user. The other key, referred to as a public key, is available to anyone wishing to communicate with the user in a confidential manner. The two keys uniquely match each other, collectively referred to as a "public \-private key pair." However, the private key cannot be easily derived from the public key. A party wishing to send a message to the user may utilize the public key to encrypt a message before transmitting it. The user then utilizes the private key to decrypt the message. Conversely, the private key may be used to encrypt a message, in which case the message can subsequently be decrypted with the public key. For example, the keys for the RSA algorithm are mathematically generated, in part, by combining prime numbers. The security of the RSA algorithm, and the like, depends on the use of very large numbers for its keys, which typically are 512 bits long or longer.

"Trusted Domains"

Another related approach for content protection comprises the creation and enforcement of a "trusted domain" or TD. Specifically, such a "trusted domain" (TD) comprises an area (physically or virtually) within which programming or other content is protected from unauthorized access, distribution and copying. For example, in a cable network, a trusted domain may include not only the network portion where programming content traditionally is secured by, and within total control of, a cable operator (including, e.g., the headend, HFC delivery network, etc.,) but also user devices or customer premises equipment (CPE) at subscribers' premises which are capable of receiving and securely storing programming content. Using the trusted domain approach, the network operator can guarantee certain subscriber access, distribution, and usage policy enforcement with respect to content held within the domain. For example, a digital representation of a movie held within an operator's TD (e.g., on a hard drive of a user device) cannot be distributed over the Internet, wireless network, etc. in viewable form, and cannot become a source for duplication of multiple viewable copies.

One exemplary approach of implementing a trusted domain, described in co-owned and co-pending U.S. patent application Ser. No. 11/006,404 filed Dec. 7, 2004 and entitled "Technique For Securely Communicating Programming Content" now U.S. Pat. No. 8,312,267, which is incorporated herein by reference in its entirety, comprises using two cryptographic elements (e.g., encryption keys), associated with a user and his/her client device(s), respectively, that control access to content stored in the client device(s) within the domain. For example, the content stored in the client device may be encrypted using a private or secret key in accordance with the DES or AES algorithms. When the encrypted content is transported from the client device to another device within the domain associated with the same user (or other common parameter or feature), the second device needs the cryptographic element (e.g., the secret key) to decrypt the encrypted content. To that end, the second device also receives from the source device an encrypted version of this secret key. The latter is generated by encrypting the secret key using a second and distinct cryptographic element (e.g., a public key in accordance with a public key algorithm) associated with the subscriber. The second device provides the encrypted version of the secret key to a remote apparatus, e.g., in a headend, where the secret key is recovered based on at least the encrypted version of the secret key and data relating to that user or client device. The second device then receives from the head-end another encrypted version of the secret key, which is generated by encrypting the recovered secret key using a third cryptographic element (e.g., a public key in accordance with a public key algorithm) associated with the second device. Based on at least this second encrypted version of the secret key, the secret key can be recovered in the second device to decrypt the encrypted content.

The trusted domain is preserved with respect to the stored content so long as the content remains encrypted and continues to be managed under the above-described key management methodology, regardless of which device stores the content. Once the content itself is decrypted, e.g., by a conditional access (CA) mechanism when data is sent from the SDVR CPE to a television monitor for display, the decrypted content is no longer within the trusted domain.

Digital Rights Management (DRM) and Steganograhy

Another approach used to control the distribution and use of protected content within a content-based network is to employ so-called digital rights management (DRM). For example, Media rights management systems such as the Microsoft Windows® Media Digital Rights Manager (DRM), may be used as well. The Windows® Media Player Version 9 comprises audio and video codecs, the Windows Media Encoder, Windows Media Server, Windows Media Software Development Kit (SDK), Digital Rights Management (DRM) technology, and an extensibility model that allows integration into third-party solutions.

According to one such DRM approach, a digital media or content file is encrypted and locked with a "license key." The license key is stored in a license file or other data structure which is distributed separately from the media or content. A user can obtain the encrypted media file by, e.g., downloading it from a web site, purchasing it on a physical media, etc. To play the digital media file, the user must first acquire the license file including the license key for that media file. The user acquires the license key by accessing a pre-delivered license (which includes license terms or policies). Alternatively, when the user plays the file for the first time, a procedure is invoked for retrieving the license via a network connection or other delivery mode (e.g., the Internet). After obtaining the license with the license key, the user is able to access the media file according to the rules or rights specified in the license policies.

Another approach to DRM (see, e.g., the RealNetworks "Helix" Platform and Community approach) comprises encrypting a content file (typically performed by the system operator) to create a secured content file, thereby requiring a cryptographic key to access the content in the file. The key is included within a retailer's database, and the secured content file is distributed to users by, e.g., Internet connection or offline distribution of CDs. The retailer itself sets usage rules and policies for licensing the content. A user contacts the retailer's web server, such as via a trusted software client, in order to obtain a license to access the encrypted content. The retailer's web server requests certain rights from the operator's license server, the latter which creates a license containing the key for the requested content file. This license is given to the retailer (e.g. via the web server), which delivers the license to the trusted client of the user. The trusted client retrieves the content file, and uses the received key to access the content.

Related to DRM is the practice of steganography. Steganography is the art and science of including hidden data in such a way that no one apart from the intended recipient or sender knows of the existence of the data; this is in contrast to cryptography, where the existence of the data itself is not disguised, but the content is obscured. For example, digital steganographic data may included within the recorded data/content, such as digital watermarking data. For example, Digimarc®, SysCoP™, EIKONAmark™, and other similar commercially available watermarking approaches can be used for this purpose. While this approach does not per se prevent or control content access or distribution, it is often an effective post facto method of identification and determining the origin of media (e.g., where it was copied from), and hence knowledge of its presence can act as a significant deterrent to surreptitious reproduction and distribution.

Emerging Challenges and Opportunities

More recently, emerging technologies have focused on so-called "downloadable" conditional access systems (DCAS), which are intended to be implemented in next-generation two-way, cable-ready digital TV sets, set-top boxes and/or other related devices. This "download" approach would enable cable operators to download conditional access software directly to TV sets, set-top boxes and other digital entertainment devices in the subscribers' premises, and would be especially suited to interactive services such as VOD, PVR, etc. This would also obviate the physical CableCard form factor.

With the so-called FCC "navigation order" (Further Notice of Proposed Rulemaking ("FNPRM"), FCC 00-341, adopted Sep. 14, 2000; released Sep. 18, 2000) relating to, inter alia, the adoption of unidirectional plug and play, cable system operators are also required to support digital cable-ready devices on their systems. Downwloadable conditional access (CA) functionality is one proposed conditional access technology that also meets this requirement. In addition to the requirements imposed by FCC 03-225, it is also desirable to support bi-directional cable-ready devices on its systems, as well as "separable security" functionality (i.e., the CA functionality is physically, or at least logically) separable from the host device. Ideally, such enhanced functionality would also allow both basic bi-directional functions (so-called single-stream devices) as well as the use of more advanced multi-stream devices such as digital video recorders (DVRs). It is also desirable to allow download-enabled devices to participate (ad hoc or otherwise) in the operator's trusted domain (TD).

In recent years, numerous systems for providing interconnectivity among devices in a premises (e.g., home, enterprise, university, etc.) have been developed, allowing premises networks to include DSTBs, personal computers, cellphones, PDA devices, etc. Because of the increasing popularity of premises networking and the demand for seamless interconnectivity between heterogeneous hardware/software environments (e.g., "plug and play"), there is a growing need for a strategy that enables a user to perform authorized transfer of protected content, e.g., transferring content from their cable system CPE to other devices in a premises network, or even outside of the network, and at the same time prevent unauthorized distribution and reproduction of the protected content. The foregoing CA, DRM, steganographic, and trusted domain technologies, while providing some degree of protection, simply do not support such control and protection within the increasingly complex user domain.

Specifically, these techniques do not support cryptographic key management and distribution systems that operate with both legacy or new CA systems, and are not under direct network operator (e.g., MSO) control.

Moreover, such existing techniques often cannot be smoothly integrated with retail (third party) devices, and are typically quite platform specific. They are often also specific to the content delivery mode (i.e., VOD, broadcast, broadcast-switched, and other content delivery paradigms).

These techniques also typically will not support seamless transition between independent implementations of CA, trusted domain, and DRM security features and policies, and are not standardized to any significant degree. For example, conditional access (CA) paradigms currently in use are not generally extensible beyond the user's CPE. So, the user would be prohibited from transferring streamed or downloaded content to their WiFi enabled laptop or PC, since proper conditional access support does not exist in these devices.

Prior art conditional access (CA) systems such as the Scientific Atlanta "Powerkey" approach described above have no authentication entity or "proxy" that can authenticate CPE or other connected devices in anticipation of providing download services, no video (media) provisioning system, and hence by nature are highly localized. Generally speaking, any "trusted domains" that might be established are not extendable beyond the CPE 106 on the client side of the delivery network.

Thus, improved apparatus and methods for distributing digital services to and within a user premises are needed. Such improved apparatus and services would ideally provide users with a number of diverse digital services in a more integrated and unified fashion, and allow for substantially unrestricted cross-over between different hardware and software environments.

These apparatus and methods would also allow for remote, centralized management, configuration, and control of content access, distribution and reproduction within the user domain, as well as extension of the conditional access, trusted domain, and DRM environments outside of merely the user's set-top box or other such consumer premises equipment (CPE).

Moreover, such apparatus and methods would ideally support cryptographic key management and distribution systems that operate with both legacy or new CA systems, under direct network operator (e.g., MSO) control, as well as allowing for integration with retail (third party) devices via, e.g., downloadable components and cryptographic elements sent directly via the operator's network.

Such improved apparatus and methods would also ideally be delivery-mode agnostic; i.e., they would be compatible with VOD, broadcast, broadcast-switched, and other content delivery paradigms, and would further allow for an interoperable architecture with components from different network, secure component, and CPE vendors, in effect standardizing many aspects of content control within the user domain.

SUMMARY OF THE INVENTION

The present invention addresses the foregoing needs by disclosing apparatus and methods for distributing applications/software, programming, data, media and other information services in a controlled and protected manner within a content-based network, as well as devices or domains associated therewith.

In a first aspect of the invention, improved network apparatus is disclosed. In one embodiment, the network apparatus is disposed substantially at a first node of a content-based network and adapted for delivery of security information to a second node of the network. The apparatus comprises: a content provisioning apparatus; a conditional access apparatus in communication with the provisioning apparatus; and an authentication apparatus in communication with at least the conditional access apparatus. At least the authentication and conditional access apparatus are configured to cooperate to transmit to the second node both: (i) at least one cryptographic key, and (ii) encrypted code configured to provide at least protection of the content at the second node.

In one variant, the first node comprises a cable system head-end, and the second node comprises a residence or business enterprise.

In another variant, the apparatus is configured to deliver the at least one key and encrypted code via a DOCSIS-compliant cable modem.

In another variant, the apparatus is configured to deliver the at least one key and encrypted code via an in-band downstream QAM.

In another variant, the first node comprises a hub within a broadcast switched architecture (BSA) network.

In another variant, the network apparatus further comprises a personalization server (PS) apparatus in communication with the conditional access system, the PS being adapted to select at least one cryptographic key and encrypted code based at least in part on a communication received from a client device disposed at the second node. An interface to a trusted authority (TA) is also provided, the TA providing the at least one cryptographic key to the PS based at least in part on information contained in the communication from the client device to the network apparatus.

In yet another variant, the network apparatus further comprises a trusted authority proxy (TAP), the TAP in at least periodic communication with a remote trusted authority (TA), the TAP providing the at least one cryptographic key to the PS based at least in part on information contained in the communication from the client device to the network apparatus, and substantially independent of communication with the TA (or any intermediary device such as for example an authentication proxy).

In still another variant, the authentication apparatus comprises software configured to authenticate the client device based at least in part on the communication received from the client device, the authentication comprising a condition precedent for downloading of the at least one key and encrypted code.

In still another variant, the encrypted code comprises a secure client adapted to run on a security processor of the client device, and the network apparatus is further configured to transmit a bootloader program to run on the security processor to enable at least a portion of the transmitting of the cryptographic key and encrypted code. The network apparatus may further be configured to transmit second code to the client device, the second code comprising a conditional access (CA) client, the CA client adapted to run on the security processor to enforce at least one CA policy.

In a second embodiment, the network apparatus comprises: a content provisioning apparatus; a security management apparatus in communication with the provisioning apparatus; and an authentication apparatus in communication with at least the security management apparatus; wherein at least the authentication and security management apparatus are configured to cooperate to transmit to the second node encrypted code configured to manage at least one of (i) a trusted domain (TD) policies or configuration, and (ii) digital rights management (DRM) policies or configuration, within a client device disposed at the second node.

In one variant, the apparatus comprises a personalization server (PS) apparatus in communication with the security management system, the PS being adapted to select the encrypted code based at least in part on a communication received from a client device disposed at the second node, and the authentication apparatus comprises software configured to authenticate the client device based at least in part on the communication received from the client device, the authentication being required before downloading the encrypted code.

In another variant, the client device disposed at the second node comprises a premises content distribution apparatus for use with a plurality or media-capable devices, the content distribution apparatus comprising: a first interface capable of at least receiving media content from a first network; a mass storage device in data communication with the first interface and adapted to store at least a portion of the media content; a coaxial cable interface (or other wireline interface such as 802.3 CAT5 or AC power lines) configured to provide networking throughout at least a portion of the premises over coaxial cable present therein; and a wireless access interface adapted to support at least one wireless network substantially within the premises. The media content is accessible to users on both the coaxial cable network and the at least one wireless network.

In another variant, the encrypted code comprises a secure client adapted to run on a security processor of the client device. The network apparatus is further configured to transmit a bootloader program to run on the security processor to enable at least a portion of the transmitting of the encrypted code and a cryptographic key, and to transmit second code to the client device, the second code comprising a TD or DRM client, the TD or DRM client adapted to run on the security processor to enforce at least one TD or DRM policy, respectively and to a log to the network apparatus, where the log comprises records of the TD or DRM client enforcing at least one TD or DRM policy.

In another variant, the encrypted code configured to manage the policies and configuration is further configured to have at least two portions, a first portion being common to a plurality of locations within the content-based network, and a second portion being unique to a particular location at which the client device is located.

In a second aspect of the invention, a method of operating a security management architecture within a content-based network is disclosed. In one embodiment, the method comprises: providing an encrypted software image to a client device; providing a first cryptographic key to the client device; using the first cryptographic key to enable decryption of the software image; providing at least a second cryptographic key to the client device; and using the second key to decrypt encrypted content delivered to the client device.

In one variant, the act of providing at least a second key comprises providing a second key and a third key, the third key being used to decrypt the second key. The second key comprises an encrypted key; the third key comprises an encrypted portion of a public-private key pair; and the method further comprises providing the client device with a private portion of the public-private key pair, the private portion being used to decrypt the third key, the third key being used to decrypt the encrypted second key.

In another variant, the act of providing a first key comprises providing an encrypted public portion of a public/private key pair, and the method further comprises: providing the client device with a private portion of the public/private key pair; and decrypting the encrypted public portion using the private portion.

In another variant, at least one of the first and second keys is encrypted using a symmetric block cipher algorithm. Similarly, the software image may be encrypted using a symmetric block cipher algorithm comprising a power-of-two key.

In a third aspect of the invention, a method of operating a security management architecture within a content-based network is disclosed. In one embodiment, the method comprises: providing an encrypted software image to a client device having a security processor; providing a first cryptographic key to the client device; using the first cryptographic key to enable decryption of the software image; and configuring at least a portion of the security processor of the client device using at least the decrypted software image.

In one variant, the act of providing a first key comprises providing an encrypted public portion of a public/private key pair, and the method further comprises: providing the client device with a private portion of the public/private key pair; and decrypting the encrypted public portion using the private portion.

In another variant, the act of configuring comprises remotely configuring based at least in part on instructions generated remote from the client device, and the client device comprises an OCAP-compliant digital set-top box, and the acts of providing comprise transmitting the software image and the first key over a hybrid fiber-coax (HFC) network to the client device using a DOCSIS channel for at least one of the image and the first key. The act of providing an encrypted software image to a client device comprises providing at least one of a conditional access (CA), digital rights management (DRM), or trusted domain (TD) client to a secure processor of the set-top box, the at least one client being adapted to enforce at least one security policy within the set-top box.

In a fourth aspect of the invention, network security apparatus adapted for transmission of security information to an authenticated client device in data communication with the network is disclosed. In one embodiment, the apparatus comprises: a security management apparatus adapted for communication with the network; and an authentication apparatus in communication with at least the security management apparatus. The authentication and security management apparatus are configured to cooperate to transmit to the authenticated client device: (i) a portion of a public-private key pair, the client device comprising the other portion of the key pair; and (ii) encrypted code configured to manage at least one aspect of a security architecture within a client device. The public-private key pair is configured to decrypt the encrypted code.

In one variant, the apparatus further comprises a trusted authority proxy, the proxy in data communication with the security management apparatus and configured to securely communicate with a remote trusted authority.

In another variant, the at least one aspect comprises security policies relating to distributing content delivered to the client device to one or more secure output domains (SODs).

In still another variant, the authentication apparatus is configured to communicate with a physically secure processor of the client device in order to authenticate the client device.

In a fifth aspect of the invention, a method of remotely providing a trusted domain for content protection within a premises having a client device is disclosed. In one embodiment, the method comprises: transmitting encrypted software to the client over a network; transmitting a first decryption key to the client device; using a second decryption key to access the first decryption key; using the first decryption key to decrypt the software; and using the software to establish at least a portion of the trusted domain within the client device. Using this method, content can be securely transported within the trusted domain.

In one variant, the encrypted software comprises a trusted domain (TD) client program, the TD client being adapted to run on a physically secure microprocessor within the client device, the TD client establishing a plurality of security and content distribution policies within the trusted domain, the policies and the trusted domain cooperating to prevent unauthorized reproduction of the content. The encrypted software further comprises a conditional access (CA) client program, the CA client being adapted to run on a physically secure microprocessor within the client device, the CA client establishing a plurality of content access policies within the trusted domain, the access policies and the trusted domain cooperating to prevent unauthorized access to the content.

In a sixth aspect of the invention, security apparatus for use with a content-based network is disclosed. In one embodiment, the apparatus comprises: client-side security management apparatus in operative communication with the network and adapted to maintain at least a portion of a trusted domain within a client device; and network security management apparatus in operative communication with the network and the client-side management apparatus, the network security management apparatus adapted to control at least one of the configuration and operation of the client-side apparatus in order to protect content delivered to the client device against unauthorized distribution or reproduction.

In one variant, the network security management apparatus comprises: a content provisioning apparatus; a conditional access apparatus in communication with the provisioning apparatus; and an authentication apparatus in communication with at least the conditional access apparatus; wherein the authentication, provisioning and conditional access apparatus are configured to cooperate to transmit to the client device both: (i) at least one cryptographic key, and (ii) encrypted code configured to provide at least protection of the content at the client device. The client-side security management apparatus comprises: a physically secure microprocessor adapted to run the encrypted code after decryption thereof, the encrypted code enforcing at least a portion of a plurality of security policies necessary to maintain the trusted domain; wherein the physically secure microprocessor further comprises: a bootloader function adapted to cause authentication of the secure microprocessor with the authentication apparatus; and a conditional access (CA) client adapted to interface with the conditional access apparatus on the network side in order to establish one or more conditional access policies with respect to the content.

In a seventh aspect of the invention, a method of doing business over a content-based network is disclosed. In one embodiment, the method comprises: identifying a plurality of substantially unique client devices in data communication with the network; and selectively configuring at least one of the plurality of client devices based at least in part on a service request from a subscriber associated with the at least one device, the selective configuration comprising: generating personalization data specific to the at least one client devices; transmitting the data to the at least one client device; and establishing at least one security permission or policy within the at least one client device, the at least one permission or policy enabling provision of the requested service.

In one variant, the service request comprises part of a feature offered within only selected levels of a network operator service subscription plan.

In another variant, the service request comprises a request for download and distribution of protected content to a second device in data communication with the client device. The distribution of protected content to a second device in data communication with the client device comprises distribution of encrypted video content to the second device via e.g., a Firewire (IEEE-1394) interface.

Alternatively, distribution of protected content to a second device in data communication with the client device comprises distribution of encrypted video content to the mobile device via e.g., a WiFi (IEEE-802.11) interface.

In another variant, the act of generating personalization data comprises generating an encrypted software image and cryptographic key that is unique to the at least one client device.

In an eighth aspect of the invention, a method delivering secure software over a network to a remote client device is disclosed. In one embodiment, the method comprises: providing via a first entity device credentials along with the public key for the client device to a second entity; returning a client device-specific personalized software image to the first entity from the second entity; returning a common software image to the first entity from the second entity; encrypting at least the device-specific image for the specific client device based at least in part on the public key; and sending via the first entity the encrypted device-specific image and the common image.

In one variant, the first entity comprises an authentication proxy, and the second entity comprises a personalization server. The public key corresponds to a private key retained within the client device, the private key being adapted to decrypt the encrypted at least device-specific image.

In another variant, the common image comprises an image applicable to all of a plurality of client devices having a common configuration and disposed within the network, and the device-specific image is specific to only the remote client device.

In a ninth aspect of the invention, improved network apparatus for software downloading is disclosed. In one embodiment, the apparatus comprises: a common image server; and a device-specific image server. The apparatus is adapted to securely obtain and deliver a device-specific software image, as well as a common software image, to at least a target client device, the common image being applicable to all of a plurality of client devices having a common configuration and disposed within a network, and the device-specific image being specific to only the target client device.

In one variant, the apparatus is adapted to communicate over the network with a secure entity disposed on the target device, at least the device-specific image being adapted to run within a software environment of the secure entity in order to enforce one or more security policies within a domain associated with the target device. The network comprises a content-based delivery network, and the target device comprises an OCAP-compliant premises device having a cable modem and an RF tuner, the cable modem being used to receive at least a portion of the device-specific image.

In another variant, the content-based delivery network comprises a cable television network, and the cable modem comprises a DOCSIS gateway (DG) function having a plurality of individual logical tunnels associated therewith, at least one of the tunnels being used to deliver the at least a portion of the device-specific image.

In a tenth aspect of the invention, network apparatus for use in providing secure content and software downloads to a plurality of client devices within a cable television network is disclosed. In one embodiment, the apparatus comprises: secure download infrastructure adapted for data communication with a trusted authority (TA); a media provisioning system in data communication with the infrastructure; a billing system in data communication with the provisioning system; a media security system in data communication with the provisioning system; and a media services system in data communication with the provisioning system. The secure download infrastructure and the TA cooperate to provide cryptographic elements and at least one secure client device software image for delivery by the infrastructure to the client devices; and the provisioning system and the security system determine and apply entitlements for selected ones of the client device in order to authorize providing the cryptographic elements and the at least one software image thereto.

These and other aspects of the invention shall become apparent when considered in light of the disclosure provided herein.

BRIEF DESCRIPTION OF THE DRAWINGS

FIG. 3i is a functional block diagram of one exemplary embodiment of cable television network having multiple network regions, including a distributed SDS, according to the invention.

FIG. 3l is a logical block diagram of one exemplary embodiment of the personalization server (PS) of the SDS architecture of the invention, showing various messaging and interfaces to and from the PS.

FIG. 3n is a logical block diagram of one exemplary embodiment of the SDS provisioning system (SPS), showing various messaging and interfaces to and from the SPS.

FIG. 3o is a logical flow diagram illustrating one exemplary embodiment of common and personalized software information exchange across the IXI software interface.

DETAILED DESCRIPTION OF THE INVENTION

Figure 1:
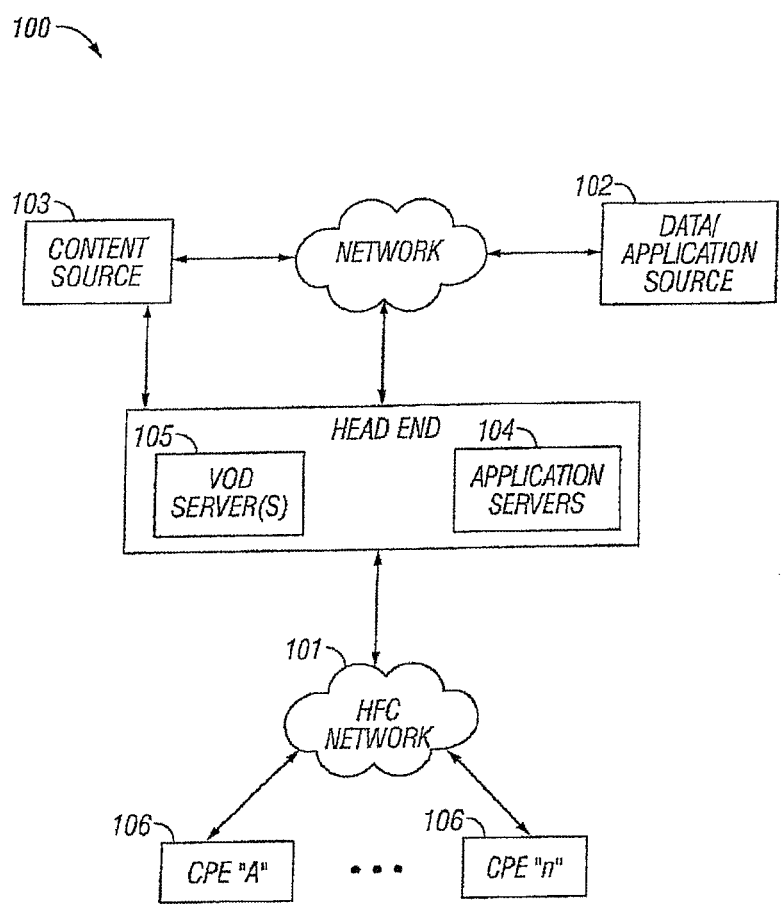
FIG. 1 is a functional block diagram illustrating an exemplary HFC cable network configuration useful with the present invention.

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, personal media devices (PMDs), such as for example an iPod™, or Motorola ROKR, and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AC-3 (audio), DiVX, XViD/ViDX, Windows Media Video (e.g., WMV 7, 8, or 9), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

As used herein, the term "conditional access" refers to any access control scheme, whether implemented in hardware, software, or firmware (or combinations thereof), including without limitation members of the "Powerkey" family, NDS (including VideoGuard, mVideoGuard, etc.), DVB, and Motorola/General Instrument DigiCipher® family (DigiCipher II, etc.). These can be implemented using, for example, CA-specific hardware/software elements embedded in the device, the so-called "CableCard" plug-in security module access technology, a downloadable CA system (DCAS), or otherwise.

The terms "Customer Premises Equipment (CPE)" and "host device" refer to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes such electronic equipment such as set-top boxes (e.g., DSTBs), televisions, cable modems (CMs), embedded multimedia terminal adapters (eMTAs), whether stand-alone or integrated with other devices, Digital Video Recorders (DVR), gateway storage devices (Furnace), and ITV Personal Computers.

As used herein, the term "database" refers generally to one or more tangible or virtual data storage locations, which may or may not be physically co-located with each other or other system components.

As used herein, the term "display" means any type of device adapted to display information, including without limitation CRTs, LCDs, TFTs, plasma displays, LEDs, incandescent and fluorescent devices. Display devices may also include less dynamic devices such as, for example, printers, e-ink devices, and the like.

As used herein, the term "DVI" (digital video interface) refers generally to any type of interface (e.g., hardware and/or software) adapted to provide interface and/or conversion between different formats or domains, including without limitation interfaces compliant with the Digital Display Working Group (DDWG) DVI specification (e.g., DVI-A, DVI-D, and DVI-I). For example, using a DVI connector and port, a digital signal sent to an analog monitor is converted into an analog signal; if the monitor is digital, such as a flat panel display, no conversion is necessary. A DVI output is an option in OpenCable compliant hardware that provides a high-definition TV (HDTV) output which includes copy protection.

As used herein, the term "DVR" (digital video recorder) refers generally to any type or recording mechanism and/or software environment whereby content sent over a network can be recorded and selectively recalled. Such DVR may be dedicated in nature, or part of a non-dedicated or multi-function system.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "head-end" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional head-ends may be in the same or different cities.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the terms "network agent" and "network entity" refers to any network entity (whether software, firmware, and/or hardware based) adapted to perform one or more specific purposes. For example, a network agent or entity may comprise a computer program running in server belonging to a network operator, which is in communication with one or more processes on a CPE or other device.

As used herein, the term "node" refers without limitation to any location, functional entity, or component within a network.

As used herein, the term "QAM" refers to modulation schemes used for sending signals over cable networks. Such modulation scheme might use any constellation level (e.g. QPSK, QAM-16, QAM-64, QAM-256 etc.) depending on details of a cable network. A QAM may also refer to a physical channel modulated according to said schemes.

As used herein, the term "network interface" refers to any signal, data, or software interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a,b,g,n), WiMAX (802.16), PAN (802.15), or IrDA families.

As used herein, the term "personalization" refers generally and without limitation to data, cryptographic elements, and/or code downloaded or otherwise provided to a target device or domain (e.g., host) to create a desired security environment or policies for operation on or with a particular network system.

As used herein, the term "server" refers to any computerized component, system or entity regardless of form which is adapted to provide data, files, applications, content, or other services to one or more other devices or entities on a computer network.

As used herein, the term "user interface" refers to, without limitation, any visual, graphical, tactile, audible, sensory, or other means of providing information to and/or receiving information from a user or other entity.

As used herein, the term "WiFi" refers to, without limitation, any of the variants of IEEE-Std. 802.11 or related standards including 802.11a/b/g/n.

As used herein, the term "wireless" means any wireless signal, data, communication, or other interface including without limitation WiFi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

In one salient aspect, the present invention comprises a network architecture that provides for enhanced conditional access (CA), trusted domain (TD), and digital rights management (DRM) capabilities. This network architecture comprises apparatus useful at, inter alia, the head-end or distribution hub of a cable network, for implementing a download paradigm for legacy or newly developed CA, TD, and DRM software and cryptographic protection schemes. This allows the network operator, and even the third party content provider by proxy, to exert additional control on viewing, reproduction, and migration of content distributed over the network.

In one embodiment, these enhanced capabilities comprise downloadable software modules (images), and an associated decryption key that facilitates decryption of the downloaded software images. In contrast to prior art approaches of merely encrypting the content itself (such as via a DES or AES algorithm via a symmetric or asymmetric key approach), the exemplary embodiments of the present invention allow for the download of secure software images, which may be used to, inter alia, ensure security of the downloaded images and also migrate protected content to other platforms in the user or client domain so as to extend the "trusted domain".

Advantageously, the architecture of the present invention provides for securing of the CA, TD, and DRM Client software as opposed to merely the delivered content. Specifically, outside of the conditional access system (CAS), the software of the present invention is never rendered in an unprotected form or otherwise made accessible. This is of particular significance from the standpoint that protection of the software is typically of much greater commercial interest and value to the network operator than the content itself. Stated differently, not only is the delivered content highly secure, but also the mechanisms used to control and access the content within the user domain.

Other benefits of the "download" approach described herein include: (i) operation with both new and legacy CAS systems including DVB-CSA CAS proprietary systems; (ii) ability to be readily integrated with retail and OEM products; (iii) reduction of security costs associated with CAS implementation (i.e., by avoiding the capital expenditures and operating costs associated with purchasing, installing and maintaining CableCards or similar implementations); use of state-of-the-art security hardware and software, thereby enhancing protection of MSO and third party content provider investments; (v) centralized control of key generation and distribution by network operators (e.g., MSO's); and (vi) flexibility that allows for deployment of broadcast, VOD, TD, and DRM security solutions from multiple vendors.

Moreover, the secure download approach of the present invention allows for ready implementation of future security upgrades such as improved encryption algorithms and new CAS, TD, or DRM technologies.

Another primary feature of the secure download architecture of the present invention is the creation of a system that is substantially consistent or symmetric with respect to both leased and retail client devices or CPE. Devices that are connected to the operator's network utilize a prescribed process to ensure that the client device's download "host" has the correct software and cryptographic elements (e.g., keying) for operation on that network, regardless of whether the device comprises a lease or retail installation. The exemplary processes described herein advantageously cause client device hosts with inappropriate or no such software or cryptographic elements to acquire these components from the network securely. This approach allows for substantial ubiquity for both leased and retail devices on the network, and at a competitive cost.

The secure download architecture of the present invention can serve a variety of security environments and configurations ranging from the most basic (e.g., a low-end digital video service), to a high-end, multi-play environment with digital video, digital recording, multimedia, and data services. These environments can also include the ability to decrypt video delivered by the MSO, encrypt and decrypt content stored onto or retrieved from a hard drive (e.g., for PVR devices which require DRM), and decrypt and encrypt content delivered to or being sent from the TD.

In the exemplary embodiment, the network portion of the architecture (disposed, e.g., the cable network head-end or BSA hub) comprises an authentication proxy (AP), conditional access (CA) system, and media provisioning system (MPS). A personalization server (PS) is used in conjunction with the system to provide "personalization" to the client device(s), including providing the aforementioned software and cryptographic element (e.g., key) management download functions previously described. The aforementioned network portion of the architecture provides other security features as well, including client device and network authentication, and processing of security services (e.g., for OCAP applications in the exemplary cable television network context).

An exemplary security download and initiation protocol consisting of a series of messages that are used to, inter alia, (i) identify, (ii) authenticate, (iii) download, (iv) install, (v) run, and (vi) monitor the installation and status of, the secure image on the CPE are also described.

DETAILED DESCRIPTION OF EXEMPLARY EMBODIMENTS

Exemplary embodiments of the apparatus and methods of the present invention are now described in detail. While these exemplary embodiments are described in the context of the aforementioned hybrid fiber coax (HFC) cable system architecture having an multiple systems operator (MSO), digital networking capability, and plurality of client devices/CPE, the general principles and advantages of the invention may be extended to other types of networks and architectures, whether broadband, narrowband, wired or wireless, or otherwise, the following therefore being merely exemplary in nature.

It will also be appreciated that while described generally in the context of a consumer (i.e., home) end user domain, the present invention may be readily adapted to other types of environments (e.g., commercial/enterprise, government/military, etc.) as well. Myriad other applications are possible.

It is further noted that while described primarily in the context of a cable system with 6 MHz RF channels, the present invention is applicable to literally any network topology or paradigm, and any frequency/bandwidth, such as for example 8 MHz channels. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems.

Also, while certain aspects are described primarily in the context of the well-known Internet Protocol (described in, inter alia, RFC 791 and 2460), it will be appreciated that the present invention may utilize other types of protocols (and in fact bearer networks to include other internets and intranets) to implement the described functionality.

Network—

FIG. 1 illustrates a typical content-based network configuration with which the secure download apparatus and methods of the present invention may be used. The various components of the network 100 include (i) one or more data and application origination points 102; (ii) one or more content sources 103, (iii) one or more application distribution servers 104; (iv) one or more VOD servers 105, and (v) consumer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the head-end architecture of FIG. 1a (described in greater detail below) may be used.

The data/application origination point 102 comprises any medium that allows data and/or applications (such as a VOD-based or "Watch TV" application, or other application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104 or other network entity. Exemplary embodiments of the CPE of the invention are described subsequently herein with respect to FIG. 5.

Figure 1A:
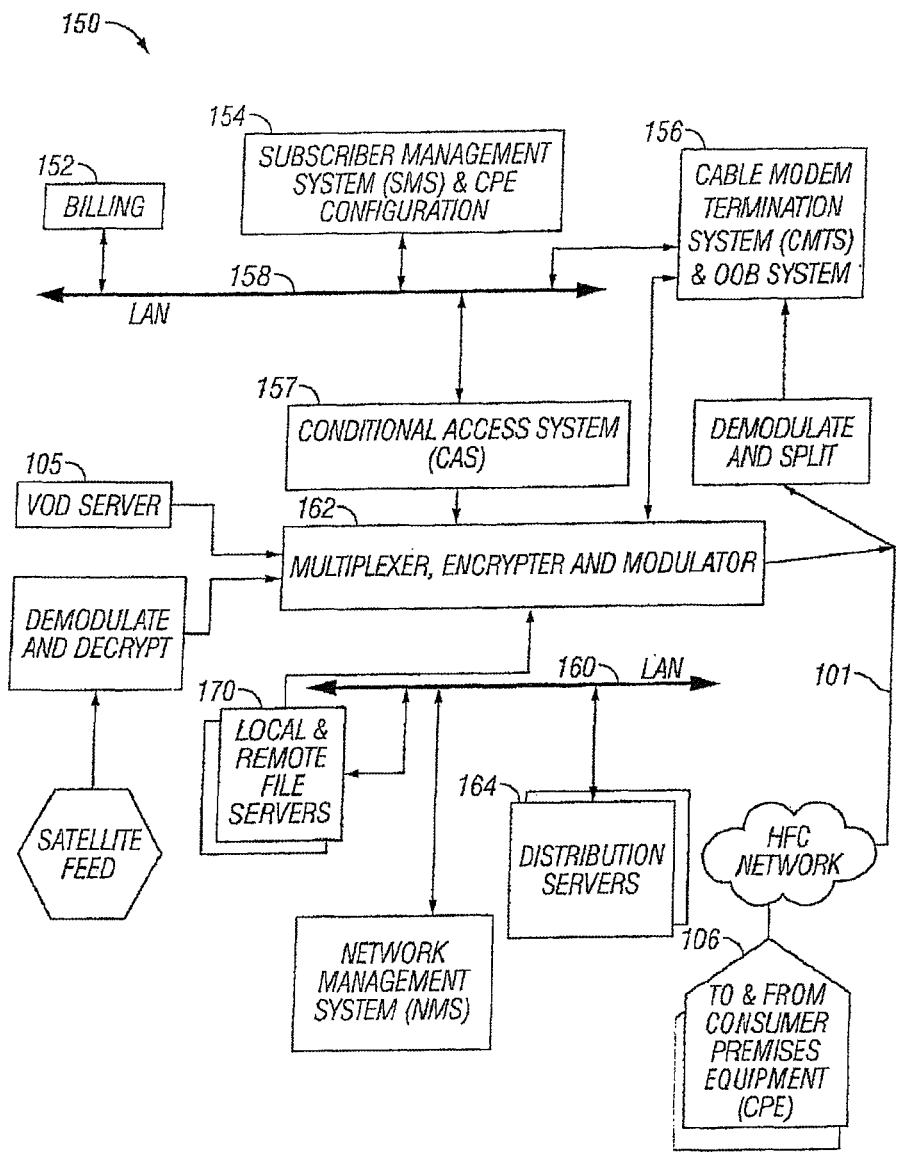
FIG. 1a is a functional block diagram illustrating one exemplary HFC cable network head-end configuration useful with the present invention.

Referring now to FIG. 1a, one exemplary embodiment of a generic network head-end architecture useful with the present invention is described. As shown in FIG. 1a, the head-end architecture 150 comprises typical head-end components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the head-end configuration depicted in FIG. 1a is high-level, conceptual architecture and that each MSO may have multiple head-ends deployed using custom architectures (see, e.g., FIGS. 3e-3n and associated discussion presented subsequently herein).

The architecture 150 of FIG. 1a further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the head-end must be adapted to acquire the information for the carried channels from various sources. Typically, the channels being delivered from the head-end 150 to the CPE 106 ("downstream") are multiplexed together in the head-end and sent to neighborhood hubs (FIG. 1b) via a variety of interposed network components.

Content (e.g., audio, video, etc.) is provided in each downstream (in-band) channel associated with the relevant service group. To communicate with the head-end or intermediary node (e.g., hub server), the CPE 106 may use the out-of-band (OOB) or DOCSIS channels and associated protocols. The OCAP 1.0, 2.0, 3.0 (and subsequent) specifications provide for exemplary networking protocols both downstream and upstream, although the invention is in no way limited to these approaches.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

Figure 1B:
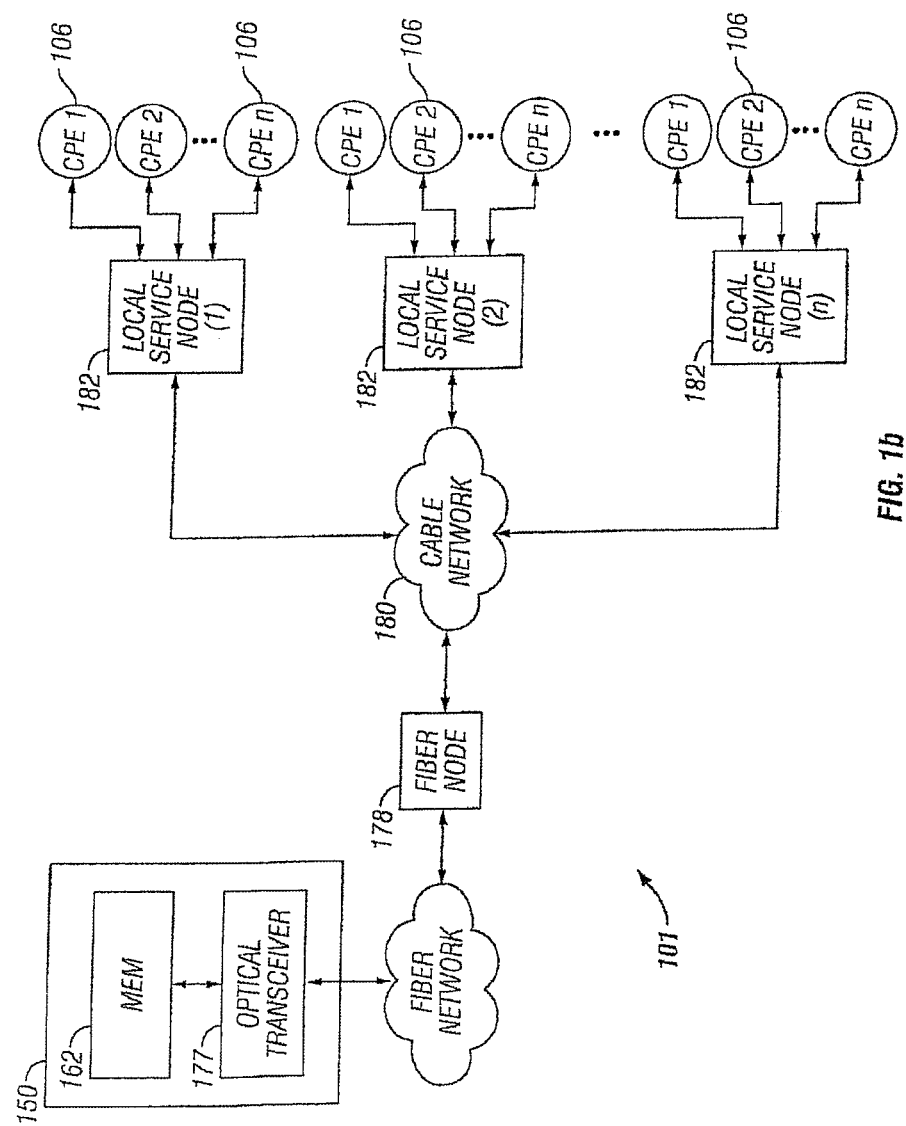
FIG. 1b is a functional block diagram illustrating one exemplary local service node configuration useful with the present invention.

As shown in FIG. 1b, the network 101 of FIGS. 1 and 1a comprises a fiber/coax arrangement wherein the output of the MEM 162 of FIG. 1a is transferred to the optical domain (such as via an optical transceiver 177 at the head-end or further downstream). The optical domain signals are then distributed to a fiber node 178, which further distributes the signals over a distribution network 180 to a plurality of local servicing nodes 182. This provides an effective 1:N expansion of the network at the local service end.

"Switched" Networks—

Figure 1C:
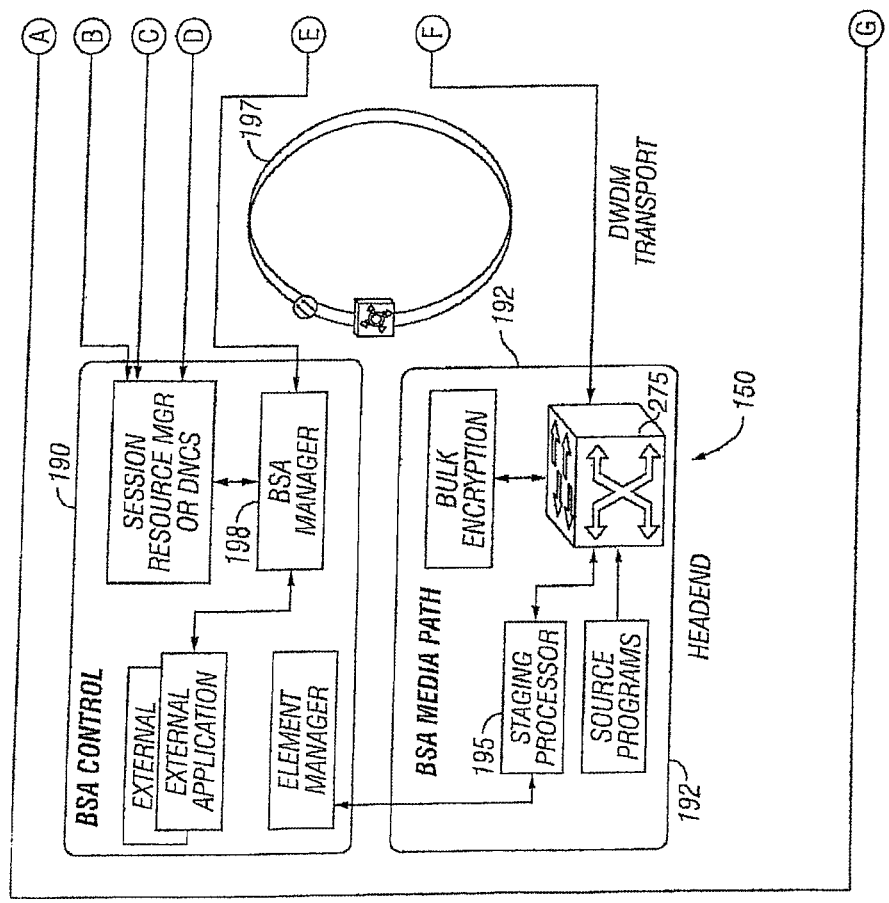
FIG. 1c is a functional block diagram illustrating one exemplary broadcast switched architecture (BSA) network useful with the present invention.
Figure 1C:
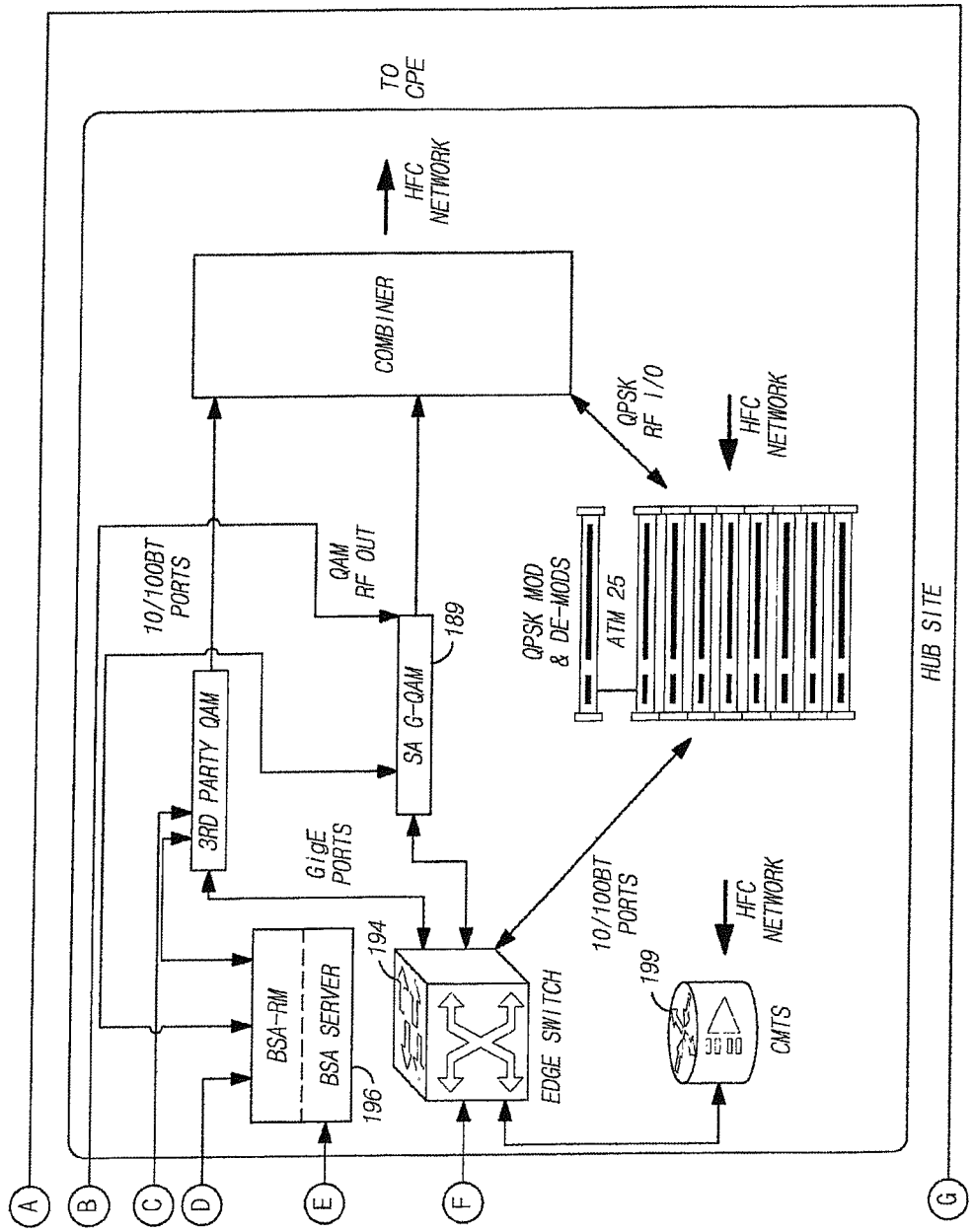

FIG. 1c illustrates an exemplary "switched" network architecture also useful with the secure download system (SDS) of the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1c shows the implementation details of one exemplary embodiment of this broadcast switched network architecture. Specifically, the head-end 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the head-end). An optical transport ring 197 is utilized to distribute the dense wave-division multiplexed (DWDM) optical signals to each hub in an efficient fashion.

Co-owned and co-pending U.S. patent application Ser. No. 09/956,688 filed Sep. 20, 2001 and entitled "Technique For Effectively Providing Program Material In A Cable Television System", now U.S. Pat. No. 8,713,623, which is incorporated herein by reference in its entirety, describes one exemplary broadcast switched digital architecture useful with the present invention, although it will be recognized by those of ordinary skill that other approaches and architectures may be substituted.

In addition to "broadcast" content (e.g., video programming), the systems of FIGS. 1a-1c also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem.

Referring again to FIG. 1c, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPEs. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Network Security Download Apparatus and Methods—

Figure 2:
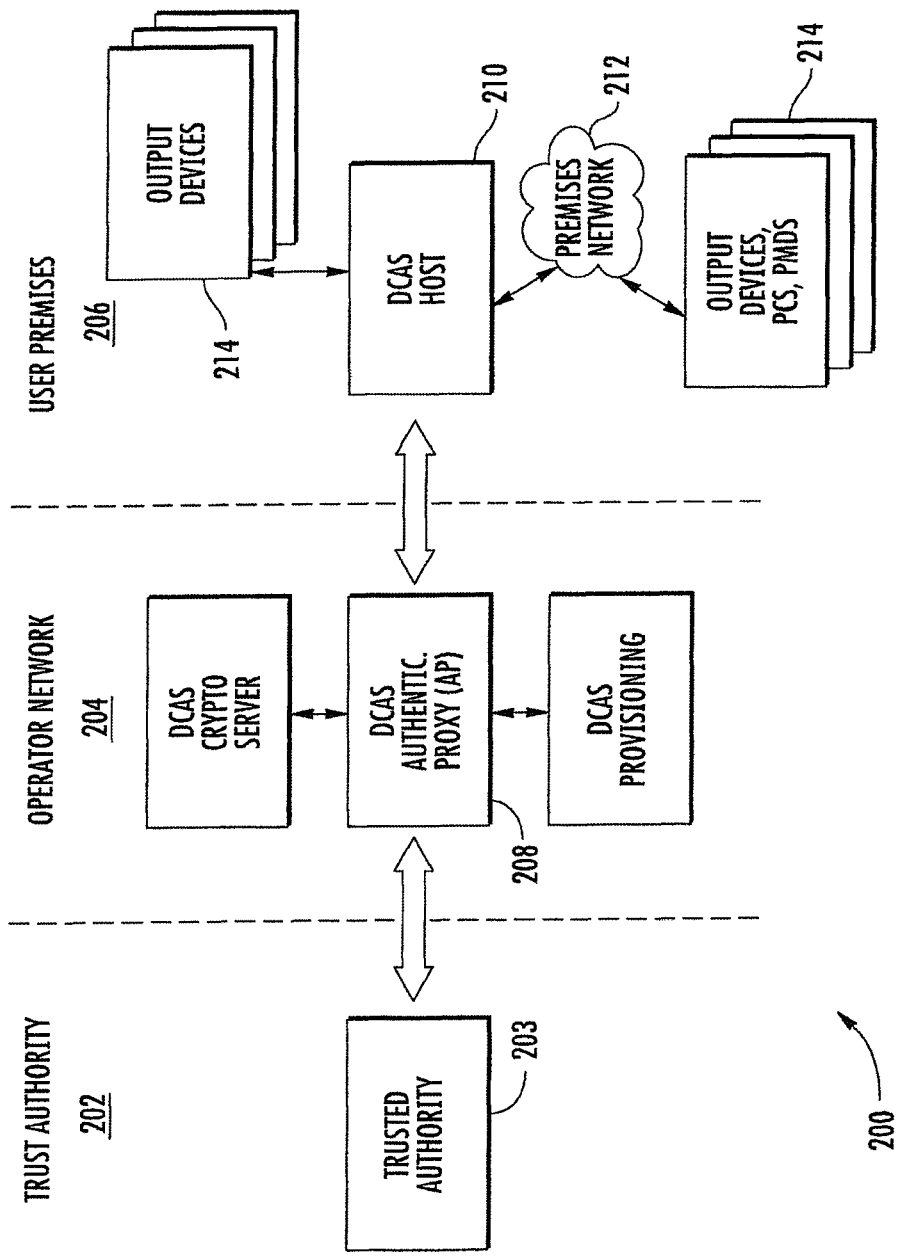
FIG. 2 is a graphical representation of a generalized security management architecture according to the invention, comprising trusted authority, operator network, and user domains.

Referring now to FIG. 2, a generalized model of the security download architecture useful with the present invention is described. As used herein, the term "security architecture" is meant to encompass an environment adapted to accommodate at least: (i) CA requirements and policies; (ii) TD requirements and policies; and/or (iii) DRM requirements and policies. For the sake of illustration, exemplary embodiments of the architecture will be described primarily in terms of a conditional access (CA) security environment, although the principles described are readily adapted to DRM and TD applications as well.

Moreover, while many of the exemplary embodiments describe obtaining information from a head-end server, TA, or other such entity, the present invention also contemplates the use of other sources of such information including, without limitation, peer devices within or outside of the network, or intermediary nodes in the content distribution network.

As shown in FIG. 2, this generalized model 200 comprises three primary domains; i.e., (1) a trust authority domain 202; (2) a network operator domain 204; and (3) a user domain 206. Various entities within these domains are in communication with one another in order to effectuate the desired functions of the downloadable CA (e.g., "DCAS"), TD, and/or DRM environments.

Central to the present invention is the concept of a "trusted domain" or TD. As previously described, such a "trusted domain" (TD) comprises an area (physically or virtually) within which programming or other content is protected from unauthorized access, distribution and copying. For example, in a cable network, a trusted domain may include not only the network portion where programming content traditionally is secured by, and within total control of, a cable operator (including, e.g., the head-end 150, HFC delivery network 101, etc.,) but also user devices or CPE 106 at subscribers' premises which are capable of receiving and securely storing programming content. Using the trusted domain approach, the network operator can guarantee certain subscriber access, distribution, and usage policy enforcement with respect to content held within the domain. For example, a digital representation of a movie held within an operator's TD (e.g., on a hard drive of a user device) cannot be distributed over the Internet, wireless network, etc. in viewable form, and cannot become a source for duplication of multiple viewable copies.

Exemplary apparatus and methods for implementing a "trusted domain" are described in co-owned and co-pending U.S. patent application Ser. No. 11/006,404 previously incorporated herein, although it will be appreciated that other approaches may be used with equal success consistent with the present invention.

In another variant of the invention the TD comprises a so-called "authorized service domain" or ASD. One exemplary embodiment of an authorized service domain useful with this variant is described in the document "DCAS Authorized Service Domain", Version 1.2, dated Nov. 30, 2005, which is incorporated herein by reference in its entirety. In this embodiment, the ASD comprises a domain where content is secured using the mechanisms available through the operator's conditional access system. For example, in a subscriber's home, the ASD physically translates into a collection of one or more trusted devices where content may be securely stored and moved within the domain. The distinction between the exemplary ASD and other forms of copy protection (e.g., DTCP) relates primarily to the fact that the content remains under operator control at all times. The control point within the ASD is the personalized secure microprocessor (SM). Hence, the ASD acts effectively as an extension of the operator's Conditional Access (CA) system.

It will be recognized that on the client side, the TD established within a target device (e.g., CPE 106) is not necessarily coextensive with the CPE 106 itself. For example, only certain portions of the CPE will be secure and suitable for maintaining the integrity of the protected content, and others (such as the analog output interface to a non-protected output domain or NSOD as described subsequently herein) not comprising part of the TD.

Referring again to FIG. 2, the trusted authority domain 202 generally comprises a Trusted Authority (TA) 203. The TA provides a secure keying and programming environment for selected client devices on the network. The Trusted Authority tracks and communicates keys and keying information for all authorized download system components.

The network operator domain 204 generally comprises an authentication proxy (AP) 208 or agent 208, which communicates with the TA 203 in order to authenticate itself, and obtain the aforementioned keys and information that that is required to authenticate itself to the secure microprocessor (SM) described subsequently herein. The AP also communicates with the user domain 206 (e.g., with the secure download system (SDS) host 210 in the client device) in order to authenticate the client device (host) and download secure software images and cryptographic elements (e.g., keys) used in establishing the security domain and policies within the client device.

The user domain 206 comprises for example a user premises (e.g., residence or enterprise), including the user's host 210 and client device or CPE 106. Note that the SDS host 210 comprises a network security "entity" that may be coincident or separate from the physical implementation of the client device 106; the two may not be coextensive. For example, the host 210 may generically include the CPE 106 and any other devices that are compliant to the security download specifications and requirements.

The client device may take any number of forms, including for example a set-top box (e.g., DSTB), a converged device or "hive" such as that described in co-pending U.S. patent application Ser. No. 11/378,129 filed Mar. 16, 2006 entitled "Methods And Apparatus For Centralized Content And Data Delivery", now U.S. Pat. No. 8,347,341, which is incorporated herein by reference in its entirety, a wireless satellite receiver, or even a mobile wireless device in direct or indirect data communication with the operator network domain 204 and the AP 208. See, e.g., co-owned and co-pending U.S. patent application Ser. No. 11/258,229 entitled "Method And Apparatus For On-Demand Content Transmission And Control Over Networks" filed Oct. 24, 2005, now U.S. Patent Application Publication No. 2007/0094691, which is incorporated herein by reference in its entirety, wherein media can be streamed between a mobile unit and user CPE 106, including optionally in an on-demand or session-based fashion. Accordingly, the present invention contemplates that the trusted domain and CA/DRM control can be exerted over several interconnected networks, including those outside of the MSO or user domain (e.g., a WSP or CSP network and radio area network (RAN) associated with the mobile device).

Similarly, so called "personal media devices" (PMDs) are contemplated to be used to form part of the trusted domain within the user domain. In one exemplary embodiment, the PMD comprises a video or other personal media device having multimedia capability, and which can include a secure microprocessor (SM) and other necessary components to authenticate to the CPE (acting as an AP proxy) or directly with the AP 208, and receive CA/DRM/TD client images as well as cryptographic elements such as secure microprocessor encryption or signaling keys (SMEK and SMSK). For example, the PMD could act as either a) another DCAS device to which individual clients could be downloaded, or b) an acceptable trusted domain interface that allows TD content to be played on the player of the PMD.

In one variant, the user domain 206 of FIG. 2 comprises a residence. In addition to or in place of a traditional CAT-5 Ethernet twisted pair wiring configuration, the user's indigenous residence coaxial cabling, telephone wiring, or even low-frequency electrical wiring (e.g., HomePlug) may be used as a basis of forming a LAN within the residence. Similarly, the client device (or apparatus in communication therewith) may comprise a wireless interface or gateway, so that residence users are free to "roam" within or even outside the residence while maintaining connectivity to the MSO network. As will be described below in greater detail, the secure or "trusted" domain established by the present invention within the user premises may extend to devices which are not physically connected to the CPE 106 or other client device that is in direct communication with the AP. This underscores on salient advantage of the present invention over prior art CA and similar network security systems; i.e., the ability to extend the domain within which the protected content may safely reside outside of the CPE 106 itself, thereby giving the user and network operator significant flexibility in providing new and enhanced services and features without jeopardizing content security.

It will be recognized that while the user domain 206 of FIG. 2 is illustrated as a generally fixed, single location, the user domain according to the present invention may in fact: (i) comprise multiple different physical locations, such as for example in the case of an enterprise, wherein the host device 210 acts as a gateway to a premises network 212 (e.g., corporate LAN, WAN, internet) serving multiple different locations or offices of that enterprise. Furthermore, these one or more locations need not be fixed, but rather may also vary as a function of time. For example, as previously described, the host 210 may act as a portal or gateway to a wireless network (e.g., WiFi, WiMax, etc.) that places the user(s), e.g., members of a given family in communication with the host 210 via their mobile wireless devices. A cable modem (e.g., DOCSIS) may also be used to provide internet connectivity to the premises (and hence the host 210), such that remote users/family members can access the host, and even devices connected thereto (such as DVRs, etc.) via their internet connection (at a remote site) and via the cable modem.

In another embodiment of the of the user domain, a personal video encoder (PVE) or comparable device is used as part of or is in communication with the DCAS host 210 (or an associated client device coupled thereto). For example, the "Slingbox" device manufactured by Sling Media of San Mateo, Calif. is one such exemplary device which is capable of enabling a user to watch TV programming from various locations via an Internet-connected PC or similar device. The device is generally connected between the subscriber's cable/satellite video drop and DSTB, and has a TV tuner inside. The user tunes to a given channel, and the device encodes the video streamed over the cable/satellite in Windows Media or similar format. The encoded content is streamed to a client application on a TD-enabled Windows XP-based or similar PC via an IP network such as the Internet, and hence the user can view the data locally (i.e., at the same premises) or remotely so long as they have access to the IP distribution network. This functionality can be made part of a separate physical component within the user domain 206, or alternatively have some or all of its functionality disposed within the client device or CPE 106 itself. It may also be integrated with other devices (such as connected client devices or PMDs) as previously noted.

As can be appreciated, literally an unlimited number of network topologies (whether mobile, fixed, or both) may be used consistent with the aim of extending or configuring the trusted portion of the user domain 206.

The user domain 206 also typically will include one or more output devices 214, e.g., television monitors, personal computers, and the like. These devices will typically carry no security or protection mechanisms to protect content, and hence are not typically part of the "trusted domain", but rather a non-secure output domain (NSOD) as described in greater detail subsequently herein. These devices may, however, by physically integrated with a device that is part of the trusted domain, such as wherein a monitor is combined with a DVR, DSTB, or PC.

In the exemplary trusted domain architecture, content is secured using mechanisms specified and provided by the network operator. The TD can also be used to implement and manage selective control of output to one or more output domains (ODs). These ODs can be considered as being outside of the TD, yet which implement prescribed security policies or mechanisms. For example, one such OD may comprise a secure OD (SOD), wherein content delivered into the domain is protected using an authorized security mechanism that is outside of the network operator's direct control (in contrast to the TD, which is entirely with the operator's control). For example, the well known Digital Transmission Content Protection (DTCP) and High-Bandwidth Digital Content Protection (HDCP) copy protection schemes proffered by 5C and Intel Corporation, respectively. Literally any number of different DRM and copy protection techniques may be used (alone or in combination) consistent with the SOD of the present invention, however, including without limitation steganographics such as watermarking and encryption.

In the exemplary configuration, the network operator or designated third party proxy has the ability to specify policies to be implemented within the domain (e.g., copy one generation), via e.g., copy control information (CCI) or other such downstream communications to the host 210. Hence, while the operator can specify security policies to be enforced within the SOD, access to content once it is within the SOD is not dependent on the operator's TD or CA system, but rather on the security mechanisms enforced within the SOD. This is in effect an "indirect" form of control by the operator on the SOD, without directly imposing CA or other such policies enforced within the TD.

Aside from the SOD, other forms of output domains (OD) may be utilized consistent with the invention. For example, in one variant, a non-secure OD (NSOD) is utilized. The NSOD literally may carry no protections or guarantees of the security for the content. For example, content output via an unprotected digital or analog interface (e.g., analog video output to a monitor or recording device) would be within the NSOD. Similarly, digital data transmitted "in the clear" would be entering an NSOD.

Figures 2A, 2B:
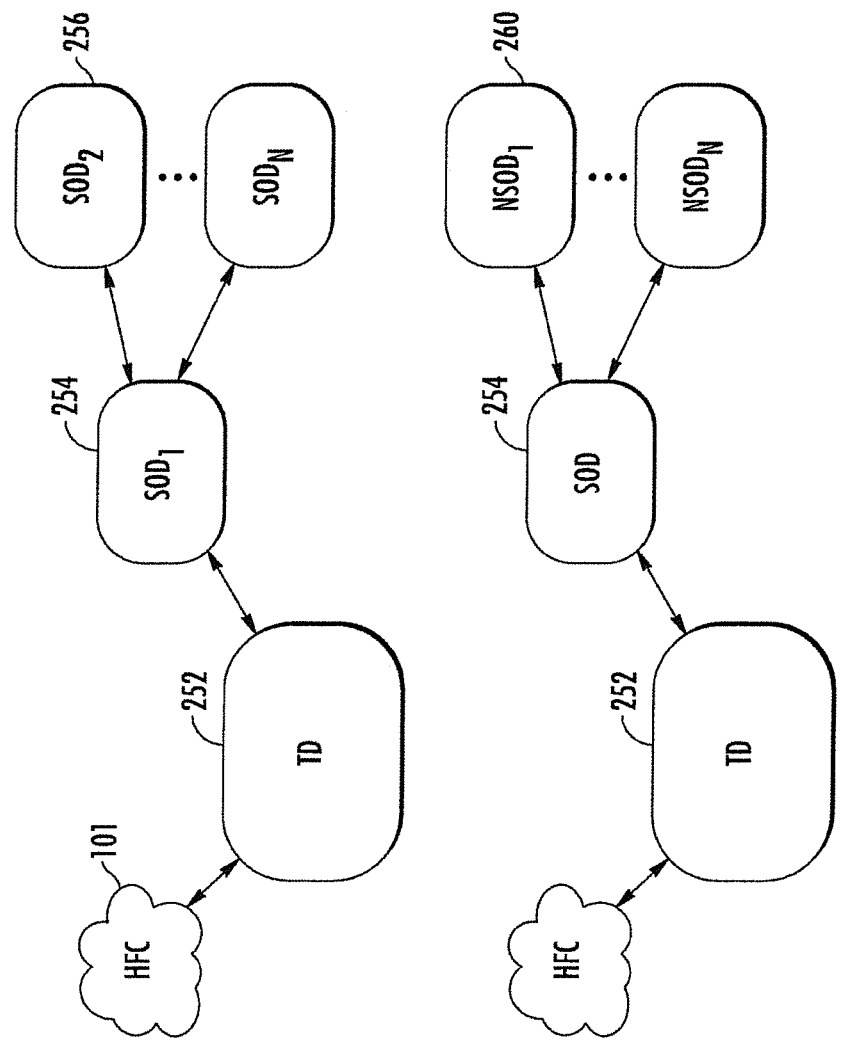
FIGS. 2a-2c are functional block diagrams illustrating various configurations of the user domain of FIG. 2, including direct or indirect output to one or more secure output domains (SODs) and/or non-secure output domains (NSODs).

It will be appreciated that multiple SOD and/or NSOD domains can be cascaded according to the invention. For example, FIG. 2a shows one embodiment of a cascaded homogeneous domain comprising: (i) the TD 252; (ii) a first SOD 254, and (iii) a second (and subsequent) SOD 256 in data communication with the first SOD. To the degree that the first SOD 254 acts as a pass-through entity or proxy for the second SOD, the TD 252 can communicate with the second SOD 256 to verify that the second SOD meets the required security policies and protections, or alternatively the two SODs have previously agreed exchange rules and do not require pass-through of control.

Alternatively, a shown in FIG. 2b, the cascade may be heterogeneous (i.e., with a SOD 254 in communication with the TD 252, and one or more NSODs 260 in communication with the SOD 254. However, it will be appreciated that an NSOD 260 generally cannot be interposed between a TD and a SOD with any confidence.

Figure 2C:
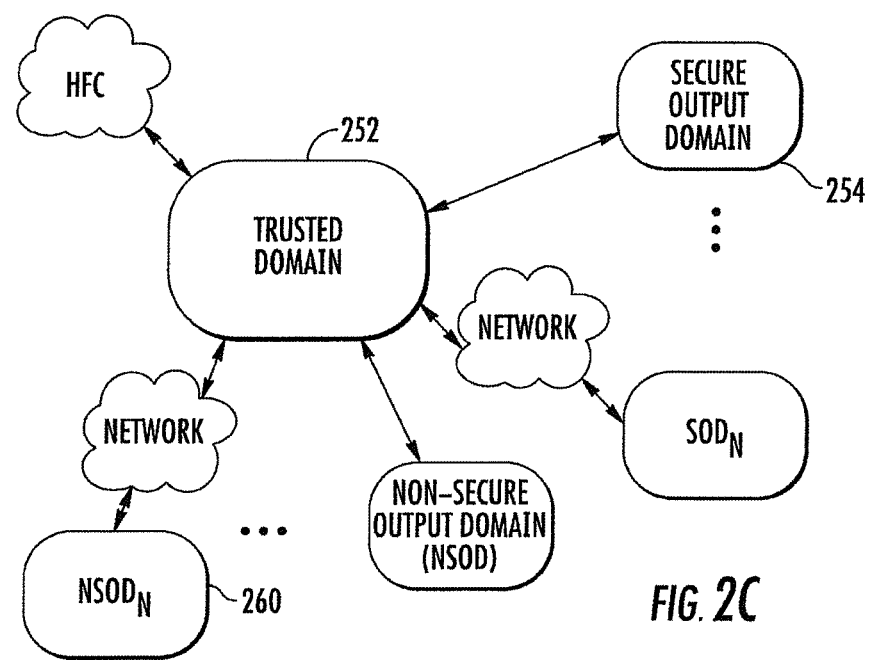

The trusted domain may also interface directly with both NSODs and SODs, as shown in FIG. 2c.

Moreover, a multi-layered rights management architecture useful to prevent unauthorized use and transfer of protected content within the user domain can be used consistent with the aforementioned SODs/NSODs of the present invention.

Figure 3A:
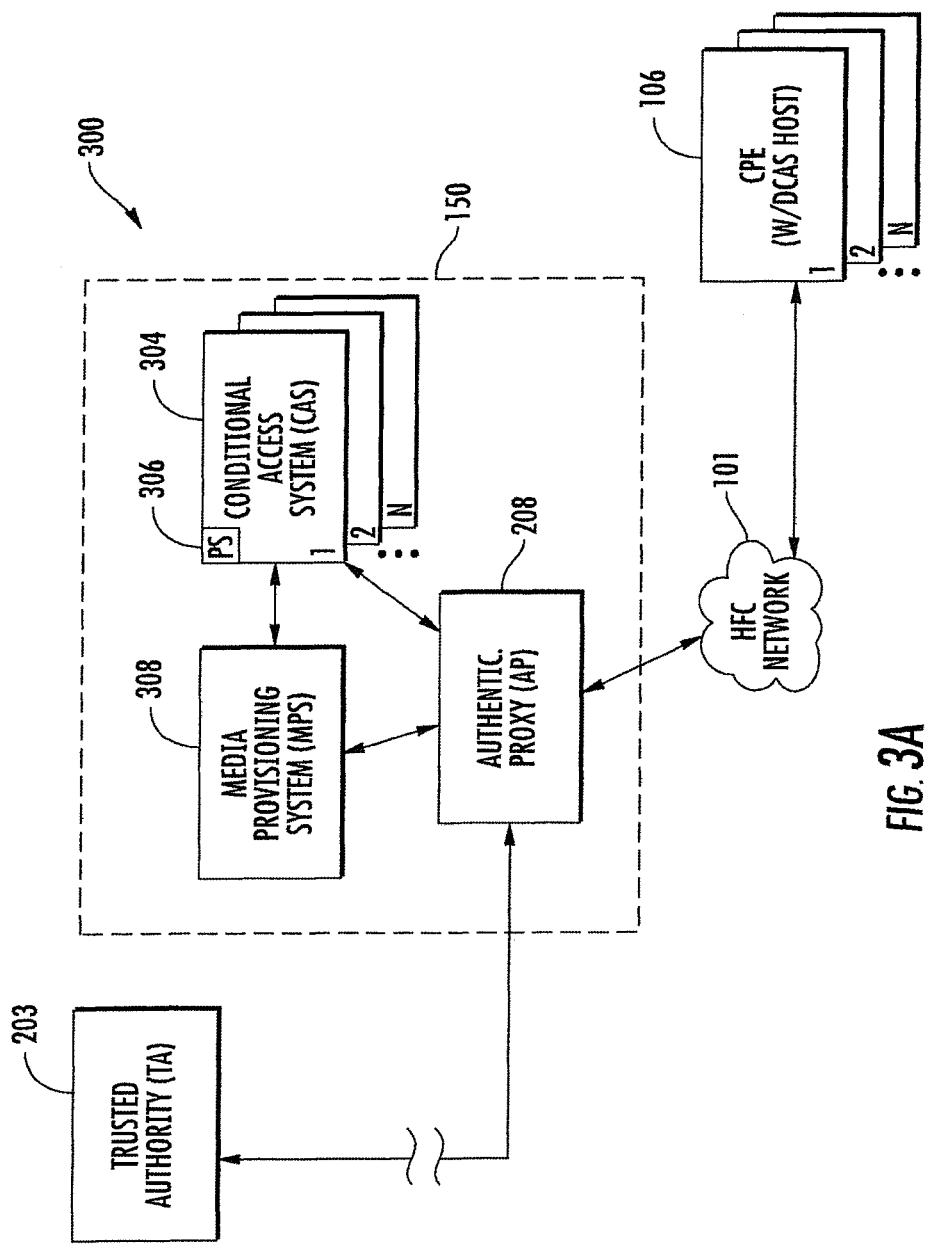
FIG. 3a is a functional block diagram of the secure download system (SDS) architecture configured in accordance with a first embodiment of the invention.

Referring now to FIG. 3a, a first embodiment of the generalized secure download system (SDS) architecture including network operator domain 204 of the type shown in FIG. 2 is described. As illustrated in FIG. 3, the exemplary architecture 300 comprises an authentication proxy (AP) 208, conditional access system (CAS) 304 (including associated personalization server 306), and media (e.g., video) provisioning system 308. These components are in communication with one another for performing various functions related to the security download system (SDS) architecture, as will be described in greater detail subsequently herein. A common image is present on the CAS 304, while a user-domain specific or unique image (personalization portion) resides on the personalization server 306. The unique image is specific to a given CPE or PMD using, e.g., a public/private key pair for security functions which may include CA, DRM or TD establishment and management. Each CA system 304 interacts with the AP 208 (via the PS 306) to provide personalized SM Client images for download into the SDS host 210. The CA system 304 securely generates a common SM Client image which is downloaded by all SMs 514 sharing a common hardware and software configuration. In contrast, the personalized image is specific to a given host 210 (specifically, its SM 514). Note, however, that the CA image can be repurposed to a different SM if desired.

Communications between these entities 208, 304, 306 can be via any number of well known wired or wireless interfaces including, without limitation, Ethernet/GBE/10-Gig-E (e.g., 10/100/1000/10,000) LAN, IEEE-1394 ("Firewire"), USB, WiFi, UWB, and so forth. One or more intermediary agents or processes may also be interposed, such as where an indirect network path is used (e.g., router, gateway, portal, etc.). These communication paths may also be made physically secure (i.e., physically protected against surreptitious access by a third party), and/or or virtually secure (e.g., using VPN session or other higher layer processes "tunneled" or transmitted across an unsecure or untrusted physical medium, authentication, encryption, etc.). The well known 802.1x and WEP/WPA technologies can also be utilized in conjunction with a RADIUS server, as can any other protocols and security features well known to those of ordinary skill.

While shown being physically disposed at the head-end 150 of the exemplary MSO network, it will be appreciated that one or more of these components 208, 304, 306 (and/or their associated logical processes) can be disposed at other locations. Under certain deployment scenarios, a subset of SDS infrastructure components may be located at a centralized national site for each network operator. This allows for efficient centralization of operations and consideration for equipment with stringent real-time performance requirements. Additionally, the exemplary infrastructure attempts to minimize the number of connections to the Trusted Authority 203. Failure to access the TA can impact certain system operations. Specifically, SDS hosts 210 whose security records are not available to the SDS infrastructure will not be authenticated and will therefore assume an operationally disabled state. This will also prevent the TA from authenticating the AP for a new SM.

Furthermore, the SDS components can be physically and/or logically integrated with one another, such as where all reside within a common form factor. The present invention is accordingly in no way limited to a particular architecture or configuration.

The AP 208 of FIG. 3a is also in data communication with one or more Trusted Authorities (TA) 203 disposed within the trusted authority domain 202. The trusted authority 203 of the exemplary embodiment comprises the limited number of trusted authentication authorities currently present in the United States; however, it will be recognized that the TA may comprise more or less entities. For example, the NGNA Trusted Authority (TA) is an inter-operator agent for distributing Public Key information currently available in the U.S. Alternatively, the TA functionality can be distributed across two or more coupled or independent entities, may be accessed in a serial or sequenced fashion, may be "virtual", etc.

The TA is responsible for generating, programming, validating and tracking keys associated with the system, including those embedded in the client side DCAS host 210. The TA goes through variety of steps to authenticate AP 208; this can be conducted on an as-needed basis (i.e., each time the AP requests information or authentication of a client from the TA), on a periodic or aperiodic basis, on a rotating key basis, etc.

As with the communication channels between the various head-end architecture components 208, 304, 306, 308 the communications between the AP 208 and the TA(s) 203 may be protected using physical, virtual, or other means. Due to the sensitivity of the information carried between the TA(s) 203 and the AP 208, a high level of security is typically desired on this link (including any interposed links which may provide an opportunity for surreptitious attack or monitoring).

Three attributes of this link are particularly significant in the present context. Specifically, the concepts of authentication, data confidentiality, and data integrity are employed as part of the exemplary architecture for protection. These security attributes may be implemented on, e.g., hop-by-hop, end-to-middle and end-to-end basis. These mechanisms are intended to provide important security functions such as identification and verification of the user and/or his or her equipment (authentication), protection of the payload or other data from being read or extracted (confidentiality), and verifying or assuring that the content has not been tampered with or altered (integrity). Authentication is particularly useful against "spoofing" attacks (i.e., third party communications posing to be from a known or trusted source).

So-called "anti-replay" protection may also be utilized, using any number of well known mechanisms including e.g., packet sequence integrity. A replay attack can occur for example when a third party obtains a copy of unauthenticated packets, and transmits them to the intended destination at a subsequent time. The receipt of this duplicate packet may disrupt service in some way, or provide other types of surreptitious access.

Moreover, the illustrated architecture of FIG. 3a is designed to maintain continuous or near-continuous contact between the TA 203 and the AP 208, so that AP can verify the client device and issue necessary cryptographic elements in a timely fashion.

Figure 3B:
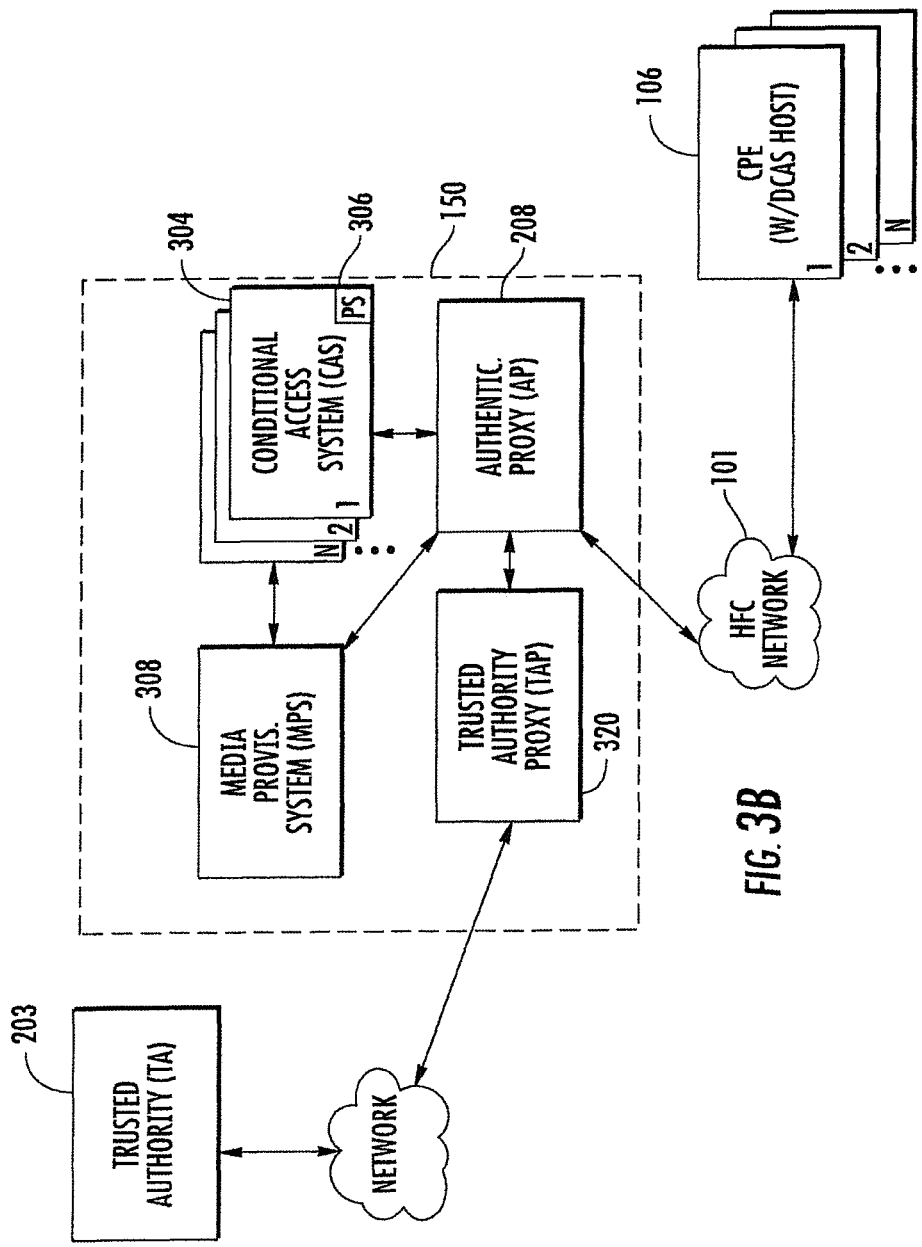
FIG. 3b is a functional block diagram of the secure download system (SDS) architecture configured in accordance with a second embodiment of the invention, including a trusted authority proxy (TAP).

FIG. 3b illustrates a second exemplary embodiment of the SDS architecture according to the invention. In this embodiment, a local or "proxy" trusted authority (i.e., trusted authority proxy 320 is used in conjunction with the remote or distant TA 203 previously described. Use of such a decentralized TAP 320 advantageously permits an increased amount of autonomy for the MSO operations, as well as increased reliability from the standpoint that failure or unavailability of the link between the head-end 150 and the remote TA 203 may not under many circumstances be crippling to continued operation of the MSO network. Reduced latency may also be provided, in that a single TA 203 (or very limited number thereof) is not required to service the potentially great number of requests coming from all networks (MSO or otherwise), which may result in "bottlenecking" based on the TA's capacity (or that of any interposed networks which the MSOs or other entities use to communicate with the TA 203). Specifically, in one variant, the TAP 320 acts as a "secure client" of sorts to the TA 203, with each MSO network having its own "mini-TA" (i.e., TAP) locally that is enabled to service at least some of the more routine requests generated from the MSO network and its clients. While it is contemplated that the TAP 320 would be maintained physically secure (as well as employing data and network security features including authentication, data integrity, confidentiality, etc. as previously described), this is not a requirement in all cases, since other types of protection mechanisms can be used consistent with the intent of providing a substantially distributed TA architecture that reduces bottlenecking and latency.

It will be appreciated that multiple MSO head-ends 150 of the same MSO (or even of different entities) can utilize a common local TAP, or conversely multiple TAPs can be allocated to or disposed at a single MSO network to provide, inter alia, failover capability and redundancy to as to enhance reliability or meet a desired target (e.g., "five 9's"). Myriad other configurations of TA/TAP/network are possible, as will be recognized by those of ordinary skill.

It will further be appreciated that while shown as separate entities, the TAP 320 and the AP 208 can be integrated into one virtual or physical entity if desired, or similarly combined with other entities if desired. For example, another physically secure device or component may already exist in the MSO head-end, and hence integration of the TAP with such device could obviate separate physical security measures for the TAP.

Figure 3C:
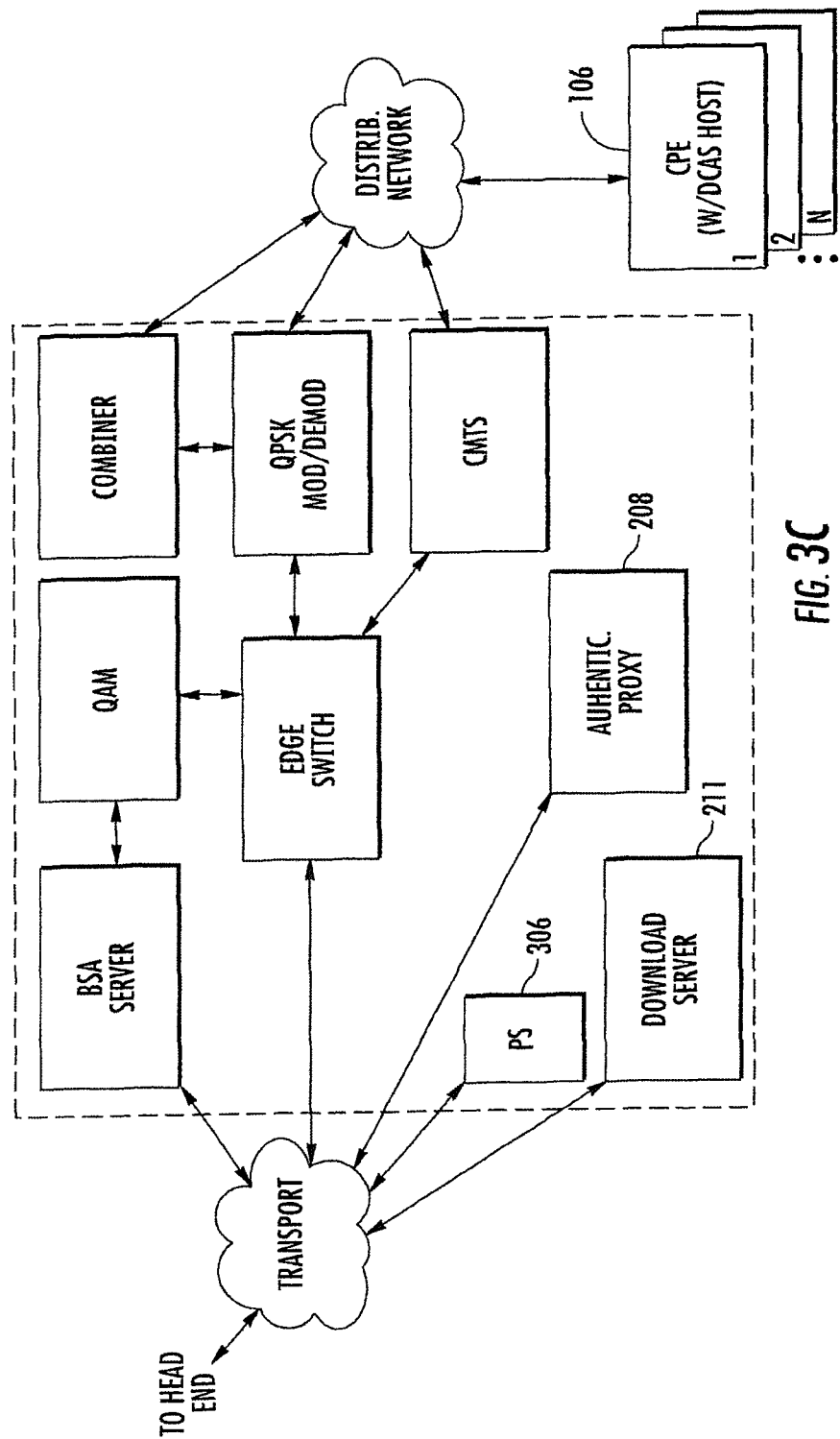
FIG. 3c is a functional block diagram of the secure download system (SDS) architecture configured in accordance with a third embodiment of the invention, the network operator infrastructure disposed substantially within a BSA network hub site.

FIG. 3c illustrates a third exemplary embodiment of the SDS architecture according to the invention. In this embodiment, the AP 208 is disposed at a distributed location (e.g., at a BSA hub site within a BSA network of the type previously described herein with respect to FIG. 1c). While one AP 208 at one hub site is shown, it will be appreciated that any variations of the number and/or placement of the APs can be used including, without limitation, (i) placing multiple APs 208 at one hub site (e.g., AP "farm"); (ii) placing one AP 208 at a location wherein it can serve multiple hub sites, and so forth.

The embodiment of FIG. 3c has the advantage of having a substantially distributed security download (i.e., AP 208) architecture that leverages the inherent distributed nature of the BSA switching hubs. Specifically, each hub site or local AP 208 can function substantially independent of the others (or in a distributed but coordinated fashion if desired), thereby avoiding bottlenecking at the AP level.

In one embodiment, a carousel server of the type well known in the art is used to stream, or "carousel", out images (common or personalized) on a continual basis, such as via an in-band downstream channel. In another embodiment, a download server 211 is used that can be dividually contacted by hosts (or SMs) to download specific images (e.g., in a unicast rather than broadcast fashion), similar or equivalent to an FTP/HTTP server. The exemplary download server would connect to the CMTS via the IP network, although other approaches may be used if desired.

Figure 3D:
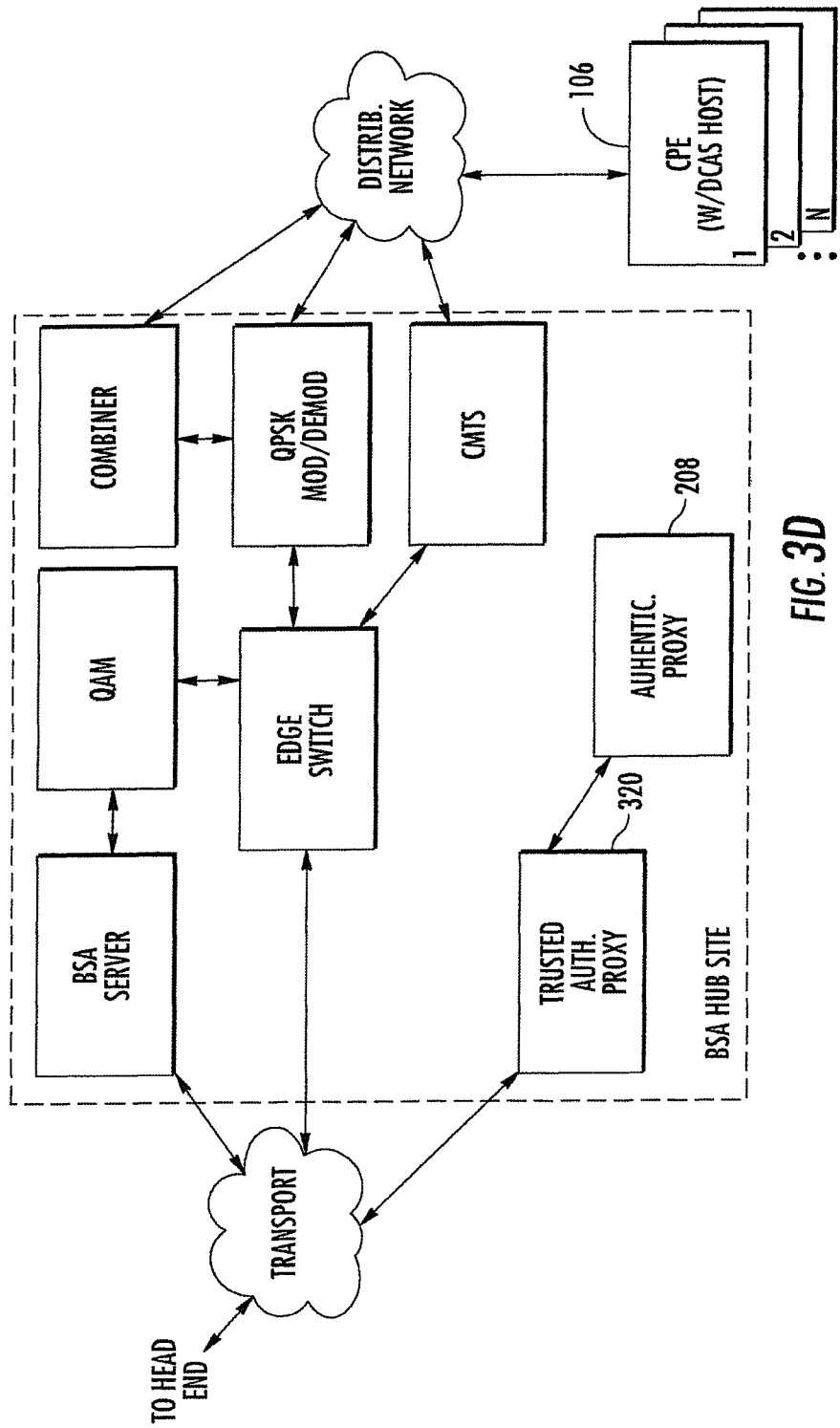
FIG. 3d is a functional block diagram of the secure download system (SDS) architecture configured in accordance with a fourth embodiment of the invention, the network operator infrastructure disposed substantially within a BSA network hub site and incorporating a trusted authority proxy (TAP).

In the embodiment of FIG. 3d, a local or "proxy" trusted authority (i.e., TAP 320) is used in conjunction with the local AP 208, for a fully decentralized architecture.

It will be noted that one salient distinction between the trusted or authorized service domain of the present invention and other forms of content protection (e.g., prior art DTCP or HDCP) relates to the content and software (Client images) remaining under network operator (or third party, via a network proxy) control at all times while in the trusted domain. In the exemplary embodiment, the CPE 106 with security management host 210 comprises the control or access point for the operator within the trusted domain. Specifically, in one variant described in greater detail subsequently herein with respect to FIG. 5, a secure microprocessor (SM) is used for this function; the SM is personalized to the specific CPE 106 and network operator with which it is used via software and keys received from the AP 208. The trusted domain (TD) can therefore be considered to be an extension of the operator's Conditional Access (CA) system which also implements digital rights management policies under control of the operator.

The model for establishing trusted domain (TD) functionality within the CPE 106 according to the exemplary embodiments of the invention can be described as a hierarchy of encryption and key exchange policies and protocols under the control of the operator's security management system (e.g., that of FIGS. 3a-3d). In the exemplary embodiment, the security management (e.g., DCAS) host 210 is responsible for local encryption/decryption of the content, while the SM is responsible for securing and managing the keys used in content encryption/decryption. The architecture is configured so that access to content within the client side of the trusted domain (TD) requires use of the "personalized" SM. The trusted domain is advantageously distinct from any protection used in the transmission of content from the head-end 150 to the premises where the CPE 106 or other target platform is located.

Referring now to FIGS. 3e-3n, one exemplary configuration of the secure download system (SDS) and associated infrastructure of the present invention is described in detail. It will be appreciated that while described in the context of an MSO-based multi-region cable television and media delivery network, the invention is in no way limited to such applications, the following description being merely exemplary.

Figure 3E:
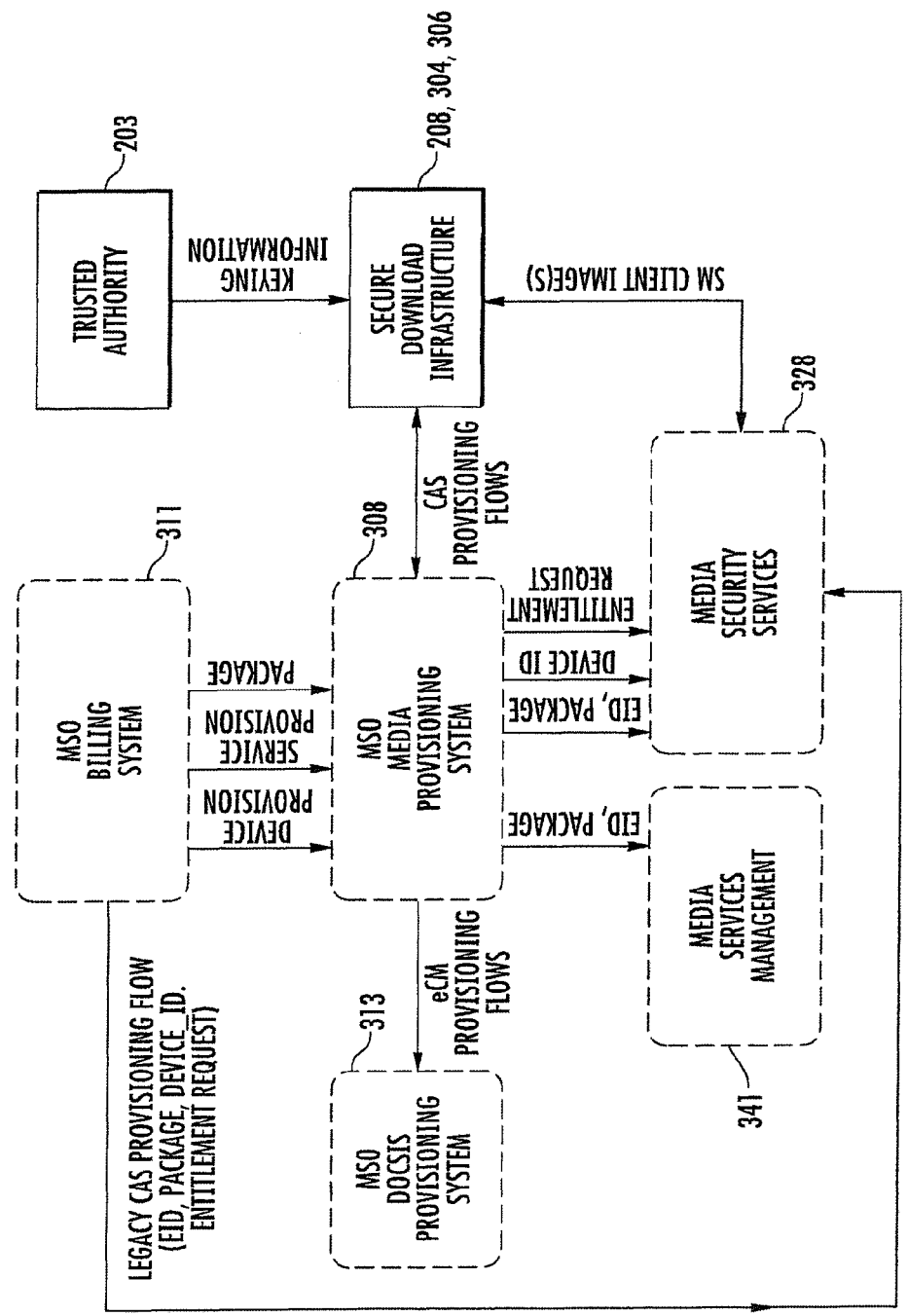
FIG. 3e is a functional block diagram of one exemplary embodiment of the network operator infrastructure of the SDS architecture of FIG. 3a, showing its relationship to other network system components.

FIG. 3e is a functional block diagram of one exemplary embodiment of the network operator infrastructure of the SDS architecture of FIG. 3a, showing its relationship to other network system components. These other components comprise, inter alia, the MSO's billing system 311, DOCSIS provisioning system 313, media security manager 328, and the media services manager 341.

Figure 3F:
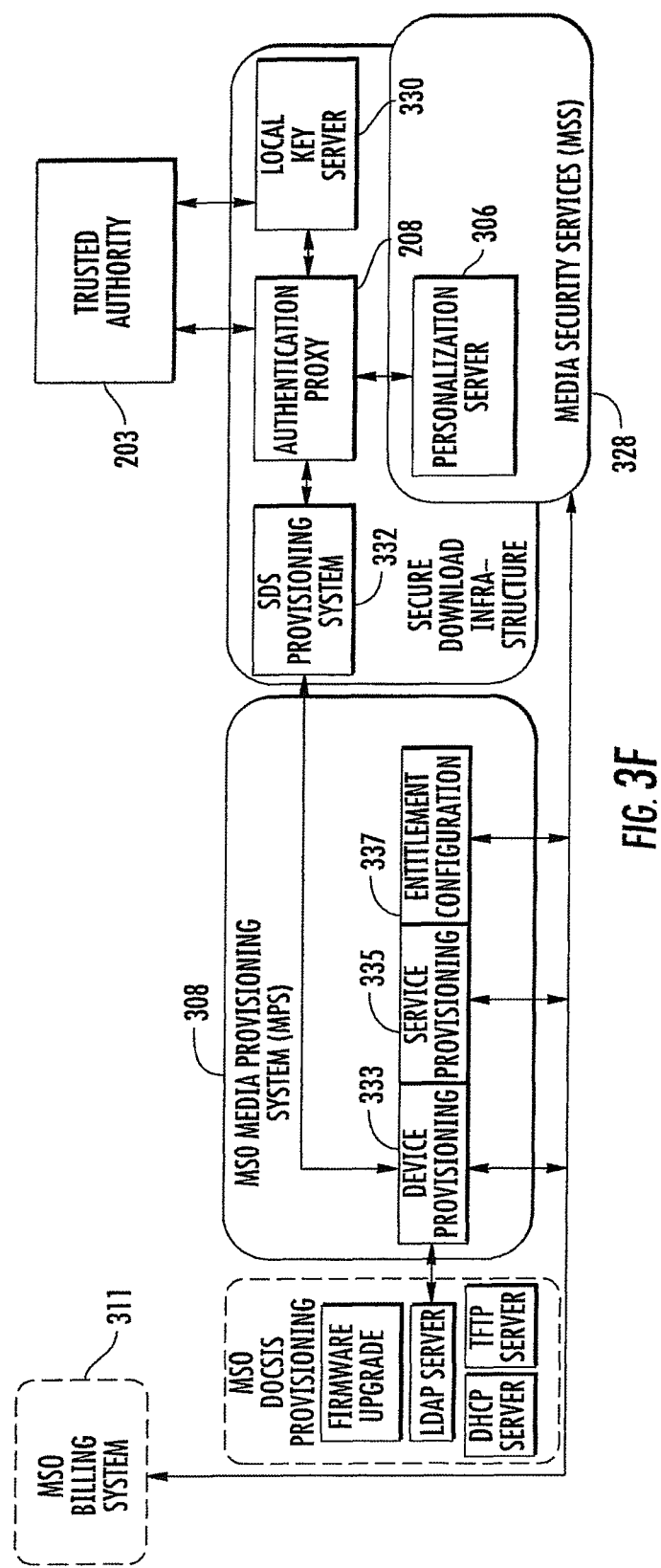
FIG. 3f is a functional block diagram of one exemplary embodiment of the network operator infrastructure of the SDS architecture of FIG. 3e, showing additional details thereof.

FIG. 3f is a functional block diagram of one exemplary embodiment of the network operator infrastructure of the SDS architecture of FIG. 3e, showing additional details thereof including the relationship of the PS 306 and the MSS 328, and the local key server (LKS) 330. The exemplary SDS infrastructure further comprises a dedicated SD provisioning system 332. Each of these components are described in greater detail subsequently herein.

Figure 3G:
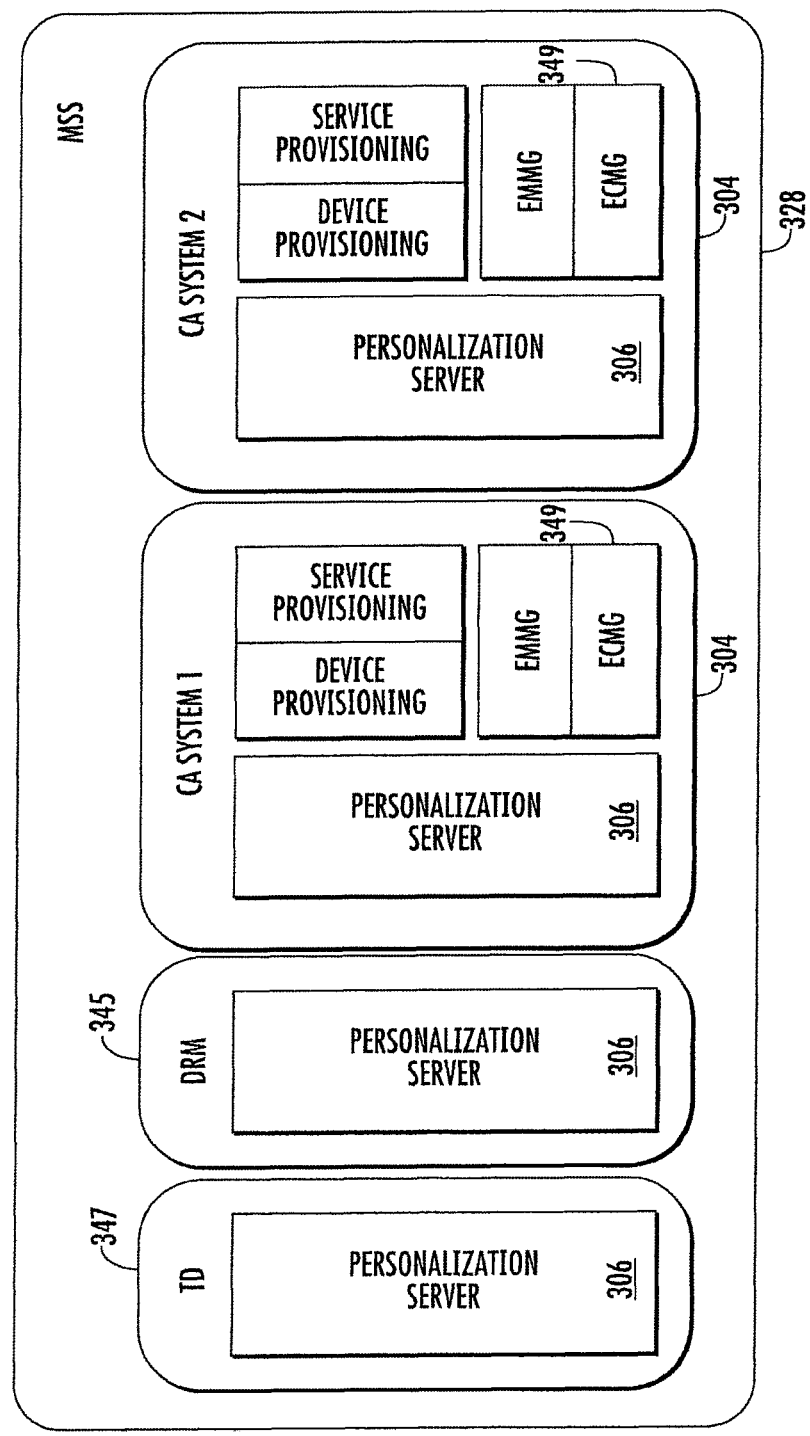
FIG. 3g is a graphical representation of one exemplary embodiment of the media security services portion of the network operator infrastructure of the SDS architecture of the invention.

FIG. 3g is a graphical representation of one exemplary embodiment of the media security services portion of the network operator infrastructure of the SDS architecture of the invention, illustrating the various functional entities including the CA systems 304, DRM system 345, and TD system 347. Note that each has a PC component 306 associated therewith for providing personalized (e.g., SM-specific) versions of their respective client images.

Figure 3H:
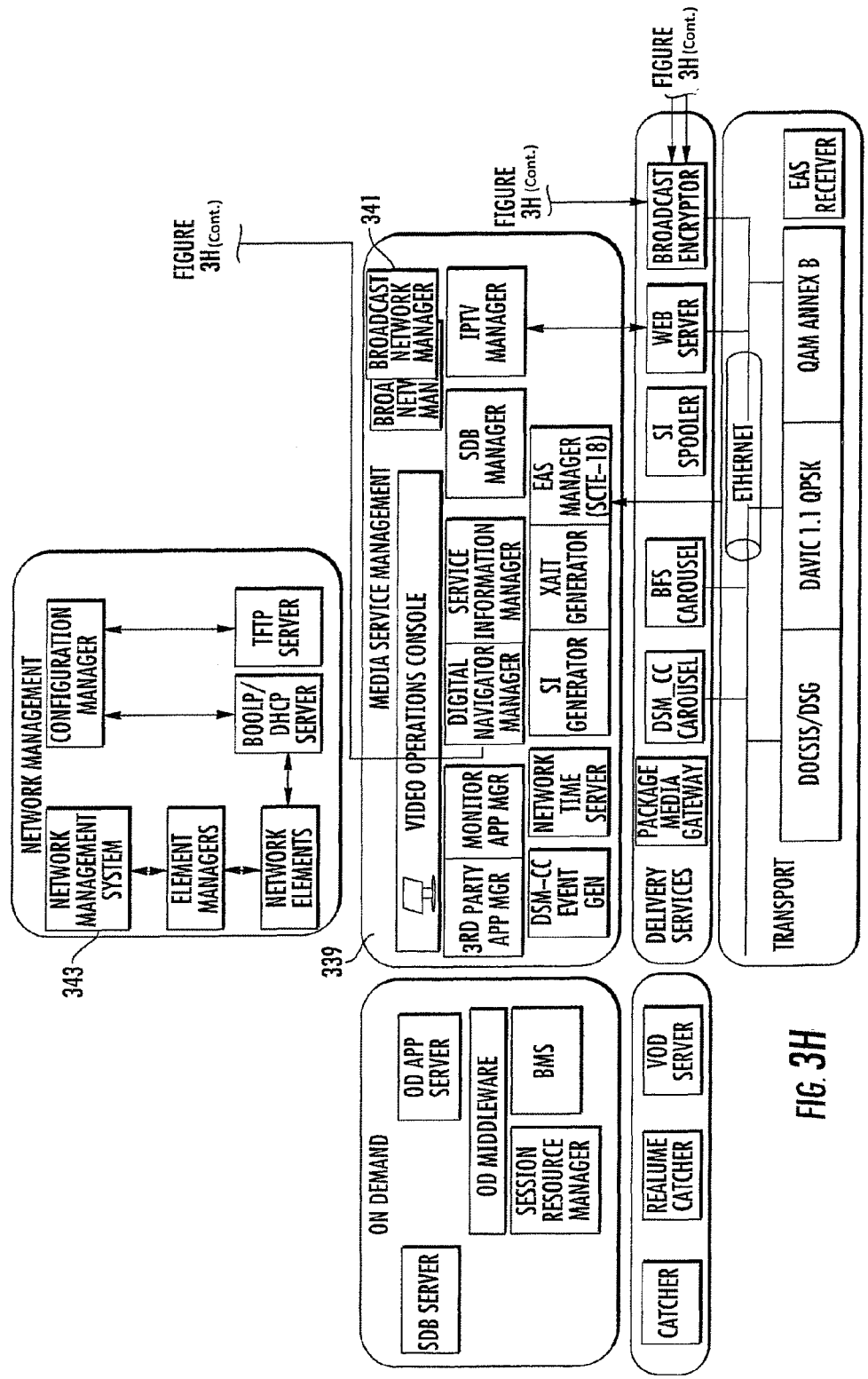
FIG. 3h is a functional block diagram of one exemplary embodiment of cable television network head-end including the SDS architecture of the present invention.
Figure 3H:
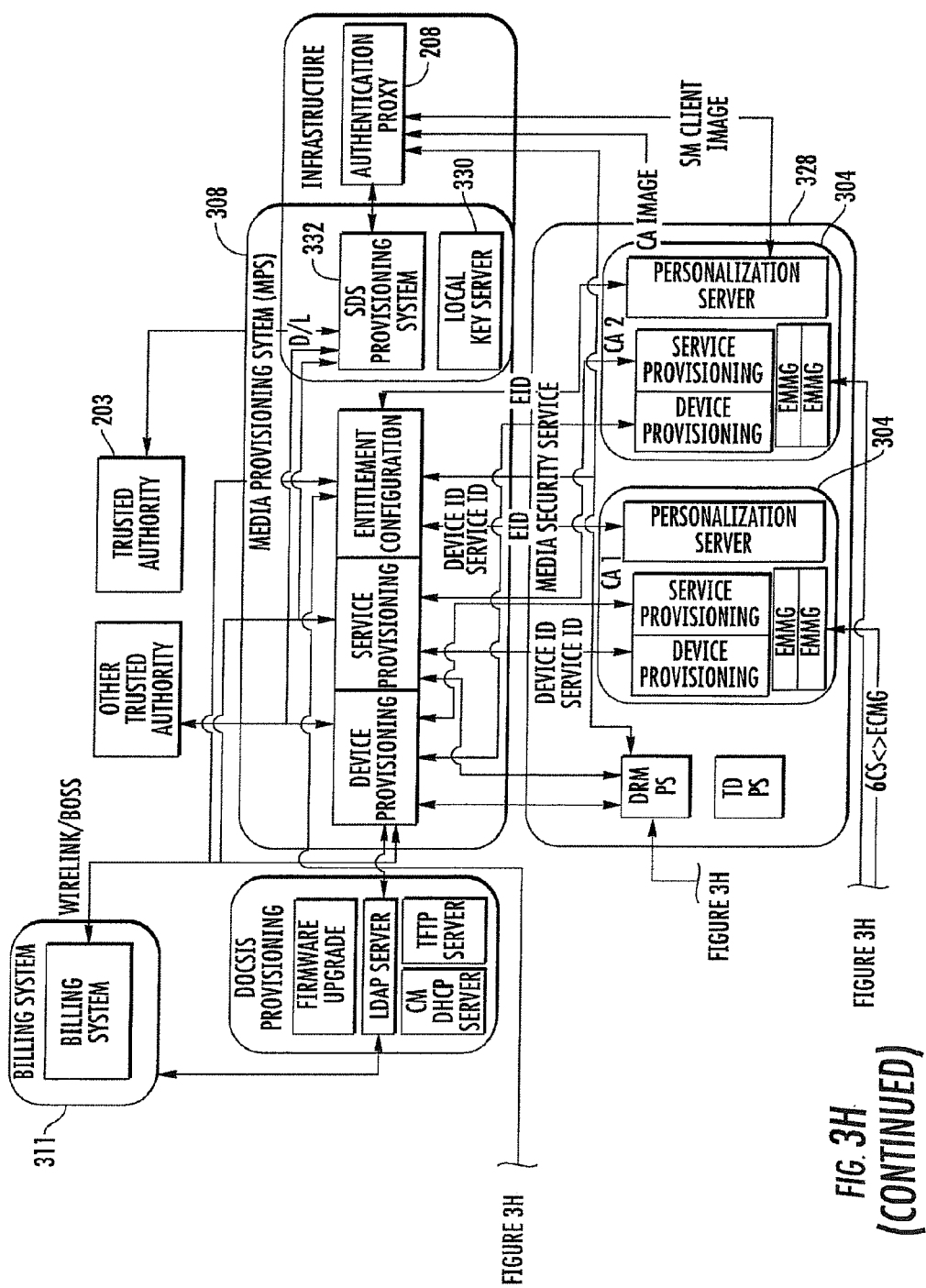
Figure 31:
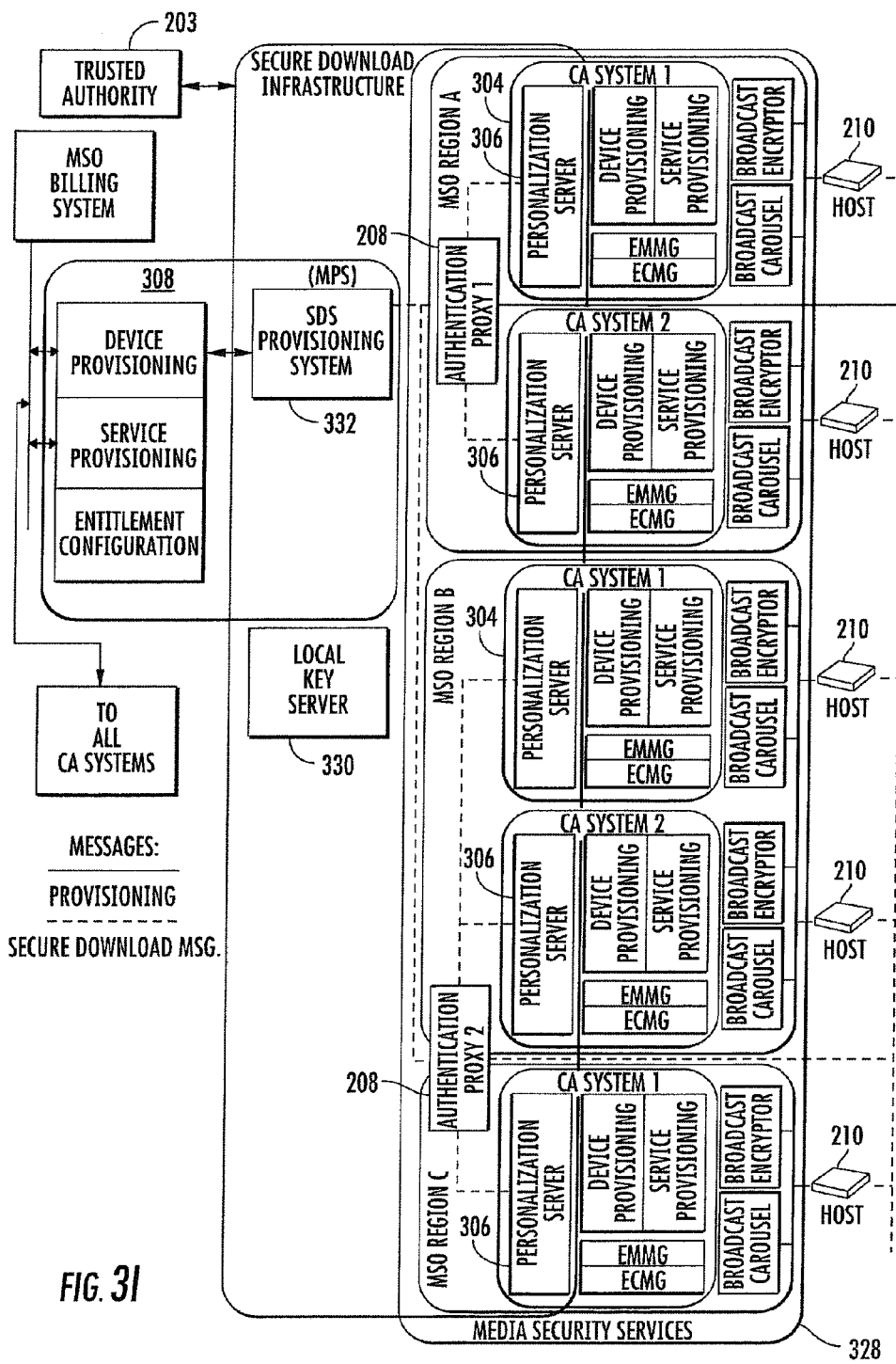

FIG. 3h is a functional block diagram of one exemplary embodiment of cable television network head-end including the SDS architecture of the present invention, showing the interrelationships between various components and functions disposed primarily within the cable network head-end, although it will be appreciated that these components and functions may be distributed at other locations.

FIG. 3i is a functional block diagram of one exemplary embodiment of cable television network having multiple network regions, including a distributed SDS, according to the invention. As shown in FIG. 3i, the SDS infrastructure is distributed across multiple MSO regions (A, B, C), with APs 208 serving one or more of these regions (and their associated CA, DRM, and TD systems and Personalization servers 306). As noted, multiple PS devices can be serviced by one AP 208.

Figure 3J:
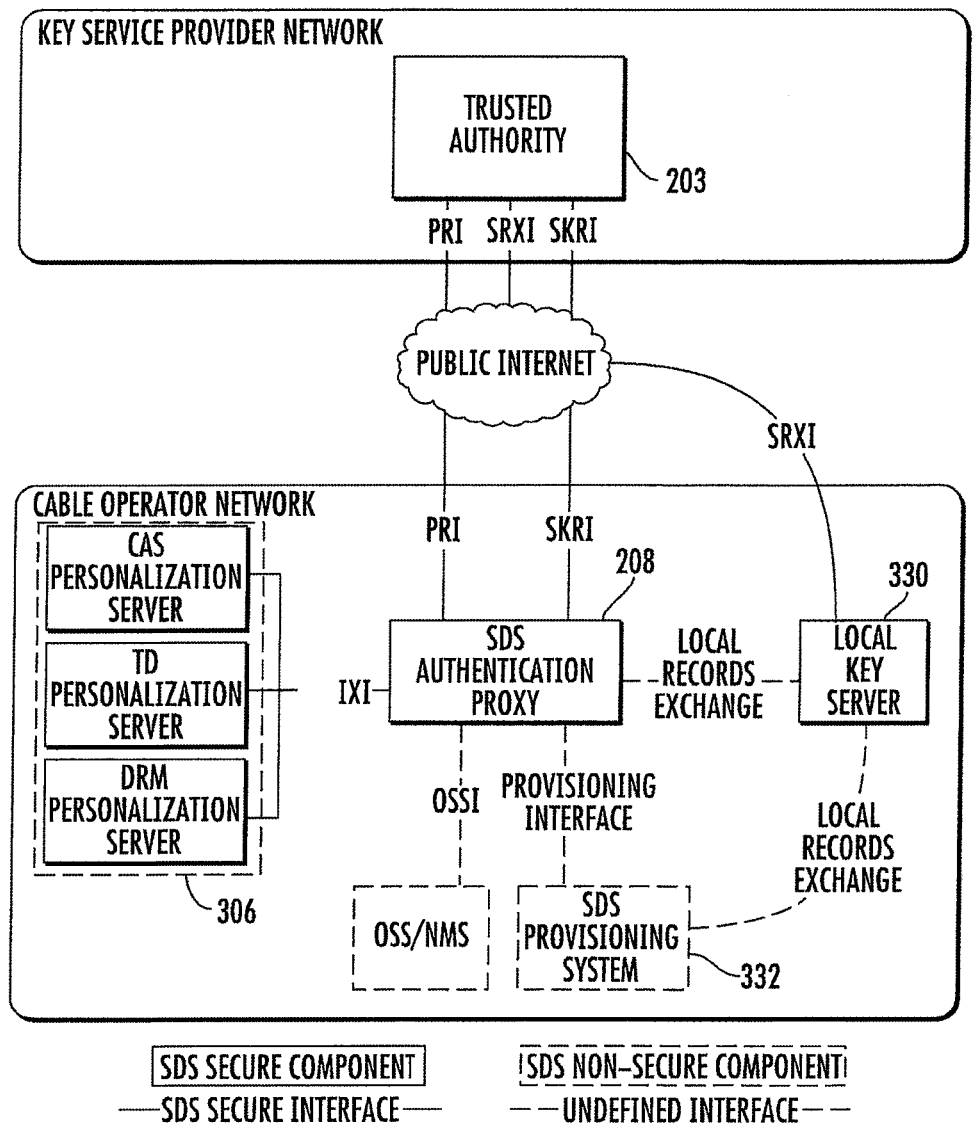
FIG. 3j is a functional block diagram of one exemplary embodiment of the SDS architecture of the invention, showing secure and non-secure components and interfaces.

FIG. 3j is a functional block diagram of one exemplary embodiment of the SDS architecture of the invention, showing secure and non-secure components and interfaces.

Figure 3K:
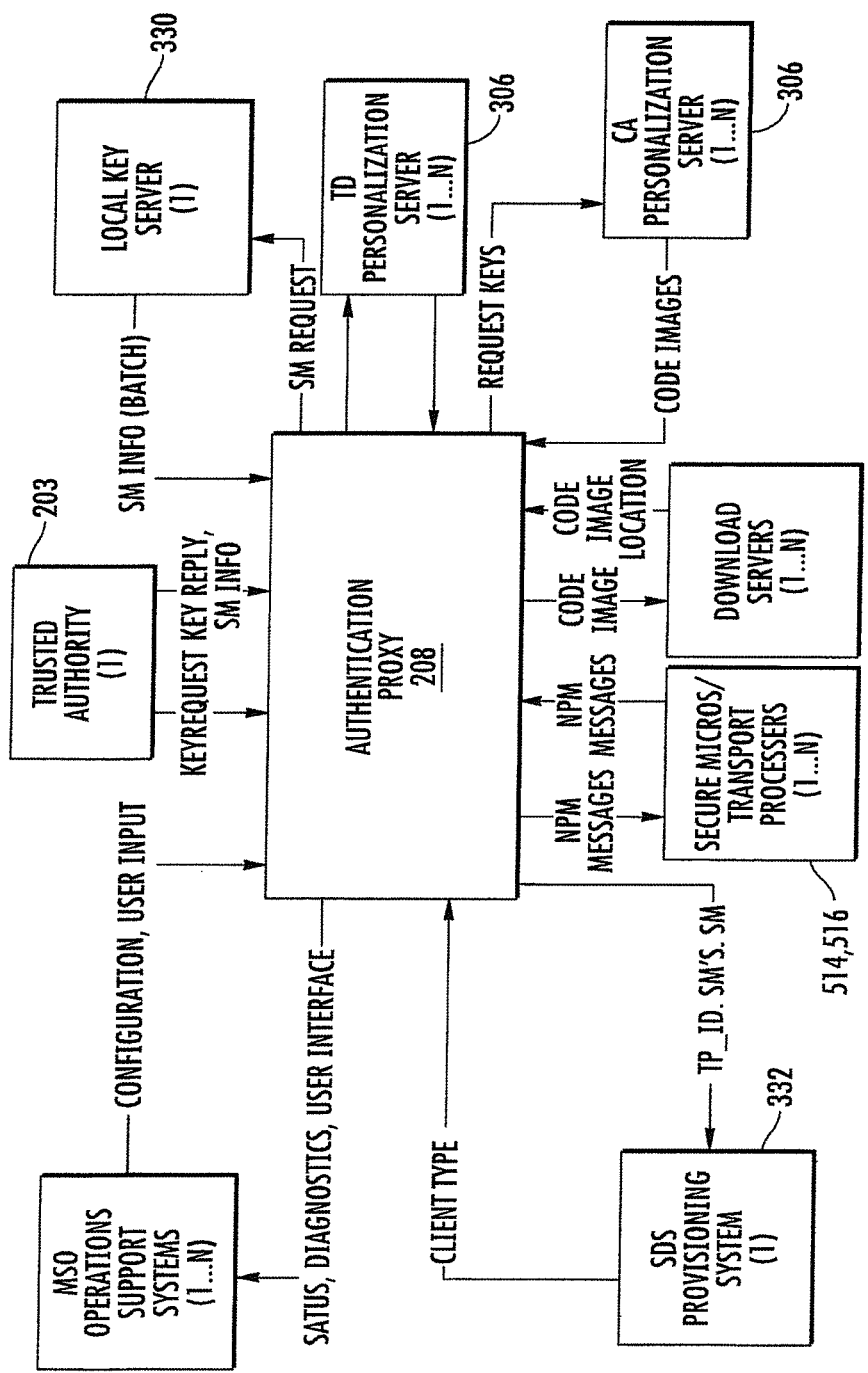
FIG. 3k is a logical block diagram of one exemplary embodiment of the authentication proxy (AP) of the SDS architecture of the invention, showing various messaging and interfaces to and from the AP.

FIG. 3k is a logical block diagram of one exemplary embodiment of the authentication proxy (AP) of the SDS architecture of the invention, showing various messaging and interfaces to and from the AP.

FIG. 3l is a logical block diagram of one exemplary embodiment of the personalization server (PS) of the SDS architecture of the invention, showing various messaging and interfaces to and from the PS.

Figure 3M:
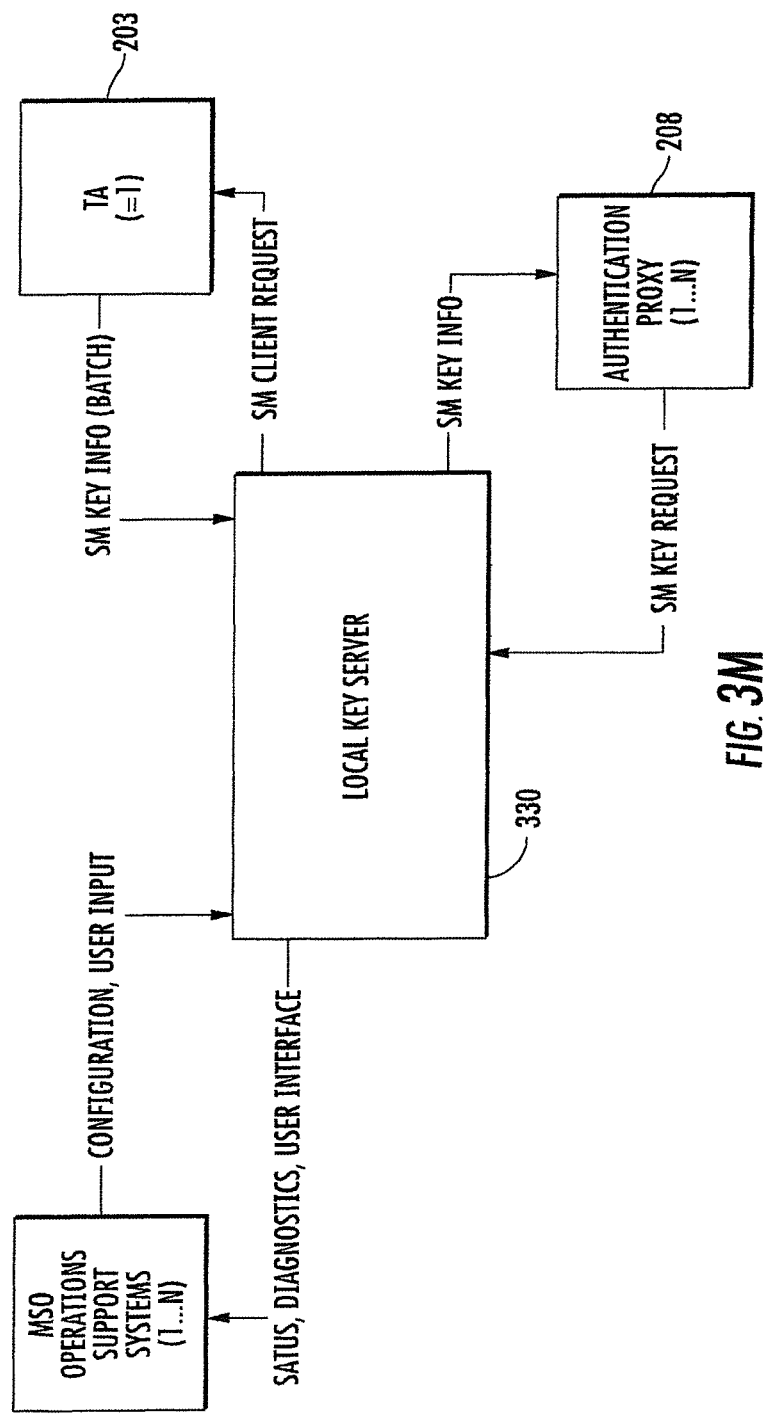
FIG. 3m is a logical block diagram of one exemplary embodiment of the local key server (LKS) of the SDS architecture of the invention, showing various messaging and interfaces to and from the LKS.

FIG. 3m is a logical block diagram of one exemplary embodiment of the local key server (LKS) of the SDS architecture of the invention, showing various messaging and interfaces to and from the LKS.

FIG. 3n is a logical block diagram of one exemplary embodiment of the SDS provisioning system (SPS), showing various messaging and interfaces to and from the SPS.

The primary components and functions of the foregoing exemplary SDS architecture are now described in greater detail.

MPS Device Provisioning

Figure 30:
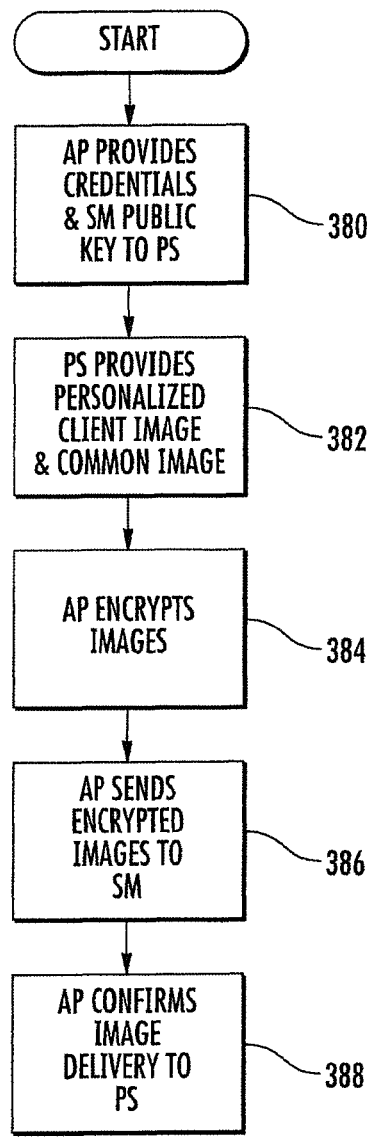

In an exemplary leased equipment model, the device provisioning function of the MPS 308 (see FIG. 30 receives commands from the network operator's billing system 311 indicating a CPE 106 is being added or removed from the system. The addition of a CPE 106 may be instigated by subscriber initiated contact with a network operator customer service rep. (CSR) in order to provide CPE identification and location information, although it will be appreciated that other approaches may be used with equal success. For example, in one alternative, two-way communications with the CPE could be used to automatically discover new devices joining the network (i.e. certain retail scenarios). The MPS device provisioning function 333 (FIG. 3f), part of the MPS 308, receives this information and can instigate the download of SM Client images. The download channel (e.g., DOCSIS CM) provisioning flow is triggered by the MPS device provisioning system function to load the appropriate firmware or software consisting of cable modem (CM) and CPE images.

MPS Service Provisioning

The MPS service provisioning function 335 (FIG. 3f) is responsible for resolving and distributing service entitlement requests across all the CA systems 304 in the network. MPS service provisioning 335 receives service provisioning requests from the billing system 311, resolves the service request with the capabilities of the CPE 106 as required, and then routes the service provisioning flow to the appropriate CA system. As will be recognized by those of ordinary skill, the SDS capabilities of the CPE 106 may accordingly influence the service provisioning function's operation and flow. The head-end controller for the CA system 304 contacts the CA Client(s) as required by the CA system configuration.

MPS Entitlement Configuration

The Entitlement Configuration (EC) function 337 (FIG. 3f) is responsible for coordinating entitlement IDs across the multiple CA systems within the network. This permits the Media Service Management (MSM) functions 339 (see FIG. 3h) to be independent of the CA system(s) 304. The EC 337 communicates entitlement identifiers (EIDs) to the MSM 330 for use in service catalog creation. The SDS capabilities of the CPE 106 may also influence the entitlement configuration.

The MPS entitlement configuration function 337 abstracts the service request from the billing system 311 into a set of common entitlement configuration messages for communicating with other subsystems in the media (e.g., video) infrastructure.

Media Security Services

The Media Security Services (MSS) 328 apply and manage content and service access control. It is assumed in the illustrated embodiment that the distributed system consists of multiple CA systems 304 running both duplicate and distinct CA system software, although other configurations are possible. For the purpose of securing broadcast content, the DRM and TD systems are considered possible CA systems within the MSS 328.

Each CA system technology within the MSS 328 receives a common configuration of EIDs from the EC 337. Each CPE's secure microprocessor (SM) 514 (see FIG. 5) is associated with a CA system by the AP 208 (via the PS 306). The CA system 304 receives service entitlement requests for associated network hosts 210. In turn, the CA system generates and delivers the entitlements. Additionally, the CA system 304 is informed for which services it needs to generate encryption. It interacts with a shared bulk encryptor (e.g. SimulCrypt or partial encryption) via the exemplary entitlement control message generation function (ECMG) 349 to SimulCrypt Synchronizer (SCS) interface providing the ECMs needed for its assigned hosts 210 in order to decrypt the service.

Each CA system 304 within the MSS 328 interacts with the AP 208 (via the PS 306) to provide personalized SM Client images for download into the SDS host 210. The CA system 304 securely generates a common SM Client image which is downloaded by all SMs 514 sharing a common hardware and software configuration.

In addition to the CA system's interface to the SDS infrastructure through the Personalization Server 306, the CA systems 304 of the illustrated embodiment implement three other interfaces to the operator's support system (OSS), namely: (i) a CA system provisioning interface; (ii) an entitlement configuration interface; and (iii) SimulCrypt Synchronizer to ECM generator interface.

The CA system provisioning interface is used in certain deployment scenarios to request device and service provisioning by the CA system 304. The protocols implemented to support this interface are traditionally a proprietary technology unique to each CA system vendor (e.g. BOSS, WireLink), although other approaches such as standardized protocol may be used.

The entitlement configuration interface allows the Media Provisioning System 308 to provide the CA system 304 with the EIDs associated with each service.

The SimulCrypt Synchronizer to ECM generator interface is used by the CA system 304 to receive keys and deliver ECMs to the bulk encryptor. It will be appreciated that will a SimulCrypt-based system is shown and described, the invention is in no way limited to this (or for that matter similar) approaches.

Media Services Management (MSM)

The Media Service Manager (MSM) 339 is responsible for configuration and management of broadcast media (e.g., video) services, third-party applications (both native and OCAP), and eTV services. Responsibilities of the exemplary MSM 339 include service catalog and service information, OCAP Application Certificate Management, Emergency Alert, XAIT/AIT configuration, SDB Service and broadcast carousel management. The MSM 339 operates independently from the type of CA systems 304 in the network, allowing seamless service delivery within a heterogeneous CA system environment. To operate independent of the CA system(s) 304, the MSM 339 receives EID information from the ECM 337 (within the MPS 308).

Figure 4:
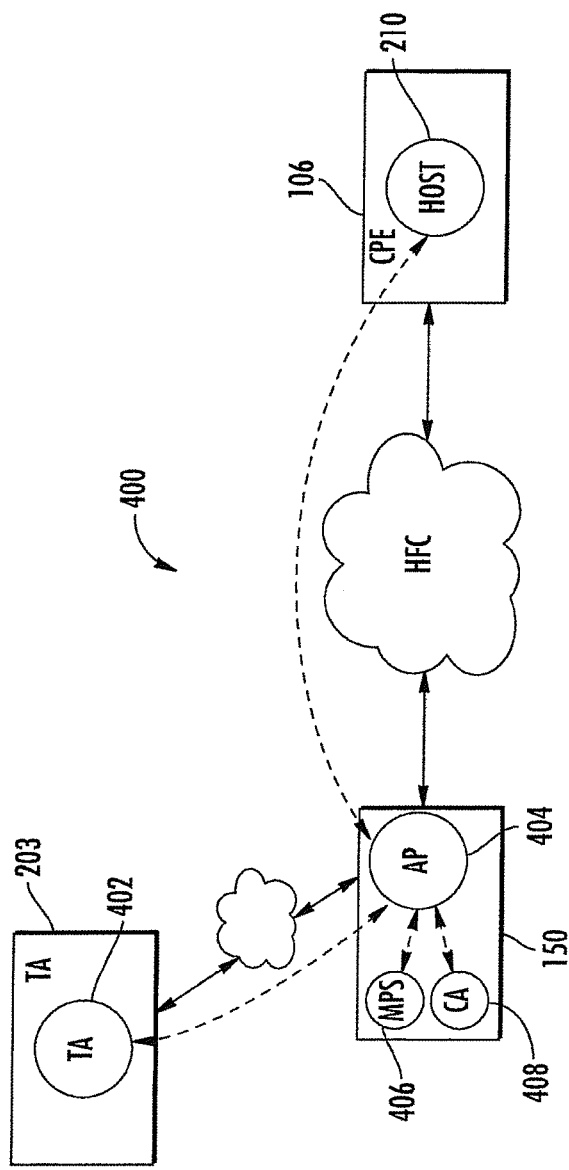
FIG. 4 is a graphical illustration of an exemplary embodiment of the generalized software architecture used to implement the security architecture of the invention.
Figure 4A:
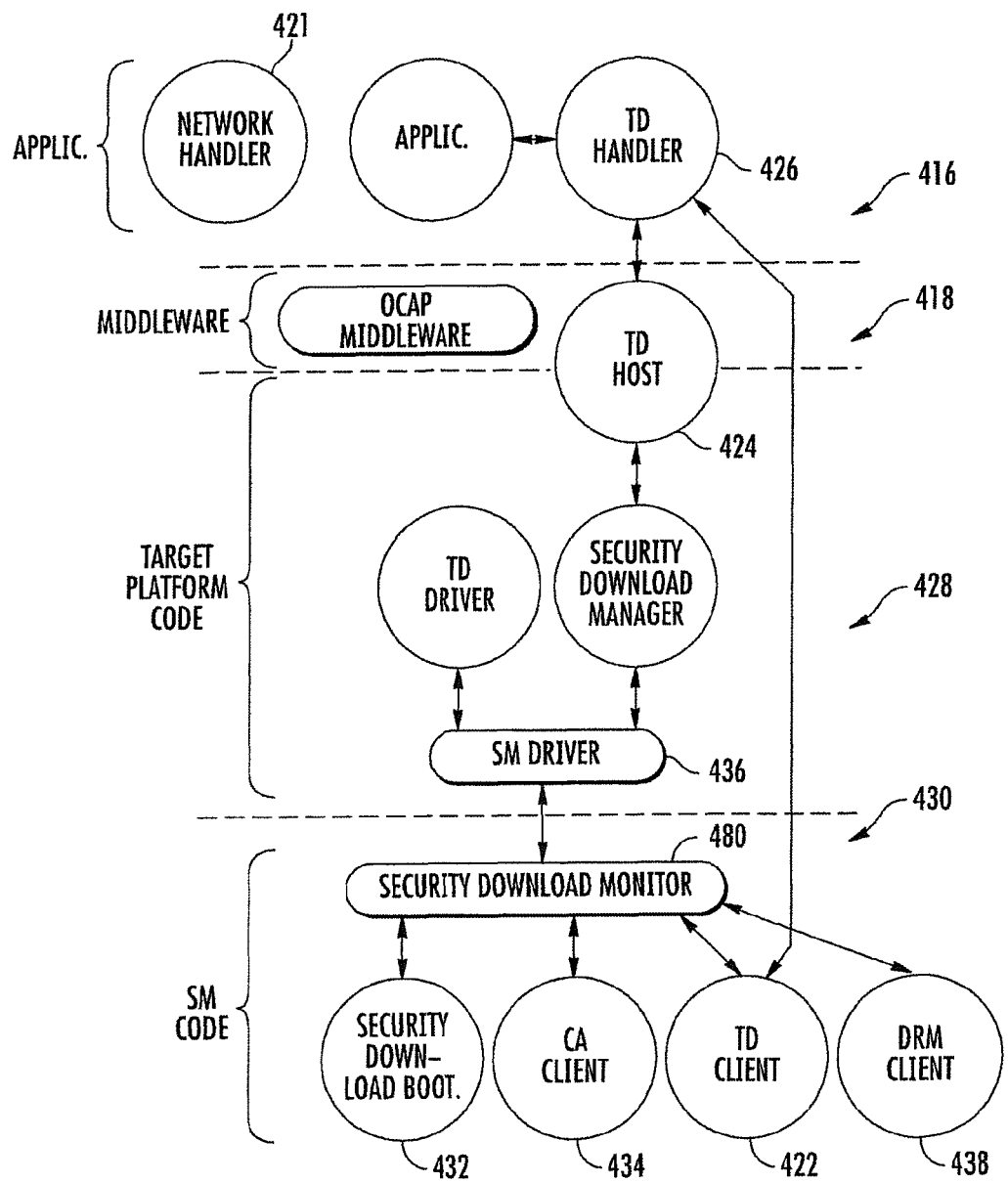
FIG. 4a is a graphical illustration of an exemplary embodiment of the software architecture within the client device (e.g., CPE) used within the security architecture of the invention.
Figure 4B:
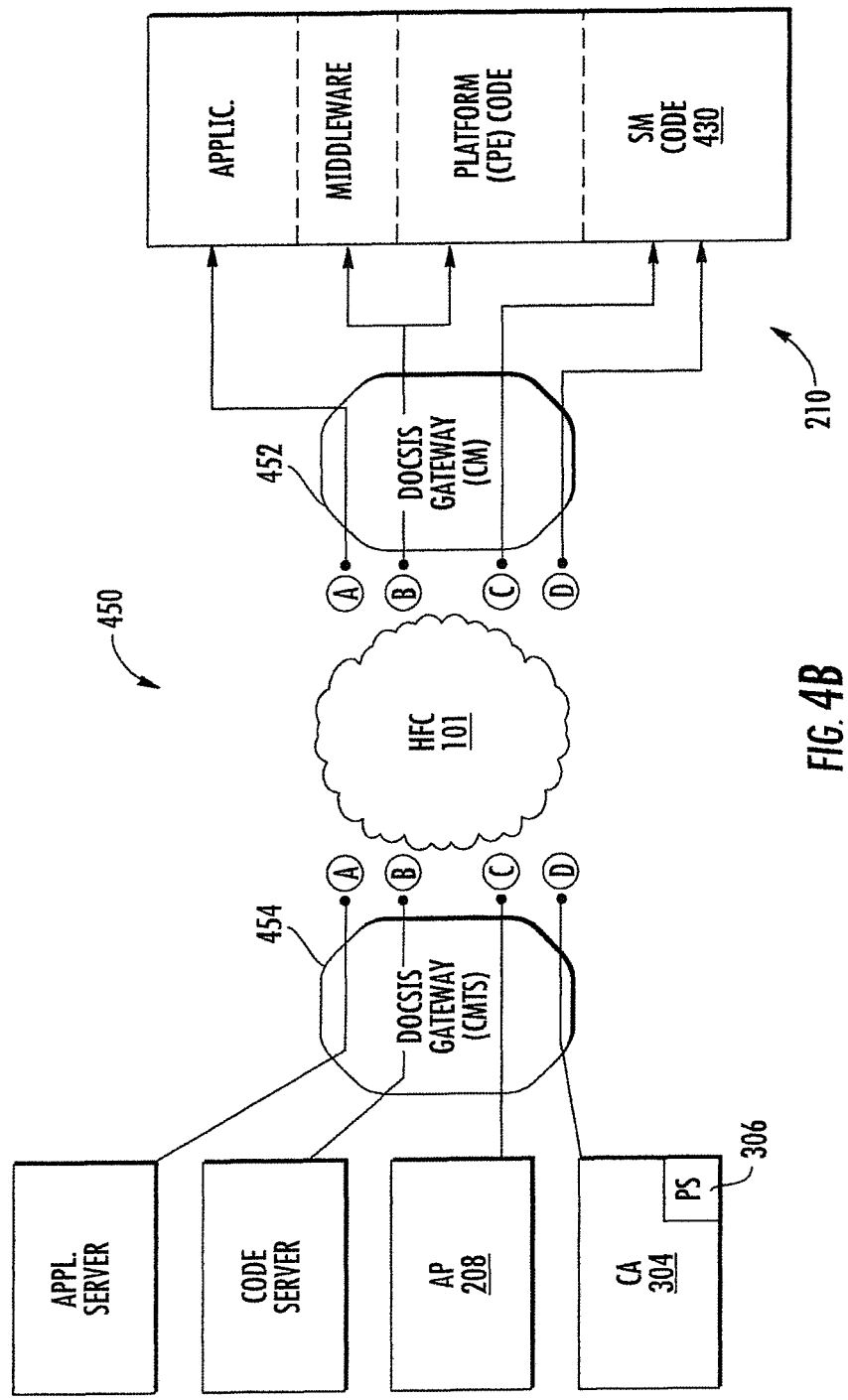
FIG. 4b is a graphical illustration of a DOCSIS gateway and tunnel architecture used in one exemplary embodiment of the security architecture of the invention.

In order to support the network independence of SDS hosts 210, the MSM 339 of the illustrated embodiment delivers network-specific software required for host operation and is termed the Conditional Access Network Handler 421 (FIG. 4b, application layer).

The Broadcast Network Manager (BNM) 341 (FIG. 3h) is a logical component paired with the CANH/network handler 421 running on the host CPE. It originates the network specific interfaces terminated by the CANH/network handler. For example, the BNM 341 is the source of DSM-CC pass-thru messages in networks where this is the message delivery mechanism of choice.

Billing System

The billing system 311 of the exemplary embodiment is a database management system comprising a database and a set of operator-facing applications, such as "Billing" and "Customer Care". In general, the billing system 311 is used by the network operator to: (i) enter service add, change or delete orders; (ii) generate service packages; (iii) reconcile accounts and inquire about billing issues; (iv) generate billing statements; and (v) process payments. The exemplary billing system 311 also contains APIs to enable functional extensibility and for system customization.

In general terms, the billing system 311 communicates device and service provisioning information (ID of the transport processor 516) to the MPS 308 indicating the services a subscriber has subscribed to or is entitled to access. The billing system 311 also communicates to the MPS which devices are associated with a subscriber account.

The SDS infrastructure of the present invention is also optionally configured to support the mediation and distribution of purchase record information between MSOs. Purchase information is recovered from an SM 514 by an AP 208 using a prescribed protocol. The AP 208 forwards this information to the MSO's purchase arbitrator (PA) function, not shown, in order to support purchase record resolution.

Provisioning

Equipment provisioning within the network requires interaction with the CA system 304 (via the MPS). Service provisioning is dependent on a form of MSO-defined Device ID and Service ID determined during service provisioning.

In a leased equipment scenario, if an SM Client image 422, 434, 438 (FIG. 4b) download is initiated by a service provisioning order through a Customer Service Representative (CSR), the billing system 311 sends a unique device identifier (e.g. the Transport Processor ID or TPID) and SDS host topology information to the MPS 308. In turn, the MPS signals the SDS infrastructure to initiate the approved SM Client image download to the SDS host 210, and returns a confirmation to the billing system 311 that identifies the PS 306 to which the device has been assigned. The unique host identifier (e.g. TPID) is used by the billing system 311 to provision services using the PS 306 with specified MSO topology information.

In a retail equipment scenario, if an SM Client image download is initiated by a host 210 being placed on the network, the billing system 311 may receive the unique device identifier (e.g. TPID) and SM topology information from the MPS 308 as reported by the SDS infrastructure. The AP 208 provides this information, including first network connection time stamp, host identification, and other host client configuration information. The MSS 328 provides the services authorized to run on that SDS Host 310. The MPS 308 may need to reconcile the TP Identifier with the CPE/CM IP address and other customer account information.

A central purpose of the SDS infrastructure is to securely deliver approved SM Client images 422, 434, 438 to the SM 514 of CPE 106. This delivery is completed in two parts for each SM 514; one for the "common" part of the image and one for the personalized part of the image. The approved common image part is made available to all SMs of like configuration using a specific CA system 304. The personalized part of the SM Client image is targeted toward a single SM 514, and is therefore delivered using a unicast mechanism of the type well known in the network arts.

An assortment of SM Client images and combinations may be downloaded and managed by the SDS infrastructure simultaneously. These downloads are orchestrated by the AP 208 which enforces SDS provisioning system policy to control which approved SM Client image is delivered to which SM 514. The region over which any bulk upgrade of SM Client images is performed is also controlled and rate-limited in order to limit the amount of network traffic and host resource load added during SM Client image downloads. Download activity is logged by the AP 208 allowing for tracking and reporting of SDS operations.

In order to securely distribute the SM Client images, the SDS infrastructure first obtains images and/or image locations from the CA System vendor or other appropriate source via the PS 306. The common image is securely delivered to the download site, and specific SM information must be provided to the PS 306 for the creation of the personalized SM Client image(s). In the illustrated embodiment, both common and personalized SM Client images are generated and symmetric key encryption or some other mechanism encrypted by the PS 306. Each common SM Client image is encrypted using a unique AES Key which is securely delivered to each SM 514 that installs the Client image.

It is assumed that all SDS hosts 210 are of a configuration capable of completing an SM Client image download when it is attached to the network.

Enforcement of Image Configuration Policy

The SDS infrastructure of the present invention advantageously provides a framework for the definition and enforcement of network operator-defined policy reflecting which CA, TD, or DRM client configuration(s) are running within all SDS hosts 210 on the network in order to assure that only approved SDS Clients are operating within the network.

Before an SM 514 downloads an approved SM Client image 422, 434, 438, the SM must be properly authenticated to the network. Upon initial authentication (when an SM is new to a network), keys are retrieved through direct or indirect contact with the AP or TA 203. Following this initial transaction, subsequent authentications are performed through interaction between the SM 514 and AP 208. The MSO's SDS Infrastructure interacts with the TA in order to obtain keying and SM configuration data.

The exemplary SDS infrastructure announces a list of MSO-approved SM Client images for each class or model of SM 514 or SDS host 210 (e.g., CPE 106) on the network. This is used to indicate to devices migrating into the system the set of approved SM Client images (software) that they need to install. The SDS infrastructure also signals the network information of the AP 208 to which the SM 514 should associate. This information can be delivered in a number of ways including for example via a CM gateway (e.g., so-called "DSG tunnel" as shown in FIG. 4c), DOCSIS multicast, or IP multicast. Several different announcement messages (see discussion of SDS Messaging and Protocol provided subsequently herein) can be generated for different logical or device topologies of the network from the same AP 208.

Through a message created by the TA 203 and forwarded through the AP 208, the SM 514 is given keys that allow it to establish security relationships with the AP it is communicating with. At the successful termination of this process, the client 432 confirms the SM 514 to TP 516 pairing, as well as its public encryption and signing keys (SMEK, and SMSK, respectively).

SDS Infrastructure Components

Referring now to FIGS. 3k-3n, individual components of the SDS infrastructure previously described are discussed in greater detail. In the exemplary embodiments, distributed components are deployed throughout the SDS Infrastructure in order to provide targeted SM Client image downloads to subsets of the overall host population. As previously noted, the host population can be subdivided in several ways including, without limitation, by CPE 106 device type, device services, target CA system 304, operator policy, geography, etc. (or some combination of the above). In the illustrated embodiment, an attempt has been made to divide operations between those requiring secure elements and those that do not, although this is not a requirement for practicing the invention.

Authentication Proxy (AP)

The Authentication Proxy 208 (see FIG. 3k) is a primary component of the SDS infrastructure, and a unit of scalability therein. See, e.g., FIG. 3i, wherein several APs 208 are scaled across a number of different MSO regions and CA systems 304.

The AP is embodied as a physically and logically secure component (e.g., computerized device such as a rack-mounted UNIX or Linux server having digital processor, mass storage, RAM, optional user interface and display, etc.) that communicates directly with SMs 514, TAs 203, the Personalization Server 306, and the SDS Provisioning System 332. It will be appreciated that the AP may be a largely stand-alone device/form factor, or alternatively may be integrated with extant or SDS components. For example, in one variant, the AP 208 comprises a server blade received within an existing cable system host device present at the head-end 150 or BSA hub site. The AP may also be equipped with dedicated or specialized hardware and/or software (e.g., a security processor) for accomplishing specific tasks or functions within the disclosed security architecture such as, e.g., cryptographic algorithm processing, random number generation, and the like. Many different configurations recognized by those of ordinary skill in the computer arts may be used consistent with the present invention.

The exemplary embodiment of the AP 208 provides a variety of different functions within the SDS infrastructure. Specifically, the AP 208: (i) receives approved SM Client Identifier policy and other information from the SDS Provisioning System 332 (or other MSO defined interface) in order to direct SMs to the required software Image configuration; (ii) securely announces approved SM Client image configurations and download information; the AP is capable of generating multiple secure announcements based on network topology, image policy, and SDS host configuration; (iii) authenticates with the TA 203 and the PS 306, and in conjunction with the TA, authenticates SMs 514 and TP 516 pairings; (iv) mediates SM cryptographic element request transactions between an SM and the TA 203, as well as updates the LKS 330 with SM element (e.g. keys, such as SMEK, SMSK) through contact with the TA or LKS; (v) securely interfaces with one or more PS 306 where the PS may service all SM Client types (CA, DRM, TD) or a single SM Client type; (vi) securely requests symmetric key encrypted common SM Client images and co-ordinates SM download of the common image, and also directs SM Clients to correct common image location, as well as controlling the scheduling of download; (vii) securely forwards the SM SMEK to the PS 306 in order for the PS to encrypt the SM personalized image; (viii) securely forwards a symmetric key encrypted personalized SM Client image from the PS 306, and forwards it to the relevant SM 514; (ix) signals completion of SM Client image downloads to the relevant PS 306; (x) implements server-side protocols (e.g., PMP and NPM protocols); (xi) generates local keys for communication using specialized hardware (e.g., specially configured and physically secure encryption/decryption processing boards or modules); (xii) persists and reports the configuration and status of SM Clients (e.g., TD, CA, and DRM Clients 422, 434, 438 running on the SM 514); (xiii) receives, persists, and forwards purchase-related information (e.g., purchase report messages) from the SM 514; and (xiv) requests and forwards SM Log messages from the SM-stored information logs on behalf of the MSO's Network Management System (NMS) 343 (FIG. 3h) and other operations support system functions.

In the exemplary embodiment, the AP securely generates random numbers necessary for message identification and other information required by the SDS Protocol. Specifically, The AP securely generates random numbers for producing unique session keys according to FIPS140-2, although this is but one possible configuration.

The AP can obtain (and store in secure memory associated therewith) an RSA encryption key pair, and an RSA Signing key pair, each signed by the Trusted Authority 203. The illustrated AP supports multi-bit asymmetric encryption key pairs as well as the RSA algorithm for signing and verification (as well as for encryption and decryption), although it will be appreciated that other encryption schemes and requirements may be substituted with equal success.

The AP also supports symmetric key encryption for encrypting attachments to SDS messages, as well as secure hashing algorithms for hashing in applicable SDS messages, using algorithms well known to those of ordinary skill in the cryptographic arts.

The AP also may be optionally configured for various tiers of users (using any number of well-known multi-tier, multi-user access control software packages), so only the authorized administrators can update the configuration of the AP server itself.

The AP communicates with the broadcast carousel and download servers (TFTP, HTTP) to load common SM Client images.

In the illustrated embodiment, the AP 208 is also configured via its software programming to delete a SM/TP pair from the regional network when a network move is known to have occurred. The AP delivers SM public encryption keys to the PS. AES keys are used by the PS 306 to encrypt unicast SM Client images and can be encrypted in the PS using the SM public key.

The AP also provides a mechanism to control, suspend, and resume SM Client image downloads under both normal and emergency circumstances. The AP is also configured to automatically turn off SM Client Image downloads in the case that many SMs are reporting failure to upgrade or there is no response from the group of SMs after a configurable time period.

In terms of data persistence, the exemplary AP supports communication of DCAS information by groups of Host IP address, Host HW and SW version, Model Number, SM Client Image(s) version, DSG tunnel address and SM identification information (SMID) as instructed by MSO configuration and Policy.

The AP supports a minimum number (e.g., one hundred (100)) common SM Client images as well as inventory and tracking of the various CA/DRM/TD Client images it has been made aware of through interaction with the PS, SPS, and SMs. The AP also provides visibility into SM Client image-related information such as SM Client status, SM Client image configuration, and SM Client image download status.

In one configuration, the AP allows for complete failover redundancy with a high-availability configuration in the event of a component failure using a 1:1 redundancy configuration. In this configuration, a primary AP failing would be immediately replaced by the redundant AP to support connectivity or authentication of new devices on the network. The exemplary AP is also configured for "five-nines" availability as previously discussed.

In the illustrated embodiment, the AP 208 is configured to authenticate at minimum rate of 50 SM Clients per second. This rate assumes that updated keys exist in both the SM and AP and no communication with the TA is required as part of the authentication process. An AP MUST support a minimum of 1 million SM Clients.

The AP supports both scheduled and forced immediate downloads as directed by MSO download policy, as well as triggering forced downloads to individual SMs and to groups of SMs as instructed by the SPS policies. The exemplary AP also supports transitioning between old, new and roll back of SM Client images.

Personalization Server (PS)

The SDS Personalization Server (PS) 306 (see FIG. 3*l*) couples one or many CA System(s) 304 (as well as DRM and/or TD subsystems) with the SDS infrastructure. The exemplary embodiment of the PS 306 comprises a physically and logically secure computerized system (e.g., server, blade, etc.), and acts as the source of all personalized SM Client images for distribution, download, and management by the SDS infrastructure.

The PS 306 provides SM Client images to support CA, DRM, and/or TD functionality. While shown in the exemplary embodiments (e.g., FIG. 3*h*) as separate entities, the PS functions for each of these different aspects (CA, DRM, and TD) can be integrated into one logical process and even one physical form factor if desired.

In the exemplary embodiment, one PS 306 exists for one or many CA, TD, or DRM system instances, and provides the following functions: (i) authenticates with its associated AP(s) 208; (ii) accepts requests forwarded by the AP for SM Client images; (iii) determines which SM Client image components are to be updated, and encodes both the common and personalized images accordingly; (iv) generates the image cryptographic elements (e.g., AES image keys) for the personalized and common SM Client image downloads; (v) generates personalized SM Client image components based on, inter alia, the SM's chip identifier; (vi) identifies the common image components and location of the SM Client image based on the SM's class identifier; (vii) returns a signed and encrypted pair of cryptographic elements (e.g., AES keys) to the AP 208 for unicast delivery to a specific SM 514 associated with an SDS host 210, thereby allowing the SM 514 to decrypt both the common SM Client image and the personalized SM Client image; (viii) interfaces to one or more CA systems 304; and (ix) receives status updates of SM Client image download status and failures from the AP 208.

The PS 306 maintain records of the number of download transactions and which SMs received downloads after receiving confirmation from AP (based on the AP receiving a DownloadComplete or similar communication from the SM 514). The PS also provides programmable alarming to indicate passing a threshold in the number of available personalized SM Client images, thereby potentially indicating faulty or surreptitious behavior.

The PS of the exemplary embodiment is configured to deliver personalized SM Client images at a minimum sustained rate of 100 SM images per second. This rate assumes that updated keys exist in the PS, SM and AP and no communication with the TA is required as part of the personalized image delivery. The PS generates low-latency responses to all AP requests (e.g., within 1 second of receiving).

The PS generates and securely provides the common SM Client image to the AP 208 encrypted with a common symmetric key generated by the CA system 304 based on, e.g., the SM Class Identifier provided by the AP. The PS also generate the personalized SM Client image symmetric key (which is itself encrypted with the target's SMEK). The PS further provides the common SM Client image protected with asymmetric key (also encrypted using the SMEK).

Local Key Server (LKS)

The Local Key Server 330 (FIG. 3*m*) of the illustrated embodiment comprises an optional, persistent, physically and logically secure store of MSO security information. The content of the LKS 330 reflects the MSO's keying information for the entire trusted key store across all client and network devices, thereby providing benefits in terms of reduced communication overhead, centralized storage, redundancy, and reduced latency for accesses. Specifically, in one aspect, such an approach reduces the number of communications between the AP and the TA.

The Local Key Server 330 acts as a logical entity independent of any other component within the SDS infrastructure, and can be implemented in a number of different physical and logical configurations in order to best suit the architectural requirements of the MSO.

The exemplary LKS 330 of FIG. 3m provides the following functions: (i) provides a local cache of MSO keying information useful for disaster recovery and provisioning workflow for APs 208 and the SDS provisioning system 332 (see FIG. 3j); (ii) contains all SM keying information (e.g., SMEK, SMSK) for the MSO network; and (iii) contacts the TA 203 using a secure (e.g., transport layer security or TLS) interface for the retrieval of secure records.

The contents of the LKS 330 can either be updated through contact directly with the TA 203, or via an AP 208 or other such entity that has received updated keys directly from interaction with the TA 203.

SDS Provisioning System (SPS)

The SDS Provisioning System (SPS) 332 (FIG. 3n) is the central manager and repository for SM Client image configuration and MSO approved client policy. Recognizing that each MSO takes different architectural approaches to their provisioning system environment, the exemplary SPS 332 is designed with a high degree of agnosticism, thereby accommodating many different provisioning system implementations.

Hence, the SPS 332 can be characterized in terms of its primary high-level functional requirements, including: (i) serving as a Policy Decision Point (PDP) for MSO SDS policy including approved client identifiers, SM Client image download configuration, download directives and schedule, priority, and download mechanism; (ii) distributing SDS policy to APs 208; (iii) providing optional interface with the LKS 330 in order to retrieve keying information; (iv) responding to AP notifications for unrecognized SDS hosts 210 or requests for SM Client image configuration and download policy; and (v) determining the topological relationship between the SM 514, AP 208, PS 306, and CA, TD and DRM systems (i.e., the AP understands the location of the SM (or host) in the network, and can accordingly identify the appropriate PS to use, along with the necessary CA, TD and DRM systems).

The SPS allows the MSO to assign it one or more APs 208, and to assign Personalization Servers 306 to the APs.

The SPS supports configuration of SDS policies based on communication of CA/TD/DRM information by groups; e.g., by Host IP address, Host HW and SW version, Model Number, Firmware version, DSG tunnel address, Host associated Tier of Service and SM identifying information (i.e. policy management based on host profile).

The exemplary SPS further supports configuration of the time and frequency of security record requests.

Interfaces

In the exemplary embodiments, the SDS infrastructure components interact through a collection of network software interfaces (NSIs). A total of seven (7) SDS infrastructure NSIs are used within this exemplary architecture, although it will be appreciated that more or less interfaces, and even different types of interfaces, may be used consistent with the invention.

Of these seven interfaces, only a subset of four (4) are specified, while three (3) are implementation-specific (e.g., MSO defined) and therefore advantageously can reflect the potentially different system and architectural requirements unique to each MSO. These seven interfaces include: (i) Secure Records Exchange Interface (DCAS-SRXI); (ii) Image Exchange Interface (DCAS-IXI); (iii) Purchase Report Interface (DCAS-PRI); (iv) Secure Key Request Interface (DCAS-SKRI); (v) Operational Support System Interface (OSSI); (vi) Provisioning Interface; and (vii) Local Records Exchange Interface. These interfaces are now discussed in greater detail.

(i) Secure Records Exchange Interface (SDS-SRXI)—In addition to the Key Request Interface, the TA 203 also provides keying information via the SRXI to the Local Key Server 330. The LKS periodically requests updated keying information for the local caching of security records, as previously described. The content of the messages from the TA 203 to the LKS 330 over the SRXI includes updates of the following: (a) SM encryption and signing keys (SMEK, SMSK) for all SMs within the MSO SDS infrastructure; (b) SM 514 to TP 516 pairing information including TP Pairing Keys (TPPK) for all SDS hosts 210 within the MSO SDS infrastructure; (c) AP encryption and signing keys for each AP 208 within the MSO SDS infrastructure; and (d) PS encryption and signing keys for all PSs 306 with the MSO SDS infrastructure.

The SRXI provides mutual authentication and privacy between the TA and the LKS 330. The SRXI allows the LKS to obtain security records in a standard format from TA 203, and allows the LKS to request and obtain security record updates at any time. The SRXI only delivers security records for devices authenticated to the MSO, yet allows the LKS to obtain the security records for all SDS hosts 210 authenticated to the MSO or delivered retail. This can be done for individual and groups of SDS devices.

The SRXI also prevents unauthorized monitoring of the exchange. It implements a Web Service (WS) interface between the AP and LKS that enables the LKS to dynamically request updates of the TA security records.

The SRXI of the illustrated embodiment is based on the well-known SOAp/eXTensible Markup Language (SOAP/XML) version 1.2, although other languages may be used with equal success, the SRXI being effectively language-agnostic. The SRXI implements Secure HTTP (HTTPS) as the message transport, although other secure (or even non-secure) transport protocols may be used consistent with the invention.

(ii) Image Exchange Interface (SDS-IXI)—Each PS 306 and AP 208 communicate via the Image Exchange Interface (IXI) for interaction supported by the PS 306. The IXI interface provides a medium for at least three functions; (1) PS and AP mutual authentication, (2) common SM Client image download information exchange, and 3) personalized SM Client image information exchange.

The authentication function occurs first in order to establish trust between the PS 306 and the AP 208. The PS is, in the illustrated embodiment, required to periodically request AP key information directly from the Trusted Authority 203 in order to update its local trusted key store in order to verify AP signatures. The message path for this key request is through the AP, which forwards the request to the TA.

Likewise, the AP 208 is required to periodically request PS key information from the TA in order to update its local key store in order to verify PS signatures.

The SM Client common image exchange function requests new common image download information that will be shared by the SDS hosts 210 assigned to a specific PS 306.

The SM Client image exchange occurs for each SM 514 assigned to the PS. According to one exemplary protocol (FIG. 3o), the AP 208 first provides device credentials along with the SM public key to the PS (step 380). In turn, the PS returns a device-specific personalized SM Client image, along with common SM image download directives and decryption information (step 382). The SM Client image download is encrypted for the specific SM target (e.g., CPE 106) per step 384, and forwarded by the AP as a message attachment (step 386); see discussion of message formats and protocols provided subsequently herein.

Finally, the AP signals the PS per step 388) to indicate the success or failure of delivery of the SM Client images to the SM 514 of the target host.

The exemplary IXI implements the Personalization Message Protocol (PMP, a protocol specifically developed for image exchange, although other approaches may be used). The IXI permits the AP to use the SM Class Identifier and SM Client Identifier to request the common SM Client image. The IXI allows the PS to create a personalized SM Client image and deliver the common image encryption key in a message that is specifically encrypted for the target SM. The IXI further allows the AP to provide the SM Identifier and public key to the relevant CA system 304 (via the PS) in exchange for the secured common SM Client image encryption key. The IXI also permits the AP to report SM Client image download status to the PS.

The AP communicates with the Personalization Server 306 regarding SM Client image information and which devices are assigned to which SM Client image version using the IXI. The AP securely forwards the personalized SM Client image obtained from the PS using the IXI. The AP receives all personalized Client images over the IXI using the PMP, and then forwards using an appropriate message.

(iii) Purchase Report Interface (SDS-PRI)—The SM Purchase Report Message (PRM) is defined so as to enable the transfer of SDS host-stored purchase report information from the SM 514 of the host 210 to the AP 208. The purchase report information forwarded by the SM is in the illustrated embodiments returned to the CA System 304 from which it originated. The AP persists, and forwards all reports received from all SMs to a "purchase arbitrator" via the PRI. The purchase information forwarded by the AP on behalf of each SM includes, e.g.: (a) the SM Purchase Report attachment; (b) the SM secure microprocessor's encryption key (SMEK); (c) the APID (AP Identifier) when a valid purchase was made; (d) the SM Client Identifier; and (e) the TPID (TP Identifier).

(iv) Secure Key Request Interface (SDS-SKRI)—The primary interface for the distribution of keying information from the TA 203 is the SKRI. The SKRI provides a transactional interface for the updating of key information and a path to retrieve security records based on both SM and PS key requests.

The SKRI interface is used in the exemplary embodiments to carry requests for keying information between the AP 208 and the TA 203, including: (a) SM/AP—an SM 514 will request AP key information from the TA (the SM request tunneled to the TA 203 through the AP 208) if it does not recognize the AP (APID) to which it is assigned, or it detects a signature verification failure; (b) AP/SM—an AP will request updated SM key information from the TA 203 for a single SM Client when the SM is unrecognized (e.g., new) or the keying information for the SM is not otherwise available to the AP. An AP may request updated SM key information in conjunction with a SM request for TA keys by 'piggybacking' the forwarded SM key request for TA keys with its own request for the SM's keys; (c) PS/AP—a PS 306 will request updated AP keying or status information from the TA for an AP to which it is interfaced for the purposes of signature verification; and (d) AP/PS—an AP will request updated PS keying information from the TA for the purposes of PS signature verification.

In the illustrated embodiments, the message path of all TA key requests is through the AP, which in turn forwards messages to the TA via the SDS-SKRI.

The exemplary SKRI provides mutual authentication and privacy between the TA and the AP, and allows the AP to obtain security records in a standard format from TA 203. The SKRI delivers security records for client and network devices associated with the MSO and those SMs known to be retail only. A Web Service (WS) interface is also provided between the AP 208 and LKS 330 that enables the LKS to dynamically request updates of the TA security records.

The SKRI of the illustrated embodiment is based on the well-known SOAp/eXTensible Markup Language (SOAP/XML) version 1.2, although other languages may be used with equal success, the SKRI being effectively language-agnostic. The SKRI implements Secure HTTP (HTTPS) as the message transport, although other secure (or even non-secure) transport protocols may be used consistent with the invention.

The AP forwards SM KeyRequest messages to the TA and TA KeyResponse messages to the SM using the Key Request Interface.

(v) Operational Support System Interface (OSSI)—The Operational Support System Interface is provided for the exchange of network management information between the SDS infrastructure and the OSS/NMS of the MSO. In one embodiment, the SDS-OSSI implements standard network management protocols for the collection and distribution of operationally significant SDS infrastructure information (such as SM Local Logs, SM Status information, and AP alerts); use of such standard protocols advantageously avoids proprietary or new protocols, thereby simplifying SDS infrastructure implementation in existing networks.

(vi) Provisioning Interface (PI)—Recognizing that operators implement varying OSS infrastructures and "back-office" configurations, the provisioning system interface (PI) is included to permit communication between various provisioning system components and the AP 208.

When an SM joins the network, the MSO SDS Provisioning System (SPS) 332 provides the AP 208 with the approved SM Client identifiers and download directives corresponding to the SM Capabilities and Policy. The PI may be used to carry SDS host network location and SDS host identification information between the AP and SPS. In addition, the PI may carry SDS download policy and scheduling information to the AP from the SPS 332.

(vii) Local Records Exchange Interface (LRXI)—Components of the SDS infrastructure such as the AP 208 and SPS 332 may request keying information stored in the Local Key Server 330 using the LRXI. In addition, an AP may update SM keying information in the LKS 330 based on current SM keys that the AP has received directly from the TA 203. The details of specific LRXI implementations and configurations are intentionally flexible and left to the MSO.

The content of messages exchanged over the LRXI includes: (a) keys for all SDS hosts 210 associated with a specific AP 208; (b) the TP pairing key for all SDS hosts associated with a specific AP; and (c) keys associated with a specific AP.

Appendix I hereto describes these exemplary interfaces in greater detail.

FIG. 4 illustrates a generalized high-level software architecture 400 for use in providing the security download functions of the present invention. This architecture is designed to satisfy several functions, including inter alia: (i) creating a secure system for downloading CPE (i.e., SM Client) software in the field; (ii) implementing a secure system for cryptographic element (e.g., key) management, distribution and validation; (iii) providing adequate user functionality in the absence of 2-way communication while also meeting security objectives; (iv) support for simultaneous video decryption streams and key management; and (v) implementation of a common architecture for both lease and retail CPE models.

Specifically, as shown in FIG. 4, the architecture 400 comprises a trusted authority (TA) component 402 that is in logical communication (over network or other physical links of the type previously described herein with respect to FIG. 2) with an authentication proxy (AP) component 404. The AP component 404 is in communication with an MPS component 406, as well as a conditional access component 408. The AP component 404 is also in logical communication with the host component 210 previously discussed with respect to FIG. 2. It will be appreciated that while the AP, MPS, and CA components 404, 406, 408 are shown disposed at the head-end 150 of the network, other architectures and placements may also be readily employed, such as where one or more of these components are disposed at a BSA hub site within a broadcast switched network (see, e.g., FIG. 3d).

FIG. 4a illustrates an exemplary software and firmware architecture used within the CPE 106 of FIG. 4. The trusted domain (TD) and download functionality of the present invention is, in one embodiment, distributed across several software components and layers (including an application layer 416, middleware layer 418, platform code layer 428, and SM layer 430) present in the target platform (e.g., CPE 106). Specifically, as shown in FIG. 4a, these software and firmware components comprise: (i) a TD SM Client 422 which is either pre-positioned or downloaded to run in the secure microprocessor (SM); (ii) a TD Host module 424 resident on the target platform; and (iii) an TD Handler 426 module which is configured and downloaded by the network operator.

The TD Host 424 is responsible in the exemplary embodiment for providing TD-standardized encryption and decryption of the content streams, as well as storage of security packages associated with content. The TD Client 422 is responsible for processing management data and information (e.g., content management information or CMI), generating encryption keys for the content, and controlling access to content stored within the TD (e.g., through processing of security packages). In the illustrated embodiment, the TD Host 424 is responsible for the encryption and decryption of content, while access to the cryptographic key (i.e., "content" key) needed to decrypt the content can only be provided by the TD Client 422 associated with the SM code layer 430. The TD Handler 426 interfaces with both the TD Client 422 and the TD host 424, and is responsible for, inter alia, pacting as a proxy for information transferred between the TD client/system and OCAP applications.

The security download bootloader module 432 in the exemplary embodiment comprises firmware loaded on the SM during manufacture or upon installation (although in some embodiments where the firmware is not "burned in," it may also be "flashed" or reprogrammed if desired in certain embodiments, such as via a download from the head-end or hub site). Upon SM boot-up, the bootloader 432 checks the CA client 434 for integrity and correctness according to data received from the authenticated MSO network. The bootloader 432 ultimately hands off control of the SM to the verified CA Client 434. The bootloader also "wipes" off SM data upon a new SM Client (i.e., CA Client, DRM Client, or TD Client) software load from the network.

The CA client 434 comprises conditional access code that is downloaded onto the CPE and that is particularly adapted to the network within which the CPE is operating. This code handles the key management and control for conditional access systems, as described in detail subsequently herein with respect to FIG. 6b.

The SM driver 436 is part of the host platform (e.g., CPE) code and provides a software interface from the host platform code to the SM code. The SM driver routes messages to and from the SM, and maintains information on the state of the SM.

The DRM client 438 comprises DRM code that is downloaded onto the CPE and is, in one embodiment, responsible for working with other "output domain" entities and could translate content from a TD into another DRM environment. For example, the DRM client might implement the security portion of the Digital Rights Interface (DRI) that was defined by OpenCable for moving content from a CA/copy protection domain into a DRM domain (e.g., Microsoft DRM).

FIG. 4b illustrates an exemplary DOCSIS or cable modem (CM) gateway architecture useful with the software architecture of FIGS. 4-4a for providing security download and control functions within an cable network. In the illustrated embodiment, the client-side host 210 uses a DOCSIS "gateway" 450 (comprising both client-side and CMTS-side gateway components 452, 454) to send information to and from the head-end or BSA hub processes (i.e., AP component 404). Specifically, the gateway is used to send/receive download (e.g., DCAS) messages to the host 210 via a CA tunnel formed through the DOCSIS gateway. The gateway also carries traditional Out-Of-Band (OOB) messages generated by or for delivery to the CPE 106, such as conditional access (CA) messages including entitlements, System Information (SI) messages, Electronic Program Guide (EPG) messages, Emergency Alert System (EAS) messages, etc. The gateway can therefore be considered a multi-channel logical "tunnel" between the CMTS and the CPE 106.

At boot-up, the cable modem (CM) or other DOCSIS-enabled device will establish the appropriate tunnel, as well as ranging, registering and receiving configuration information from the CMTS. The SM driver 436 (FIG. 4a) requests to pass download messages to the security download bootloader module 432. The SM driver also requests that the gateway invoke the appropriate tunnels for the CA Client 434, TD Client 422, and DRM client 438. The CPE platform code also establishes an application tunnel for any security downloads (e.g., DCAS client image), as well as any application data.

As previously noted, the invention is in no way limited to code or cryptographic element download via the cable modem (CM); however, this often affords a convenient mechanism for doing so, especially when the CM is integrated with the CPE 106 (such as in the "converged" premises device previously described herein. Alternatively, the code and key downloads might be accomplished via in-band channels, such as using the high-speed data download techniques and apparatus described in co-owned and co-pending U.S. patent application Ser. No. 11/013,665 entitled "Method and Apparatus for High Bandwidth Data Transmission in Content-Based Networks" filed Dec. 15, 2004, now U.S. Patent Application Publication No. 2006/0130107, and which is incorporated herein by reference in its entirety, in addition to or in place of the cable modem data gateway previously described. This approach allows for data download at accelerated rates via a "point-to-point" approach, wherein a session is established between the receiving entity (such as the CPE 106) and the distributing entity (e.g., a head-end server) using one or more allocated QAMs, and a program identifier. Session establishment and data flow control are implemented using protocols and bandwidth that are typically used for delivery and control of video-on-demand (VOD) or similar services, thereby obviating any substantive modifications to the existing network infrastructure. Sessions can be established for the data transfer, and then immediately terminated when the transfer is completed, thereby rapidly freeing up bandwidth on the network as with a conventional OD session.

Exemplary CPE—

Figure 5:
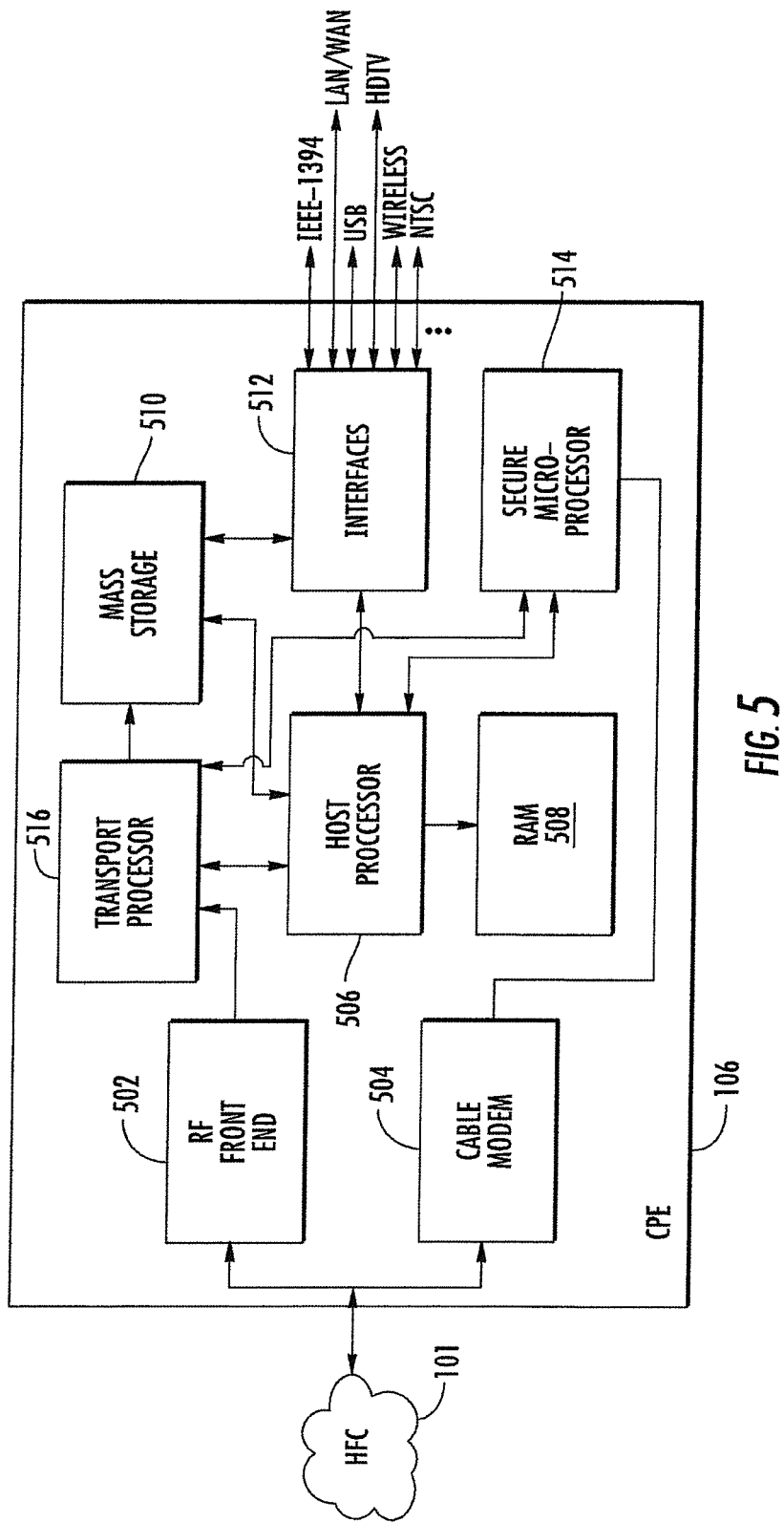
FIG. 5 is a functional block diagram of one exemplary embodiment of the security-enabled client device (e.g., CPE) of the invention.

FIG. 5 illustrates a first exemplary embodiment of client premises equipment (CPE) 106 incorporating the security download host 210 functionality of the present invention. As shown in FIG. 5, the CPE 106 comprises an OpenCable-compliant embedded system with integrated RF front end 502 (e.g., tuner stage, demodulator, etc.), cable modem (CM) 504, host digital processor (e.g., microprocessor) 506, RAM 508, mass-storage device 510, and a plurality of back-end interfaces 512 (e.g., video/audio interfaces, IEEE-1394 "Firewire", USB, serial/parallel ports, etc.) for interface with other end-user apparatus such as televisions, personal electronics, computers, WiFi/PAN or other network hubs/routers, etc., and for distribution of content or signals to one or more SODs or NSODs. The interfaces 512 may also be configured to receive data or signals from connected devices within the SODs or NSODs. While shown as an integrated device, it will be readily apparent that these components may be provided separately, and even exist in different locations so long as security requirements and policies are maintained.

The CPE 106 also optionally includes a recording device (e.g., DVD burner) 525 useful for recording the user's media, as well as (optionally playing it back after recording).

Other components which may be utilized within the device (deleted from FIG. 4 for simplicity) include FIFO or buffer memory (which may be implemented in RAM or otherwise), direct memory access (DMA) units, various processing layers (e.g., DOCSIS MAC or DAVIC OOB channel, MPEG, etc.) as well as media or network processors (NPs) and other specialized SoC or ASIC devices. These additional components and functionality are well known to those of ordinary skill in the cable and embedded system fields, and accordingly not described further herein.

The host 210 associated with the CPE 106 of FIG. 5 further comprises a secure microprocessor (SM) 514 in data communication with a transport processor (TP) 516, each of the foregoing comprising an integrated circuit in the exemplary embodiment. It will be appreciated that while shown as separate devices, the SM, TP and host microprocessor 506 can be physically integrated into a common form factor or chip (e.g., SoC device) if desired.

The device 106 of FIG. 5 may also be provided with an OCAP-compliant monitor application and Java-based middleware which, inter alia, manages the operation of the device and applications running thereon. It will be recognized by those of ordinary skill that myriad different device and software architectures may be used consistent with the invention, the device of FIG. 5 being merely exemplary. For example, different middlewares (e.g., MHP, MHEG, or ACAP) may be used in place of the OCAP middleware of the illustrated embodiment.

The host processor 506 and internal bus and memory architecture of the CPE 106 of FIG. 5 are ideally adapted for high-speed data processing, at least sufficient to support the client-side processing tasks necessary to implement the DCAS/TD/DRM download and configuration functionality of the present invention effectively and without significant latency. This may be accomplished, e.g., through a single high-speed multifunction digital processor, an array of smaller (e.g., RISC) cores, dedicated processors (such as a dedicated MPEG media processor and interface controller), etc. in addition to the SM 514 and TP 516 used for specific security-related functions as described below.

In the illustrated embodiment, the SM 514 is in direct or indirect data communication (e.g., via the DOCSIS gateway previously discussed) with the network AP 208 which is disposed at, e.g., the head-end 150 or the BSA hub site. The AP authenticates the CPE (via its SM 514 and other relevant data), thereby allowing the download protocol to proceed.

Once authenticated, the SM 514 is configured to securely perform the download protocol (described subsequently herein), generate and store keys and other cryptographic elements, store CA data. See FIG. 4b for an exemplary software and firmware configuration for the SM 514. In the illustrated embodiment, the SM is programmed and keyed by the TA (via the AP and other network components) as previously described with respect to FIG. 2.

The TP 516 is configured to receive encrypted content (e.g., video) or other data from the distribution network 101, and decrypt this content/data using indigenous decryption capabilities (e.g., a public/private key pair). The SM 514 is configured to receive conditional access (CA) data from the network (or via another delivery mechanism) in order to enable the decryption by the TP (i.e., recovery of the control words needed to decrypt the content).

The exemplary embodiments of the CPE 106, when used in conjunction with the network architecture previously described, advantageously eliminate the need for physical media or devices (e.g., a "CableCard" or the like). Rather, the user and network operator are provided with a CableCard-like functionality, yet using a network download paradigm, and even when only unidirectional communication is available. This configuration also supports a retail business model (i.e., sale of STBs or other such CPE at the retail level, such as by third-party manufacturers), as well as OEM devices present in the installed customer base.

As part of the application layer 416 of the CPE 106 (see FIG. 4b), various different types of client applications may be running (or operable to run) consistent with the present invention. In one embodiment, a separate (dedicated) client application adapted for DCAS or other security download functions may be provided. This application provides the CPE user with an interface to the security download system, such as for the entry of information, status information, troubleshooting, etc. This may include, e.g., a separate GUI or other type of UI, and may operate substantially independent of other applications on the CPE 106. Alternatively, this functionality may be integrated into one or more existing or downloadable applications (such as a VOD application, "Watch TV" application, navigator, TV-commerce application, or even EPG).

As yet another option, the download and security configuration functionality may be completely transparent to the end user, such as where the DCAS/TD/DRM components running on the CPE 106 provide all necessary messaging, inputs, and call functions to update or reconfigure the CPE 106.

The CPE middleware and any other relevant components may also be modified in order to provide a "universal" software interface for at least certain aspects of the security download functions, such that application developers can write their applications to make use of these aspects. Similarly, the "universal" CPE described in co-pending and co-owned U.S. patent application Ser. No. 10/782,680 filed Feb. 18, 2004 and entitled "Media Extension Apparatus And Methods For Use In An Information Network", now U.S. Pat. No. 8,078,669, incorporated herein by reference in its entirety, may be used consistent with the present invention in order to allow specific features and extensions (e.g., Java or JMF extensions) to be configured by a particular MSO or other entity when the CPE is used in their network.

Various indications are optionally utilized within the hardware environment of the CPE 106, including e.g., an LED or other indicator to show cable modem link and activity, power status, LAN—802.3 activity on one or more Ethernet ports (if installed), etc. Furthermore, a "soft" display (e.g., TFT or LCD display having software generated indications) may be used on the CPE 106 (or a remote device in communication therewith) to provide a flexible display environment. The methods and apparatus of co-owned and co-pending U.S. patent application Ser. No. 10/773,664 filed Feb. 6, 2004 entitled "Methods And Apparatus For Display Element Management In An Information Network", incorporated herein by reference in its entirety, may be used within the CPE 106 or other communicating devices. Specifically, display elements such as GUI windows or discrete indicators in a client device running multiple related or unrelated applications can be managed and controlled. In one embodiment, an improved window management entity is provided within the device with which HAVi-compliant application(s) can interface in order to access display elements according to a priority structure or hierarchy. One or more privileged applications are designated and allowed to affect the priority structure, including requesting a new in-focus application to be placed atop the priority structure. The network operator can also optionally control the operation of the window manager remotely via a network agent.

The CPE 106 mass storage device 510 of the illustrated embodiment comprises a Serial-ATA (SATA) or Ultra-ATA (also known as Ultra-DMA, or ATA-4/5/6/7) hard disk drive for the operating system and content storage of at least 300 GB, although higher or lower capacities and even RAID arrays may be used for this purpose. The CPE is also optionally configured allow for an external USB (e.g., USB 2.0) drive to be attached and automatically added to the existing storage. It will also be appreciated that USB keys of the type well known in the art can be used consistent with the USB port(s) of the CPE 106, so as to make the data storage device highly mobile and of very small size.

The RF front end 502 of the CPE may comprise a traditional video RF front end (e.g., tuner) adapted to receive video signals over, e.g., a QAM. For example, one exemplary embodiment of the RF front end 502 comprises one or more tuners, a demodulator, decryption module, and demultiplexer of the type well known in the art, although other configurations may be used. A wideband tuner arrangement such as that described in co-owned and co-pending U.S. patent application Ser. No. 11/013,671 entitled "Method and Apparatus for Wideband Distribution of Content" filed Dec. 15, 2004, now U.S. Patent Application Publication No. 2006/0130113 and which is incorporated herein by reference in its entirety, may also be utilized, such as where the content associated with one or more program streams is distributed across two or more QAMs. Additionally, the RF front end 502 modulates, encrypts/multiplexes as required, and transmits digital information for receipt by upstream entities such as the CMTS or a network server.

It will also be recognized that the present invention may be used in conjunction with a number of different capabilities and features useful with traditional CPE functions. For example, the error logging and reporting methods and apparatus described in co-owned and co-pending U.S. patent application Ser. No. 10/722,206 entitled "Methods and Apparatus for Event Logging in an Information Network" filed Nov. 24, 2003, now U.S. Pat. No. 7,266,726, which is incorporated herein by reference in its entirety, may be used within the CPE of FIG. 5. For example, the aforementioned disclosure describes methods and apparatus (including APIs) for logging errors that occur on client devices or CPE 106. In the present context, these errors may include errors generated within or by the CA, DRM, or TD clients, SM or TP, etc., which can then be transmitted upstream to a responsible entity (e.g., AP 208, management node, conditional access server 304, etc.) for further analysis or correction.

Similarly, the hardware registry apparatus and methods described in co-owned and co-pending U.S. patent application Ser. No. 10/723,959 entitled "Methods and Apparatus for Hardware Registration in a Network Device" filed Nov. 24, 2003, now U.S. Pat. No. 8,302,111 and which is also incorporated herein by reference in its entirety may be used consistent with the present invention. This disclosure provides apparatus and methods for control of hardware within a networked electronic device (e.g., CPE) through use of a hardware registry. The registry contains records that correspond to an optional set of hardware functionality (e.g., personal video recorder). Each record (or set of records) may contains fields that: (i) identify the type of circuitry and peripherals, (ii) uniquely identifies circuitry and peripherals of the same type, (iii) specify parameters that are specific to the circuitry and peripherals types, and/or (iv) contain a reference to an application programming interface that can be used to access and manipulate the circuitry and peripherals. In one exemplary configuration, the CPE 106 is adapted to provide control over Host CORE optional circuitry for a digital video recorder (DVR) and digital video interface (DVI). A DVR/DVI application can therefore be downloaded to retail or leased set-top boxes and other consumer electronics equipment, which provides control of any available DVR/DVI circuitry found therein or functions associated therewith. This not only permits "after-the-fact" control of optional hardware features in a retail (third party) electronics device by the MSO or other system operator, but also allows for control and reconfiguration of leased devices after distribution to the end user(s). The CPE 106 described herein may either be of third-party or leased origin, and hence may benefit under either model when used in conjunction with the foregoing hardware registry approach.

The software interface management apparatus and methods described in co-owned and co-pending U.S. patent application Ser. No. 10/883,374 filed Jun. 30, 2004 and entitled "Apparatus And Methods For Implementation Of Network Software Interfaces", now U.S. Pat. No. 8,201,191 and which is also incorporated herein by reference in its entirety, can be used within the CPE 106 or associated devices. Specifically, in one embodiment, network-specific programming interfaces (e.g., APIs) may be downloaded to the CPE, registered, authenticated, stored and executed in a software protocol stack implementing OpenCable Application Platform (OCAP) or Multimedia Home Platform (MHP) standards. The host device software comprises a "manager" module that registers APIs identified by the OCAP Monitor Application, such that all applications launched thereafter on the device can use these communications APIs, provided they have the appropriate permission(s). This relieves individual applications from having to support details regarding network-specific protocols and APIs. In an alternate embodiment, class and data files associated with the API functionality are downloaded along with an application. The downloaded application registers the API using a modified version of the API using a description file (DF). The DF describes the class and data files provided with the application that are part of the registered API.

In another aspect, the CPE 106 of the present invention is also compatible with the methods and apparatus disclosed in U.S. patent application Ser. No. 11/363,578 filed Feb. 27, 2006 and entitled "Methods And Apparatus For Selecting Digital Access Technology For Programming And Data Delivery", now U.S. Pat. No. 8,170,065, which is incorporated herein by reference in its entirety. Specifically, electronic devices such as set-top boxes, PMDs, or other types of equipment containing one or more hardware and software functions or modules are used; the hardware and software functions/modules of the different devices on the network contain various capabilities and options, including conditional access capabilities, DRM capabilities, video coding or compression capabilities, encryption schema, and network interfaces. These capabilities are utilized as a basis for determining which conditional access, DRM, coding, encryption, and/or network interfaces to utilize for delivery of content to each particular client device. The CPE 106 of the present invention can accordingly be equipped with such capability if desired in order to, inter alia, profile the CPE for tailoring content or other functions (e.g., CA, DRM, etc.) to that specific CPE environment.

As previously noted, the client device (e.g., CPE 106) may take any number of forms, including for example a converged device or "hive" such as that described in co-pending U.S. patent application Ser. No. 11/378,129 filed Mar. 16, 2006 previously incorporated herein. This converged device comprises a remotely manageable premises device that, inter alia, acts as a centralized client networking platform providing gateway services such as network management as well as traditional content and high-speed data delivery functions. The converged device also acts as the shared internet (e.g., Internet) connection for all devices in the premises via a cable modem or other such interface, sharing personal and DVR content such as video, music and photos (and any associated metadata) throughout the premises, and providing both a wired and wireless network in the home. Telephony services utilizing e.g., embedded multimedia terminal adapter (eMTA) and/or WiFi architectures may also be provided via the device; these services can make use of the network operator's indigenous VoIP or comparable telephony capability if desired, thereby providing an even more unified service environment.

The converged premises device can also provide a trusted domain (TD) for content or data, as well as allowing a subscriber total mobility in the home by not limiting content or data to any one viewing/access location. For example, content or data may be accessed on any monitor in the premises, as well as on a PC or personal media device (PMD).

A wired home network utilizing existing coaxial cable in the premises is also created, using e.g., an Ethernet-to-coaxial bridge technology based on the MoCA specification. This will allow existing devices and DVRs to connect and share content with the CPE, and also allows the network operator (e.g., MSO) to control and manage the premises coaxial network.

Secure Download System (SDS) Messaging and Protocol—

The host 210 of the exemplary embodiment is configured to provide appropriate routing of secure download system messages (described in greater detail below), as well as other desired functions, in a secure and efficient manner. Specifically, the host architecture of the invention: (i) enables network discovery and mutual authentication of newly attached or configured host devices via e.g., the SM bootloader 432, which provides information regarding the identity of the SM 514, cryptographic keys, and key pairing; (ii) enables the AP 208 to detect hosts running the "wrong" CA, DRM, or TD client and remedy the problem remotely; (iii) enables mutual authentication between the AP 208 and the SM bootloader 432, and registration of the SM with the AP, in order to permit secure image or key download and other functions; (iv) verifies successful SM Client (e.g., CA, DRM or TD client) installation, and retention by the AP 208 or its designated proxy of the installed SM Client version once the installation is complete; and (v) authenticates download system messages. Moreover, the exemplary host architecture is configured to permit TA verification of TP/SM key pairing, and request new keys as necessary.

In one embodiment, the secure download process previously described herein is based on mutual authentication between the AP 208 and the SM bootloader module 432 based on random challenges and trusted signatures. This approach advantageously reduces the risk of packet replay and man-in-the-middle (MITM) attacks. The exemplary AP 208 and the bootloader 432 are configured to implement secure download messaging and functions as a state-machine, wherein progression of the state machine to a subsequent operation is predicated on successful verification of the received message and any associated data in a current operation. This approach prevents attackers from replaying packets from earlier in the sequence while the state machine is executing. In one embodiment, the SM 514 is configured to digitally sign all outgoing messages, and verify the signature on all incoming messages, thereby further frustrating surreptitious attempts at replay or MITM attack.

Each message used within the secure download protocol of the exemplary embodiment comprises the following components: (i) message header; (ii) message payload or content; (iii) message attachments; and (iv) message signature.

The message header is used by the message recipient to determine the type of message, and receive a unique identifier and information as to the structure of the message. The message header precedes the other message components, and can be unencrypted since it does not carry any sensitive information.

The message content portion contains message-specific fields, digital signatures, and cryptographic elements (e.g., keys). This content portion is constructed according to a specific message format unique each message. After key exchange is successfully completed, all message content is encrypted by the sender using the recipient's public key portion.

The message attachment(s) are each associated with a cryptographic element (e.g., symmetric key) within the message content.

Appendix I hereto describes an exemplary message format according to one embodiment of the invention.

Exemplary embodiments of these messages are now described in greater detail, although it will be appreciated that other message types, functions, and in fact protocols may be used consistent with the broader principles of the invention to effect these functions.

In one embodiment of the invention, notification or "announcement" messages are used for inter-entity communication within the security architecture of FIG. 2. These messages are sent by the AP 208 or a designated proxy to indicate the most current set of SM Client (i.e., TD, DRM or CA client) images and security information for use in the download process. The SM (e.g., bootloader routine 432) receives and processes these announcement messages via the messaging interface and the DOCSIS gateway of FIG. 4b. If a change in the SM Client or keys (or other change) is indicated for the SM 514 of the designated CPE, then the bootloader 432 completes the key request, host authentication and download processes as required to effect these changes.

The exemplary protocol provides two messages that can be used to cause the bootloader 432 to download one or more SM Clients for use on the SM 514: All secure download system messages received by the monitor 480 are forwarded to the bootloader 432 for additional processing thereby.

Authentication messages are used by the secure download architecture to perform mutual authentication between the SM 514 of the CPE 106 and the AP 208 at the head-end 150, BSA hub site, etc. After authentication, the AP 208 knows the state of the SM 514 on the CPE 106, and can direct the SM 514 to download the appropriate cryptographic keys and/or SM Clients (i.e., DRM, TD, or CA clients 438, 422, 434 as shown in FIG. 4b). Additionally, the SM bootloader module 432 is given the set of SM Clients that the AP 208 requires to be installed on the CPE. The SM evaluates the current (re-quested) configuration of the CPE 106; if this does not match the currently installed SM Client set, the SM bootloader 432 will receive new or replacement SM Clients via the download protocol previously described herein.

The authentication messages issued from the SM bootloader 432 can also be used to provide platform or device-specific information in the event that an SM is migrated between different APs (i.e., from one network to another). This allows for the new network to uniquely and affirmatively identify the CPE via its SM 514.

Key management messages also may be used to convey the correct AP keys and the associated AP key chain from the TA 203 to the host 210 on the CPE 106.

Download messages are used by the secure download system to deliver download data (including the SM Client image(s)), and to confirm successful image download and installation on the CPE by the SM bootloader 432. In the exemplary embodiment, these messages comprise a first or "download" message (e.g., DownloadInfo) and second or "confirm" message (DownloadConfirm). The SM 514 can receive and install one SM Client image 422, 434, 438 through each DownloadInfo and DownloadConfirm message sequence, although other protocols, including multiple images per sequence, are feasible with the invention. The download message sequence can be repeated until the SM 514 has a set of client applications that match that specified by the relevant AP 208.

The download messages also may be configured to contain instructions or other data that can be used to control the installation and launching of the SM Clients 422, 434, 438, as well as providing status information after each client module is downloaded and installed.

Status or log messages are used by the AP 208 in the exemplary embodiment to obtain a current information log from the SM 514. The information log comprises a plurality of entries and is stored in the SM 514 or another designated location within the TD. A FIFO approach (i.e., new data pushing out old data) can be used for log entries if desired, especially where storage space is constrained. The AP 208 can also be configured to provide selection criteria in order to filter the log entries to be returned by a log message request, thereby economizing on upstream bandwidth consumption and messaging overhead. The log entries may be retrieved by the AP 208 or its proxy at any time after its keys have been successfully installed in the SM 514, thereby ensuring that the AP has unimpeded access, while also unauthorized access to the log is frustrated.

The exemplary embodiment of the security management and download protocol described herein further supports metadata (e.g., XML or the like) or other comparable data structures, as well as provision of Content Management Information (CMI) used for, inter alia, content rights signaling. In the present context, "metadata" comprises extra or supplementary data not typically found in primary content or signaling (or at least not visible to the users of the network). Specifically, for certain components of primary content (e.g., video/audio/data) or messaging, one or more metadata structures are included or appended that provide additional information related to that content or message for that content. This metadata can be provided with the content from its source or provider (e.g., a network studio or station or the like), or alternatively added by the network operator e.g., via the security apparatus described with respect to FIGS. 2-3d herein. Various permutations and mechanisms for generating, adding and editing metadata will be recognized by those of ordinary skill, and hence are not described in greater detail herein. In the exemplary embodiment, the metadata is used for control or indication of the useage of content while in the TD, but may be used for other purposes as well.

Methods

Figure 6:
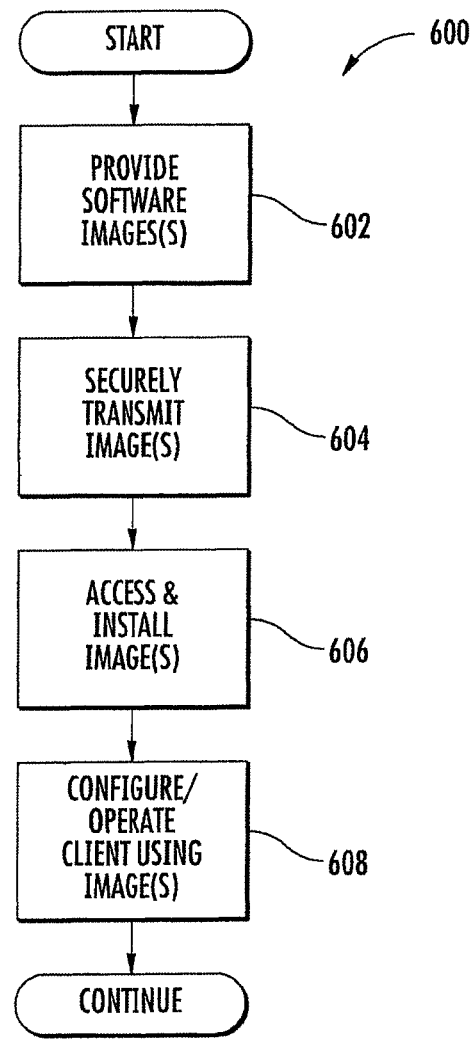
FIG. 6 is a logical flow diagram of one exemplary embodiment of the generalized method of conditional access (CA), trusted domain (TD), and/or digital rights management (DRM) configuration and update using the secure download system of the invention.

Referring now to FIG. 6, a first exemplary embodiment of the generalized method of conditional access (CA) trusted domain (TD), and/or digital rights management (DRM) configuration and update using the secure download system of the invention is described.

As shown in FIG. 6, the method 600 generally comprises first providing one or more new or updated images (software) for transmission from one node of the network (e.g., head-end, hub site, third party designated server, etc.) to another node (e.g., CPE 106, converged premises device, enterprise gateway or proxy, etc.) wherein a trusted domain exists or is to be established (step 602). These images may comprise the aforementioned common SM Client image, the personalized image, or both (or others).

Per step 604, the image(s) is/are securely transmitted directly or indirectly from the first node to the second node. Here, the "secure" transmission may include, without limitation, (i) encryption and encapsulation for transmission (e.g., VPN tunneling) over a physically non-secure or untrusted network such as the Internet or other distribution network; (ii) transmission over an end-to-end physically secure network; or (iii) delivery via another secure mechanism (e.g., service personnel, encrypted physical media, etc.). Mechanisms for authentication, encryption, data integrity, anti-spoofing protection, man-in-the middle protection, anti-replay protection, denial of service protection, and the like may also be utilized to any desired degree as part of this transmission process in order to frustrate attempts at compromise of the secure image, diversion to unauthorized parties, etc.

Per step 606, the secure image is received by the target device e.g., CPE 106, accessed (which may involve decryption and/or decoding), and installed on the desired platform. This platform may be the CPE 106 itself, or another connected device within the perimeter of the trusted domain that has authenticated itself to the CPE 106 (whether directly, or acting as a proxy for the distributing entity) and which meets the requirements of having an SM 514 and supporting the secure download protocol and requirements previously described.

Lastly, the target device is configured or operated using the secure image(s) per step 608. Such configuration operation may take the form of establishing a trusted or authorized service domain within the device, configuring components within the device (e.g., secure microprocessor, transport processor, etc.), facilitating further communications, decryption of other encrypted keys, providing access to the private portion of a public/private key pair, decrypting/encrypting content, establishing security policies for one or more SODs or NSODs connected to the CPE 106, etc.

Figure 6A:
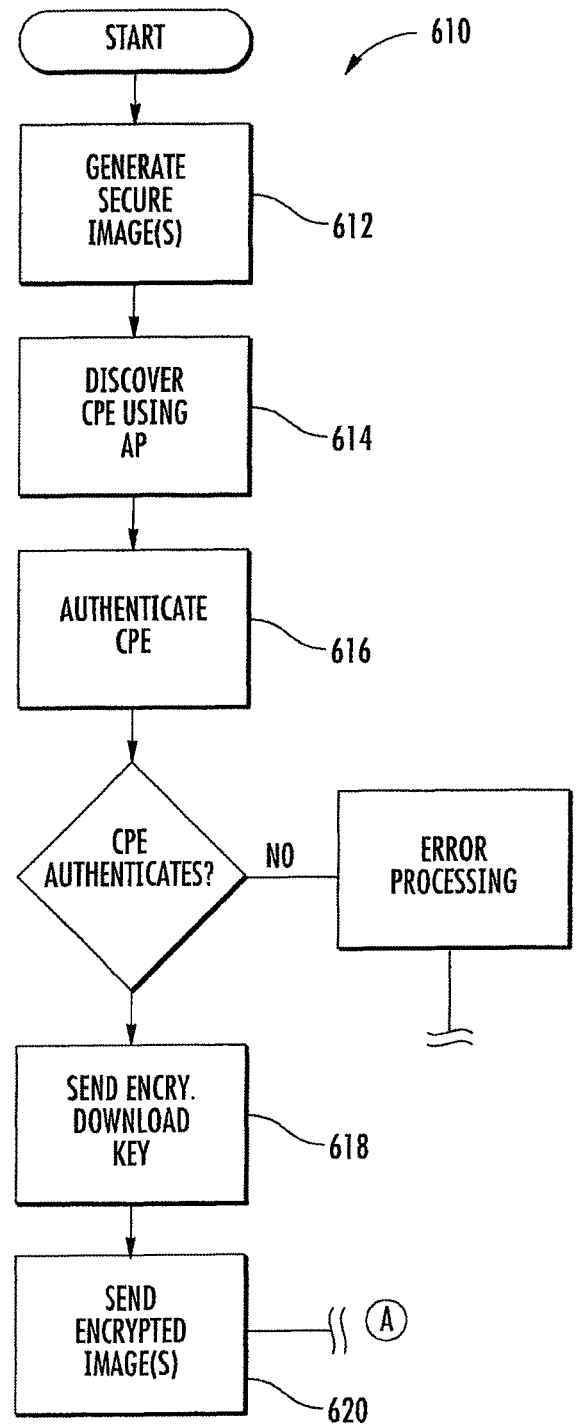
FIG. 6a is a logical flow diagram of one exemplary embodiment of the generalized method of Fig., illustrated in the context of a conditional access (CA) system of a cable television network
Figure 6A:
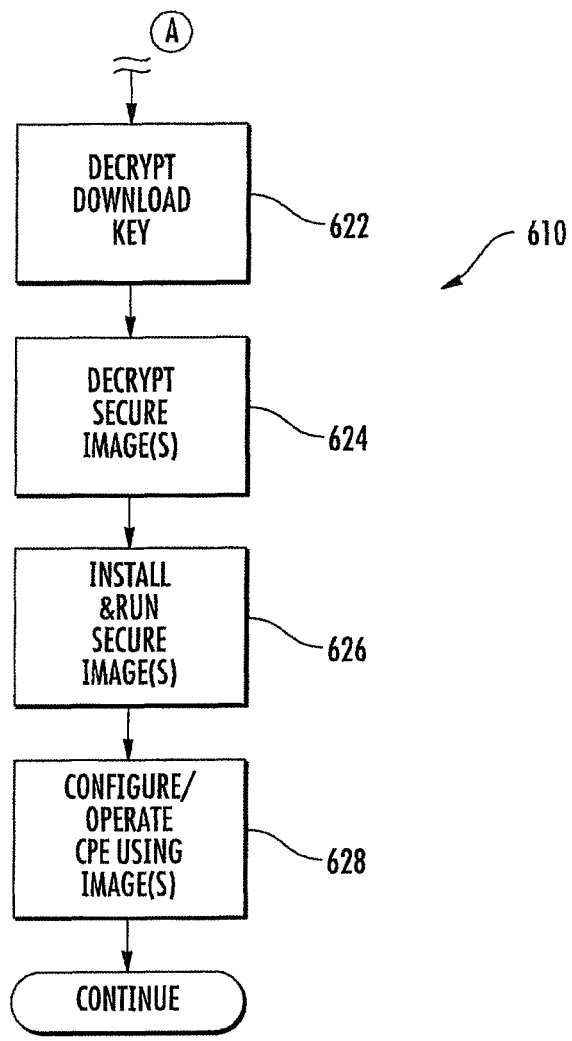
Figure 6B:
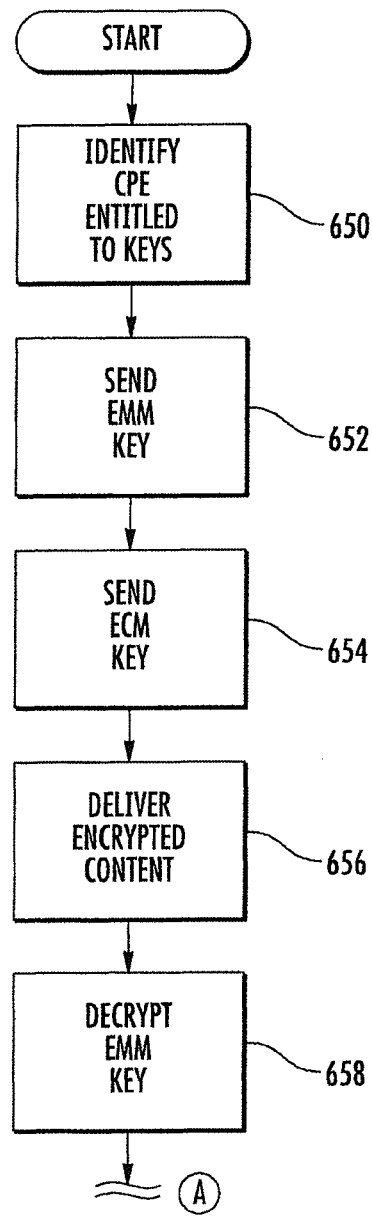
FIG. 6b is a logical flow diagram of one exemplary embodiment of the protocol utilized in order to protect content and keys, and selectively allow access to encrypted content.
Figure 6B:
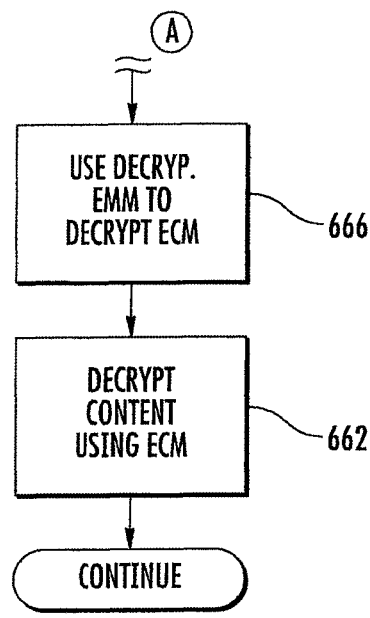

Referring now to FIG. 6a, one specific embodiment of the generalized methodology of FIG. 6 is described in detail. It will be appreciated that while the embodiment of FIG. 6a is described in the context of a conditional access (CA) system of a cable television network, the principles of the methodology are more broadly applicable to TD and DRM configuration and updates, as well as other types of networks such as, without limitation, satellite networks and IP-based networks.

Per step 612 of the method 610 of FIG. 6a, the secure image to be provided is generated. This image may comprise, for example a secure client application (e.g., CA client 434 of FIG. 4b), O/S component, middleware or target platform component, or other module adapted to provide the desired functionality. In one embodiment, the image(s) are rendered as comparatively small (e.g., <80 kb) code modules that perform cryptographic key recovery/generation as well as validation. The actual decryption/encryption of content takes place in the transport processor. The image(s) can be common to all targeted delivery devices (e.g., common client images discussed previously), and/or may be uniquely configured based on one or more parameters associated with the target installation. For example, one personalized image may be used for CPE (e.g., DSTBs) of Type A, while a second image is used for Type B CPE. Alternatively, one image may be used for subscribers of a given class or service level, while another image is used for those of a different service level (e.g., one image providing greater capabilities, functions, and/or portability, etc. for the higher service level subscribers). The images may also be divided along functional lines as previously noted; e.g., CA/DRM/TD. The present invention accordingly contemplates that the secure Client image(s) delivered to the target platform(s) can range between being completely ubiquitous or common to all targets, to being completely unique to each different target platform or subscriber, and combinations thereof (e.g., common and personalized images delivered contemporaneously). This level of granularity can advantageously be controlled by the MSO or network operator as desired, and can be subject to higher-level management processes (see discussion of business rules engine below).

It will also be appreciated that the generation or deployment of the secure image(s) to a distribution node (e.g., head-end AP 208 or BSA hub site) can be conducted in advance of distribution to the targeted platforms, or alternatively in near-real time upon request. For example, in one variant of the invention, the MSO is aware of the inventory of devices on its network (i.e., how many of what types of devices are connected, and which individual subscribers possess them), and accordingly can preposition corresponding variants of the secure image files for use by the AP 208 in configuring or updating CPE 106 on the network. Hence, when a Scientific Atlanta 8XXX DSTB with XYZ brand Model 123 SM is targeted for update, the AP will select the correct or matching variant of the secure image for this device (such as via a carousel mechanism) and perform any additional provisioning of the image(s) before download to the target device(s).

Consider alternatively the case where a new-model (e.g., retail) CPE 106 is coupled to the network, and requires update or configuration via the DCAS. In such a case, the AP 208 may not have immediate access to a secure image appropriate for this device, and hence must either (i) access the appropriate image from another source (e.g., third party site, etc.), or (ii) generate and prepare the image "on the fly" for delivery to the target platform(s). Both of these functions may be performed in a highly automated fashion; e.g., by a software environment running within the AP 208 or other SDS components adapted to generate the secure image(s) based on information provided by the AP 208 and the CPE 106 itself. To this end, the CPE 106 may actually be dynamically profiled as to its hardware and software capabilities (such as via a profiling message issued by the AP or its proxy), and the gathered profiling information transmitted to the AP for use in generating the secure image. For example, the profiling message may indicate that the target CPE 106 has only n Gb of RAM available, has an XYZ Model 123 SM, or has limited processing capability, and hence the secure image selected for that device must meet certain limitations on code size and construction.

Per step 614, the CPE 106 is discovered by the DCAS AP 208. This can be accomplished by existing communication protocols used for other purposes (e.g., downstream/upstream OOB or in-band messaging), or alternatively using a dedicated protocol for this purpose This discovery may occur after the secure image is made available, before the secure image is generated "on the fly", or contemporaneous with secure image availability, as previously described.

Next, the CPE 106 is authenticated by the AP, including authentication of the SM 514, which is the target of the secure image and cryptographic element download (step 616).

Next, the conditional access system (CAS) download key is sent to the CPE 106 via DOCSIS downstream channels, or alternatively another delivery channel (e.g., in-band or OOB, satellite link, third-party WSP or CSP, etc.) per step 618. For example, an entitlement control message (ECM) of the type known in the CA arts or other such mechanism may be used as the delivery mechanism for the key. This key may comprise, for example an encrypted symmetric aor asymmetric key or other such cryptographic element. Whatever type of cryptographic keying is used, it will typically be desirable to encrypt the download key for added security.

The encrypted CA Client image 434 is also downloaded to the CPE 106 via DOCSIS downstream channels, or alternatively another delivery channel per step 620. This download may be conducted simultaneously via the same channel as the download key, simultaneously via a different channel from that used for the key, or at a different time using the same or a different channel. As previously noted, mechanisms for authentication, encryption, data integrity, anti-replay or spoofing, etc. may be employed as part of the download key and/or secure image transmission processes in order to frustrate surreptitious access to either or both components.

In the exemplary embodiment, the CAS download key comprises the public part of a public/private key pair, and the private key part (maintained within the trusted domain of the target CPE 106, namely the SM 514) is used to decrypt the download key (step 622). The decrypted download key enables the CPE 106 to unlock the encrypted CAS image (software) per step 624.

The decrypted CA software is then loaded or installed onto the CPE (or other designated target platform within the trusted domain) per step 626, and the CPE 106 or target platform configured or operated using the software per step 628.

Alternatively, the private portion of the key pair may be transmitted to the target device (using methods for delivery of the encrypted public portion as previously described), and the public portion may be maintained at the target device.

With respect to content (e.g., video) encryption/decryption, the following exemplary protocol (FIG. 6b) is utilized in order to protect content and keys, and selectively allow access to encrypted content.

In one embodiment, Entitlement Management Messages (EMMs) are used to specify which CPE 106 within the network ("targeted populations") are given access to content per step 650. A targeted population may comprise as few as one specific CPE, or as large as all CPE within the network. Typically, however, EMMs will be issued to a group of CPE based on one or more targeting criteria which may include, without limitation, specific TUNER ID, MAC or other CPE-specific variables, geographic profiles (e.g., all CPE within a given geographic region, zip code, etc.), demographic profiles, equipment type profiles, subscriber level profiles, CA and DRM capabilities, and so forth. Exemplary methods and apparatus for targeting selected subsets or populations with a network are described in, e.g., co-pending and co-owned U.S. patent application Ser. No. 11/186,452 entitled "Method And Apparatus For Boundary-Based Network Operation" filed Jul. 20, 2005 now U.S. Patent Application Publication No. 2007/0022459, which is incorporated herein by reference in its entirety, although other approaches may be used with equal success.

Entitlement Control Messages (ECMs) are used in the exemplary embodiment to, inter alia, carry the keys for descrambling or decryption of the actual content (e.g., MPEG2 video) as distinguished from the software image(s). One or more designated sources (e.g., network QAMs) sends three (3) items to the CPE 106: (i) an encrypted EMM key (also known as a "service key") per step 652; (ii) an encrypted ECM key (also known as the "session key" or "transport key") per step 654; and (iii) an encrypted stream of content data (step 656). The content stream may be encrypted using, e.g., the well known Digicipher II or PowerKey approaches, although other techniques may be used with equal success.

Next, per step 658, the host 210 of the CPE 106 decrypts the EMM or service key using a private key portion stored on the CPE 106 within the CA client (SM 514). The decrypted key contained from the EMM is then used to decrypt the ECM per step 660. The decrypted key from the ECM is then used to decrypt the encrypted stream of content/data (step 662), resulting in a "clear" video or data stream.

It will be appreciated that the security download architecture of the present invention can also be used in a complementary or layered fashion with other content acquisition, management and control technologies. For example, the methods and apparatus described in co-pending and co-owned U.S. patent application Ser. No. 11/080,693 filed Mar. 14, 2005 entitled "Method And Apparatus For Network Content Download and Recording", now U.S. Pat. No. 8,028,322, which is incorporated herein by reference in its entirety, may be used consistent with the present invention to provide network users with the ability to purchase and record content to a physical medium, while also obeying the security policies imposed by the download (e.g., DCAS) security architecture herein. This disclosure also provides mechanisms for the inclusion of digital copyright data within the recorded data/content, such as well-known digital watermarking data of the type authorized under the United States Digital Millennium Copyright Act (DMCA). For example, Digimarc®, SysCoP™, EIKONAmark™, and other similar commercially available watermarking approaches can be used. Various types of steganographic approaches may also be employed consistent with the invention in order to enforce copyright and provide the copyright owner with accountability and/or traceability of reproduced versions of their copyrighted material. If desired, these approaches can be readily coded into the software or firmware of the recording device such that the inclusion of this data is completely transparent to the user, and does not require any user or MSO/content provider intervention.

This layered or multi-faceted approach may also provide enhanced protection by virtue of not only protecting the content within the TD and controlling how it is distributed outside of the TD (such as into a SOD), but also physically protecting the media itself via watermarking, inclusion of DRM content into the "burned" ROM or other media, etc.

Moreover, this combination is also potentially quite powerful from the standpoint that the operational flexibility and security provided by the download architecture of the present invention, when coupled with the ability to provide content earlier to network subscribers than would otherwise be available over that network (via the technology described in the aforementioned disclosure), provides functionality that could not otherwise be obtained; i.e., the ability to download and physically reproduce content that is commensurate with that available in a retail or rental outlet, yet over their cable network, and with the ability to distribute the content to other "approved" devices within their premises network seamlessly while also affording the network operator (or third party content source) control over the distribution process.

Business/Operational Rules Engine and Methods—

In another aspect of the invention, a processing entity (e.g., rendered as one or more computer programs disposed within the head-end (e.g., AP 208, PS 306, etc.), BSA hub entity, CPE 106, or other location) includes a so-called "rules" engine. This engine comprises, in an exemplary embodiment, one or more software routines adapted to control the operation of the security management architecture in order to achieve one or more goals relating to operations or business (e.g., profit). Included within these areas are implementation of security management policies that can increase network optimization and reliability, increase maintenance intervals, increase subscriber or user satisfaction, increase subscription base, higher profit (e.g., from increased advertising revenues, more subscriber "views" of given content, higher data download speed, increased bandwidth and responsiveness to changing demands for bandwidth, reduction of undue QAM replication, and so forth.

These rules may comprise a separate entity or process, and may also be fully integrated within other processing entities (such as the aforementioned security management architecture of FIGS. 3a-3d), and controlled via e.g., a user interface such as a GUI on a PC connected to the relevant device. In effect, the rules engine comprises a supervisory entity which monitors and selectively controls security management operation processes at a higher level, so as to implement desired operational or business rules. The rules engine can be considered an overlay of sorts to the more fundamental algorithms used to accomplish required security functions and network operation, such as key management, encrypted image generation, TD/ASD or DRM configuration, IP address assignment, statistical multiplexing, BSA switching, and so forth.

For example, the network security management apparatus (or CPE) may invoke certain operational protocols or decision processes based on information or requests received from the CPE, conditions existing within the network, demographic data, geographic data, etc. However, these processes may not always be compatible with higher-level business or operational goals, such as maximizing profit, bandwidth management, or system reliability. Hence, when imposed, the business/operational rules can be used to dynamically (or manually) control the operation of the download and/or Client process on the CPE or within other domains (e.g., SOD or NSODs in communication with the TD). The rules may be, e.g., operational or business-oriented in nature, and may also be applied selectively in terms of time of day, duration, specific local areas, or even at the individual user level (e.g., via specific identification of the CPE or client device via TUNER_ID, MAC address, SM identifying information or the like).

For example, one rule implemented by the rules engine may comprise only providing certain types or program recording and/or distribution features to certain subscribers or classes of subscribers. The subscriber CPE 106 may possess a Firewire (IEEE-1394) interface or other such interface capable of transmitting content to a connected device for example, but the ability to transfer such protected content out of the TD not be made available to such subscribers unless they met certain criteria (e.g., "premium" subscription, etc.).

Another rule might impose a moratorium or restrictions on downloading secure images (e.g., SM Clients) or download keys to the CPE 106 during conditions of very heavy loading, e.g., until a certain minimum threshold of available bandwidth is present, thereby avoiding contention for bandwidth resources with "premium" services such as DOCSIS cable modem Internet access. Similarly, processing typically done upstream of the CPE could be dynamically shifted to the CPE under such circumstances so as distribute the processing load (and hence downstream messaging bandwidth consumed) to the CPE.

Similarly, another rule might comprise controlling and rate-limiting the region over which any bulk upgrade of SM Client images is performed (see discussion of FIGS. 3e-3n above) in order to limit the amount of network traffic and host resource load added during SM Client image downloads.

Premium subscribers might also be given "head of the line" privileges where any contention exists for SM Client download requests or keying (such as by way of a "bottleneck" at the TA 203).

Moreover, premium subscribers might be given a greater scope of options and choices; e.g., the ability to use a wider range of CPE (e.g., new DSTBs introduced in the retail market), while more basic subscribers are limited as to the type of device they may use as part of their subscription.

The establishment of a trusted domain, conditional access perimeter, and/or digital rights policies may also be made in a substantially dynamic fashion using the methods and apparatus of the invention. For example, an MSO might know that a given subscriber or premises might only use recording or personal media devices (PMDs) during certain time periods (e.g., weekends) based on, e.g., historical data, subscription restrictions, or other operational factors or conditions. Hence, extension of the TD to include these capabilities, and necessary permissions, can be selectively enabled or disabled by the MSO if desired, such as to achieve other operational or business goals. This can also be useful for maintenance modes, wherein such maintenance is scheduled into periods when the subscriber is not expected to make use of these features during a particular period of time. These capabilities can also be rapidly re-established should the subscriber wish to utilize them (e.g., in an "on-demand" fashion).

The present invention also lends itself to various business models in terms of distribution, operation, and service provision. Specifically, by using the technology of the present invention, the CPE 106 can also be reconfigured as a trusted domain for protected content received over the cable or satellite receiver (tuner). New versions or upgrades of software/firmware can readily be downloaded and installed as well. In that the present invention advantageously provides MSO control over the access, distribution and reproduction of content within the network (and to a degree beyond the MSO network), numerous different permutations of these features can be offered by the MSO as part of a subscription or incentive program. For example, a "basic" subscriber might be given a certain limited package of TD capabilities (e.g., no transmission of protected content outside of the TD, no recording to fixed media such as a CD-ROM, no "multi-room" DVR, etc.), while a higher level subscription package might include these capabilities, and yet others. Individual or groups of features or capabilities may also given to subscribers or prospective subscribers for limited periods of time, or under certain limited circumstances, as an incentive or trial.

One variant of the business methodology of the invention contemplates delivery of substantially similar or "generic" hardware/firmware environments to all subscribers, with the MSO able to tailor the CA, TD and DRM capabilities of their individual CPE 106 for their particular subscription level, needs and premises. For example, some users may have local recording devices (e.g., DVR or the like) which may require configuration of the trusted domain to extend to these devices to permit subscriber purchase and in-home "burning" of content according to the methods previously discussed with respect to U.S. patent application Ser. No. 11/080,693.

As can be appreciated, literally an unlimited number of different premises/subscriber-specific configurations may be employed consistent with the security download capability of the invention, and hence it is typically more economical and efficient to allow MSO reconfiguration of a substantially generic device, as opposed to custom configured hardware or software for each subscriber/premises.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

APPENDIX I: EXEMPLARY SECURE DOWNLOAD
INFRASTRUCTURE INTERFACES

| Interface | Components | Description | Security |
|---|---|---|---|
| SDS-SRXI | TA-LKS | The SDS Secure Records Exchange Interface is used for the bulk distribution of Key information between the Trusted Authority Key information database to a Local Key Server. | HTTPS /TLS Mutual authentication using TA signed certificates |
| SDS-SKRI | AP-TA | The SDS Secure Key Request Interface is used for the transactional distribution of Key information between the Trusted Authority and the Authentication Proxy. | HTTPS/TLS Mutual authentication using TA signed certificates |
| SDS-IXI | AP-PS | The SDS Image Exchange Interface is used to communicate SM Client download information and exchange SM Client Images between the Authentication Proxy and Personalization Servers (i.e. CAS or TD). | Authentication and encryption |
| SDS-PRI | AP-TA | The SDS Purchase Report Interface is used to forward SM Purchase Report information to the purchase arbitrator. | HTTPS/TLS Mutual authentication using TA signed certificates |
| Operations Support System Interface | AP-NMS | The OSSI Interface used to provide SDS SM and Infrastructure monitoring information to the MSO Network Management Systems and other Operations Support Systems (OSS). | Unspecified-MSO dependent |
| Provisioning Interface | AP-SPS | The Provisioning Interface is used to carry SM Host provisioning and configuration information messages between the SDS Provisioning System and Authentication Proxy. The Provisioning Interface is included for completeness and will not be formally specified. | Unspecified-MSO dependent |
| Local Records Exchange Interface | AP-LKS, SPS-LKS | The Local Records Exchange Interface is used to distribute Keys locally throughout the MSOs SDS infrastructure. The Local Records Exchange Interface is included for completeness and will not be formally specified. | Unspecified-MSO dependent (MSOs adopt the same security conventions defined for other infrastructure interfaces) |

What is claimed is:

1. Network apparatus disposed substantially at a first node of a content distribution network and configured to deliver security information to a second node of said network, said network apparatus comprising:

a content provisioning apparatus;

a security management apparatus in communication with said content provisioning apparatus; and an authentication apparatus in communication with at least said security management apparatus;

wherein at least said authentication apparatus and security management apparatus are configured to cooperate to transmit to said second node an encrypted management message and an encrypted session key;

wherein said encrypted management message is configured to be decrypted only by certain ones of a plurality of client devices at said second node, said decrypted management message being configured to enable said certain ones of said plurality of client devices to decrypt said encrypted session key; and wherein said encrypted session key is configured to enable said certain ones of said plurality of client devices to decrypt encrypted content in order to manage at least one of (i) a trusted domain (TD) policy or configuration, and (ii) a digital rights management (DRM) policy or configuration, within a secure element of said certain ones of said plurality of client devices.

2. The network apparatus of claim 1, wherein said first node comprises a head-end of a managed content distribution network, and said second node comprises a residence or enterprise.

3. The network apparatus of claim 2, wherein said managed content distribution network comprises a coaxial cable-based network, and said network apparatus is configured to deliver said encrypted session key via a Data Over Cable Service Interface Specification (DOCSIS)-compliant cable modem.

4. The network apparatus of claim 2, wherein said network apparatus is configured to deliver said encrypted session key via an in-band downstream quadrature amplitude modulated (QAM) channel.

5. The network apparatus of claim 1, wherein said first node comprises a hub within a broadcast switched architecture (BSA) network.

6. The network apparatus of claim 1, further comprising a personalization server (PS) apparatus in communication with said security management apparatus, said PS apparatus being configured to select said encrypted session key based at least in part on a communication received from at least one of said plurality of client devices disposed at said second node.

7. The network apparatus of claim 6, wherein said authentication apparatus comprises software configured to authenticate said secure element of said at least one of said plurality of client devices based at least in part on said communication received from said at least one of said plurality of client devices, said authentication being required before said encrypted session key may be downloaded.

8. The network apparatus of claim 1, wherein said certain ones of said plurality of client devices disposed at said second node each comprises a premises content distribution apparatus for use with a plurality of media-capable devices, and comprising:
  a first interface configured to receive media content from a first network;
  a mass storage device in data communication with said first interface and configured to store at least a portion of said media content;
  a coaxial cable interface configured to provide a network to be created throughout at least a portion of said premises over signal conductors present therein; and
  a wireless access interface configured to support at least one wireless network substantially within said premises;
  wherein said media content is accessible to users on both a coaxial cable network and said at least one wireless network.

9. The network apparatus of claim 1, wherein said encrypted session key comprises a secure client configured to interoperate with said secure element of said certain ones of said plurality of client devices.

10. The network apparatus of claim 9, wherein said network apparatus is further configured to transmit a bootloader program to interoperate with said secure element to enable at least a portion of said transmission of said encrypted session key and a cryptographic key.

11. The network apparatus of claim 10, wherein said network apparatus is further configured to transmit a second session key to said certain ones of said plurality of client devices, said second session key comprising a rights management client, said rights management client configured to interoperate with said secure element to enforce at least one TD or DRM policy.

12. The network apparatus of claim 11, wherein said network apparatus is further configured to collect from said rights management client a log, said log comprising records of said enforcement of said at least one TD or DRM policy via said rights management client.

13. The network apparatus of claim 1, wherein said encrypted session key is further configured to have at least two portions, a first portion being common to a plurality of locations within said content distribution network, and a second portion being unique to a particular location at which said certain ones of said plurality of client devices are is located.

14. A method of remotely providing a trusted domain for content protection within a premises having a client device, comprising:
  receiving encrypted software to said client device over a network;
  receiving a first decryption key to said client device;
  using a second decryption key to access said first decryption key;
  using said first decryption key to decrypt said encrypted software to generate decrypted software; and
  using said decrypted software to establish at least a portion of said trusted domain within said client device;
  wherein said trusted domain is configured to enable content to be securely transported therein.

15. The method of claim 14, wherein said encrypted software comprises a trusted domain (TD) client program, said TD client program being configured to run on a physically secure microprocessor within said client device, and configured to establish a plurality of security and content distribution policies within said trusted domain, said plurality of security and content distribution policies and said trusted domain cooperating to prevent unauthorized reproduction of said content.

16. The method of claim 15, wherein said encrypted software further comprises a conditional access (CA) client program, said CA client program being configured to run on said physically secure microprocessor within said client device, and configured to establish a plurality of content access policies within said trusted domain, said plurality of content access policies and said trusted domain cooperating to prevent unauthorized access to said content.

17. The method of claim 14, wherein said act of receiving said first decryption key comprises obtaining an encrypted public portion of a public/private key pair, and said method further comprises:
  receiving a private portion of said public/private key pair to said client device; and
  decrypting said encrypted public portion using said private portion of said public/private key pair.

18. Security apparatus for use with a content distribution network, comprising:
  client-side security management apparatus in operative communication with said content distribution network and configured to maintain at least a portion of a trusted domain within a client device using at least a secure element; and
  network security management apparatus in operative communication with said content distribution network and said client-side security management apparatus, said network security management apparatus being configured to control at least one of a configuration and an operation of said client-side security management apparatus in order to protect content delivered to said client device against unauthorized distribution or reproduction;
  wherein said secure element is authenticated to said network security management apparatus prior to delivery of said content to said client device.

19. The security apparatus of claim 18, wherein said network security management apparatus comprises:
  a content provisioning apparatus;
  a conditional access apparatus in communication with said content provisioning apparatus; and
  an authentication apparatus in communication with at least said conditional access apparatus;
  wherein said authentication apparatus, said content provisioning apparatus, and said conditional access apparatus are configured to cooperate to transmit to said secure element of said client device both: (i) at least one cryptographic key, and (ii) encrypted code configured to provide said protection of said content at said client device.

20. The security apparatus of claim 19, wherein said secure element of said client-side security management apparatus further comprises
  a physically secure microprocessor configured to run said encrypted code after decryption thereof, said encrypted code enforcing at least a portion of a plurality of security policies necessary to maintain said trusted domain; and
  a conditional access (CA) client configured to interface with said conditional access apparatus in order to establish one or more conditional access policies with respect to said content.

21. The security apparatus of claim 20, wherein said physically secure microprocessor further comprises a bootloader function configured to cause said authentication of said secure microprocessor to said authentication apparatus of said network security management apparatus.

* * * * *